United States Patent [19]

Nazarenk et al.

[11] Patent Number: 5,020,132
[45] Date of Patent: May 28, 1991

[54] PROCESSOR-TO-PROCESSOR COMMUNICATIONS PROTOCOL FOR A PUBLIC SERVICE TRUNKING SYSTEM

[75] Inventors: Dimitri M. Nazarenk; Houston H. Hughes, III; Robert T. Gordon; David L. Hattey; Bruno Yurman, all of Lynchburg, Va.

[73] Assignee: Ericsson Ge Mobile Communications Inc., Lynchburg, Va.

[21] Appl. No.: 365,810

[22] Filed: Mar. 6, 1989

Related U.S. Application Data

[62] Division of Ser. No. 85,572, Aug. 14, 1987, Pat. No. 4,835,731.

[51] Int. Cl.⁵ .................... H04B 7/14; H04K 11/00
[52] U.S. Cl. ................................ 455/17; 455/33; 455/56; 375/4; 379/59; 379/63
[58] Field of Search ......................... 455/33-34, 455/17, 54, 56; 375/4; 370/97; 379/58-63

[56] References Cited

U.S. PATENT DOCUMENTS

| | | | |
|---|---|---|---|
| 4,649,567 | 3/1987 | Childress | 455/17 |
| 4,658,435 | 4/1987 | Childress et al. | 455/17 |
| 4,692,945 | 9/1987 | Zdunek | 455/17 |
| 4,698,805 | 11/1987 | Sasuta et al. | 370/97 |
| 4,835,731 | 5/1989 | Nazarenko et al. | 379/58 |
| 4,905,302 | 2/1990 | Childress et al. | 455/34 |
| 4,926,496 | 5/1990 | Cole et al. | 455/17 |

Primary Examiner—Reinhard J. Eisenzopf
Assistant Examiner—Andrew Faile

[57] ABSTRACT

A downlink between a communications dispatch console and a digitally trunked radio repeater system site controller efficiently transfers message data between the site controller and the console over a standard 9.2 kilobit per second landline. A downlink trunking card identical in structure to trunking cards used in the preferred embodiment system for RF channel signal processing interfaces the site controller with the landline link. A similar trunking card on the other side of the landline link interfaces the dispatch console processor with the landline link. Message protocol and format is translated between the site controller and the landline link and between the landline link and the dispatch console. Data buffering at each end of the landline link maximizes data transfer rate over the landline, and in addition, a priority scheme insures that more important messages are transmitted over the downlink before less important messages. Retransmit-until-acknowledged protocol is used to insure reliable message transfer—and also to permit receiving units along the downlink to slow down transmitting units in order to avoid message traffic blockage.

7 Claims, 19 Drawing Sheets

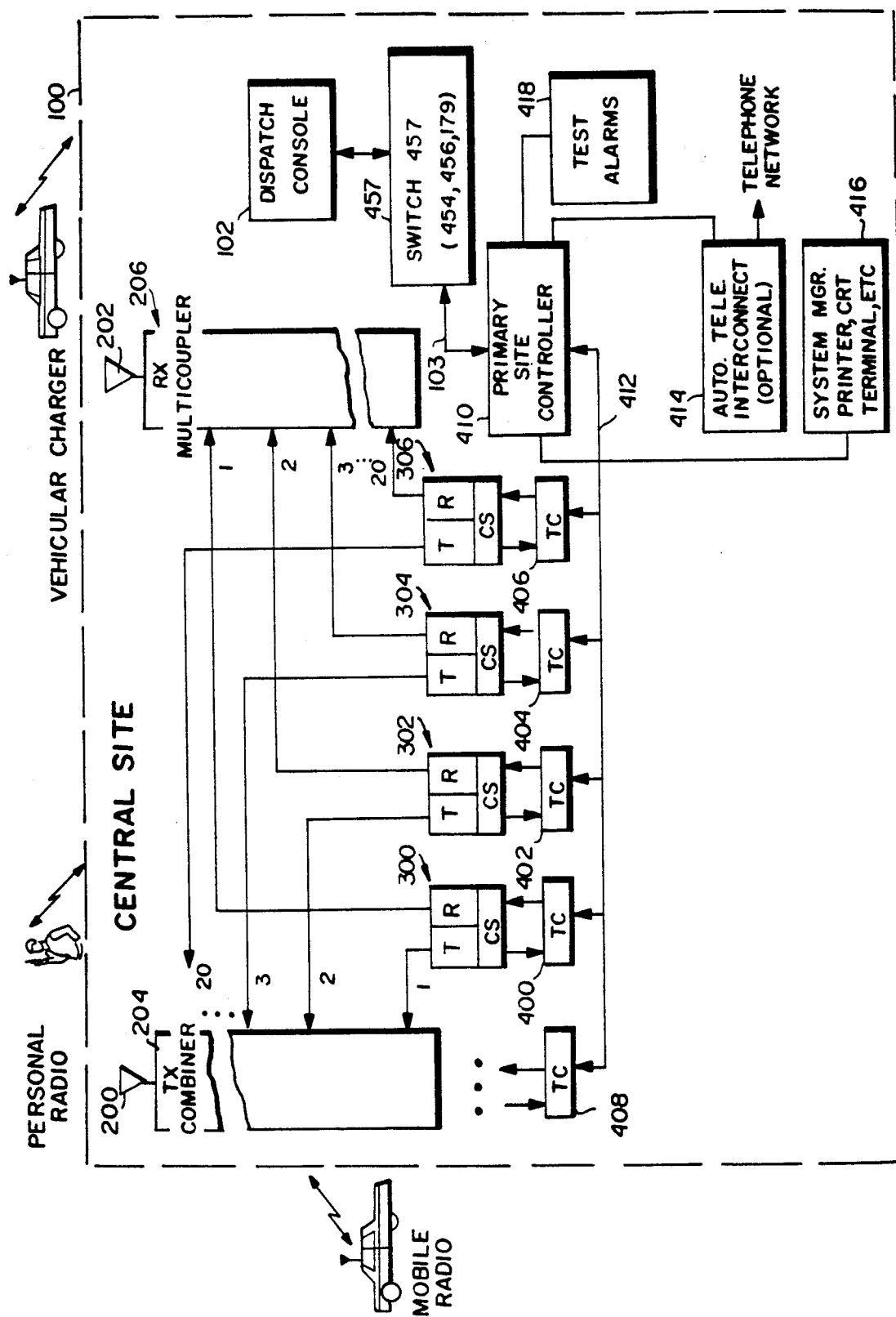
FIG. IA

FIG. 5 SITE CONTROLLER TRANSMIT PROCESSING

FIG. 6 SITE CONTROLLER RX PROCESSING

FIG. 7  TC TO SITE CONTROLLER TRANSMIT PROCESSING

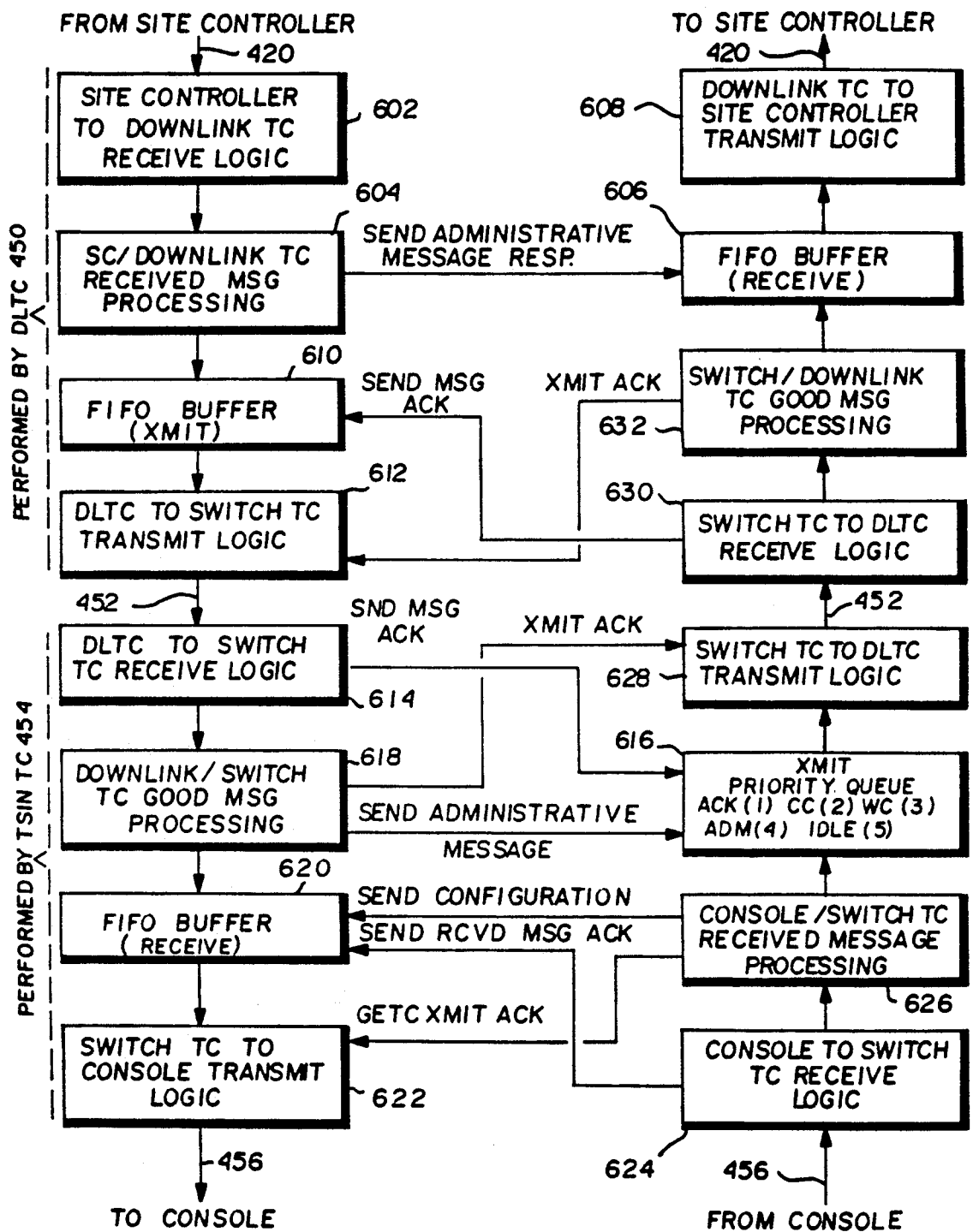
FIG. 9 DOWNLINK COMMUNICATIONS

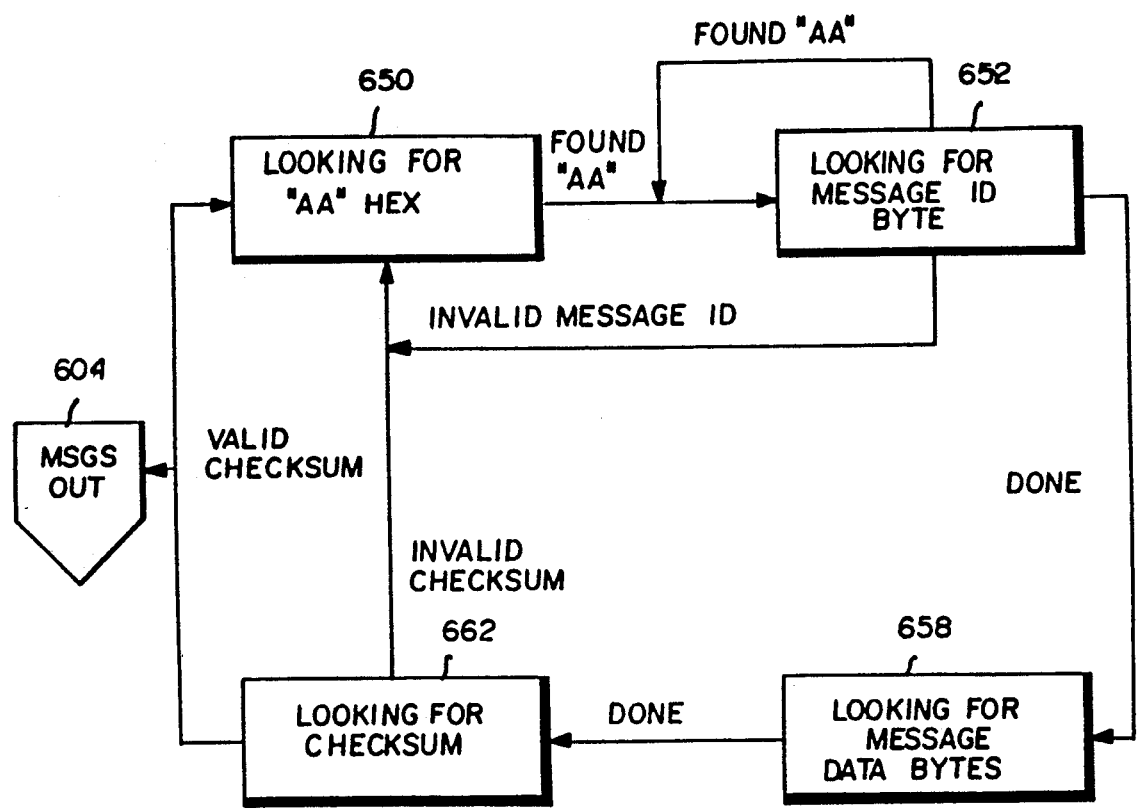
FIG. 10 SITE CONTROLLER TO TC : TC RECEIVE LOGIC

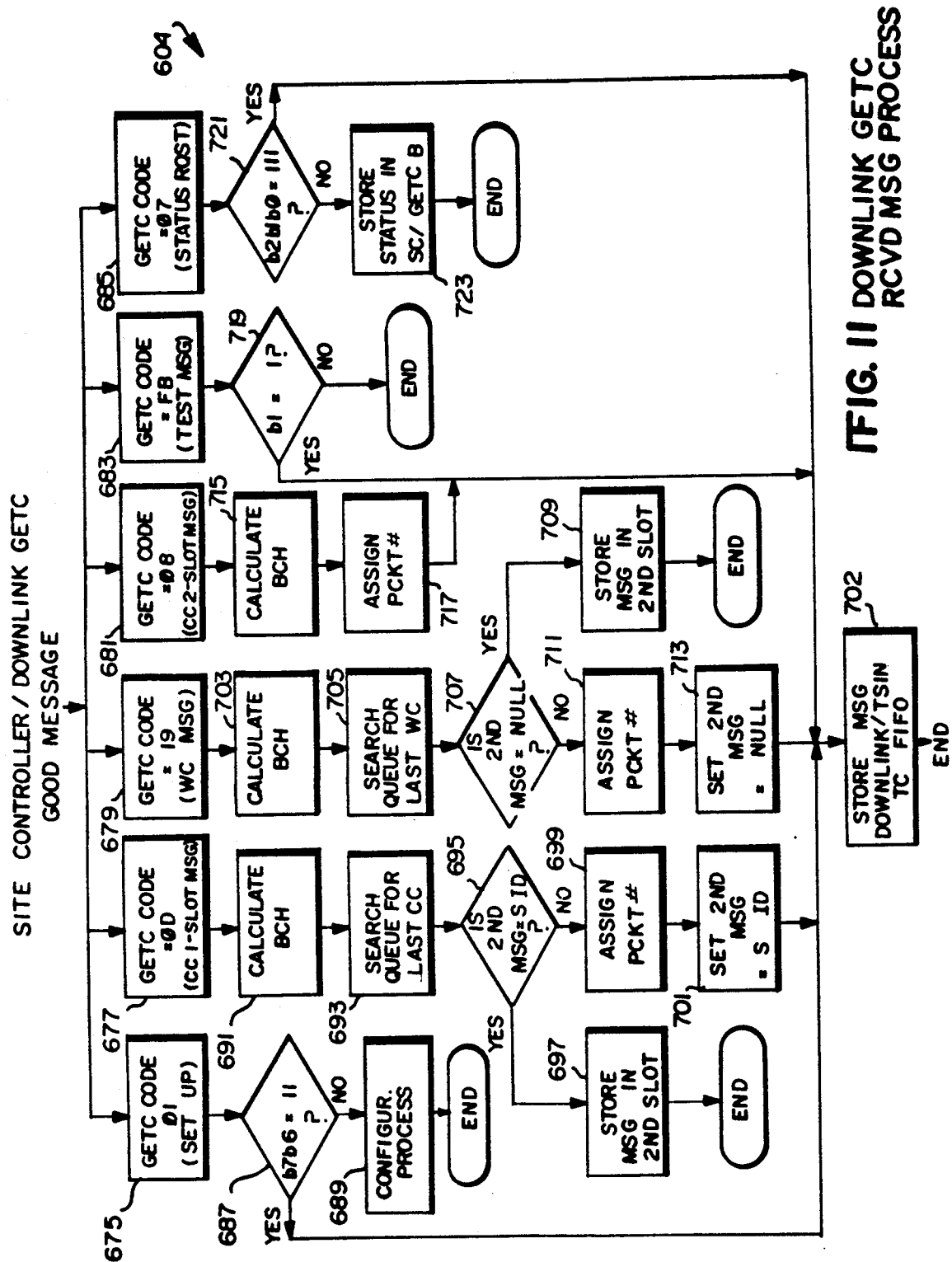
FIG. 11 DOWNLINK GETC RCVD MSG PROCESS

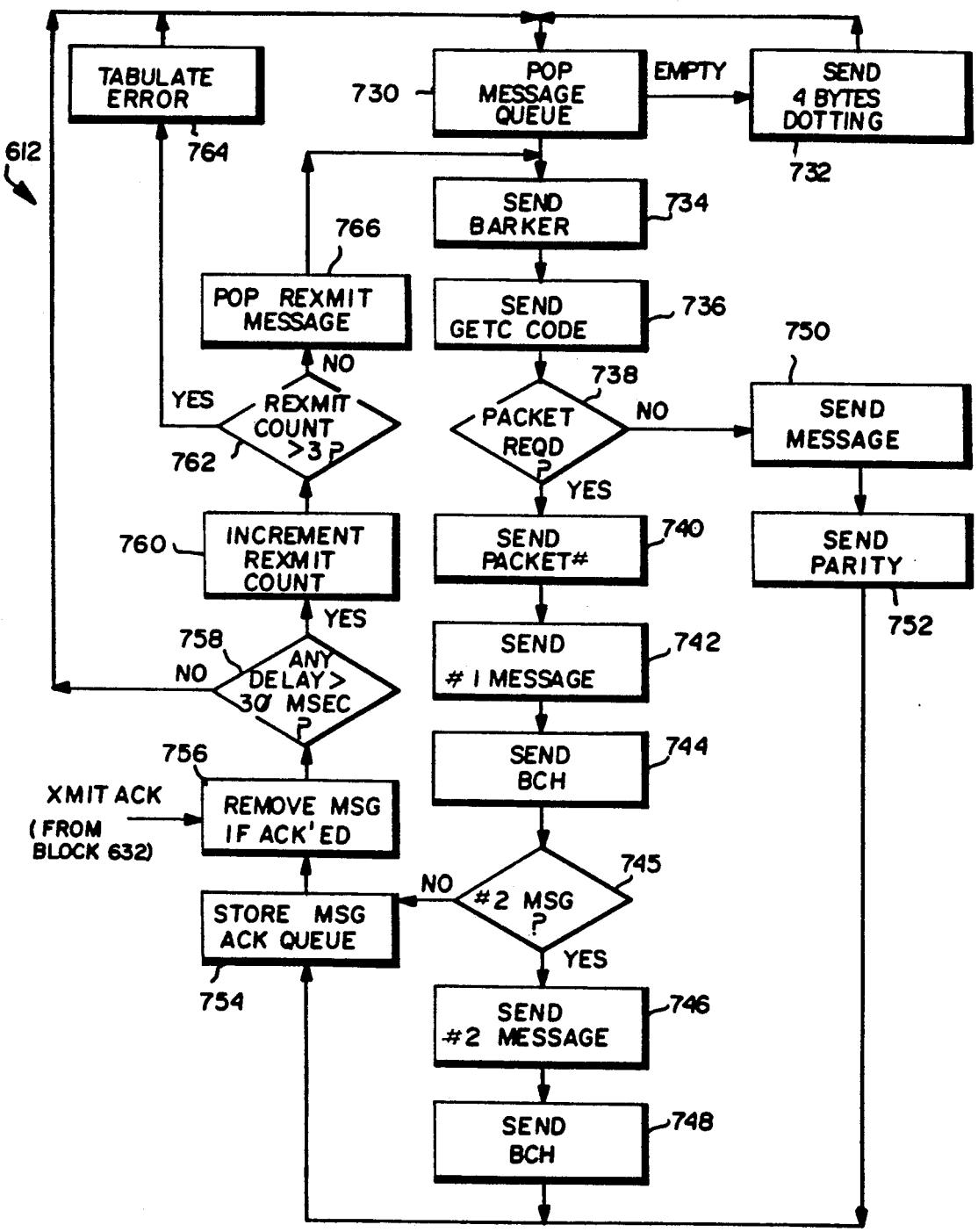
FIG. 12 DLTC-TO-SWITCH TC TRANSMIT LOGIC

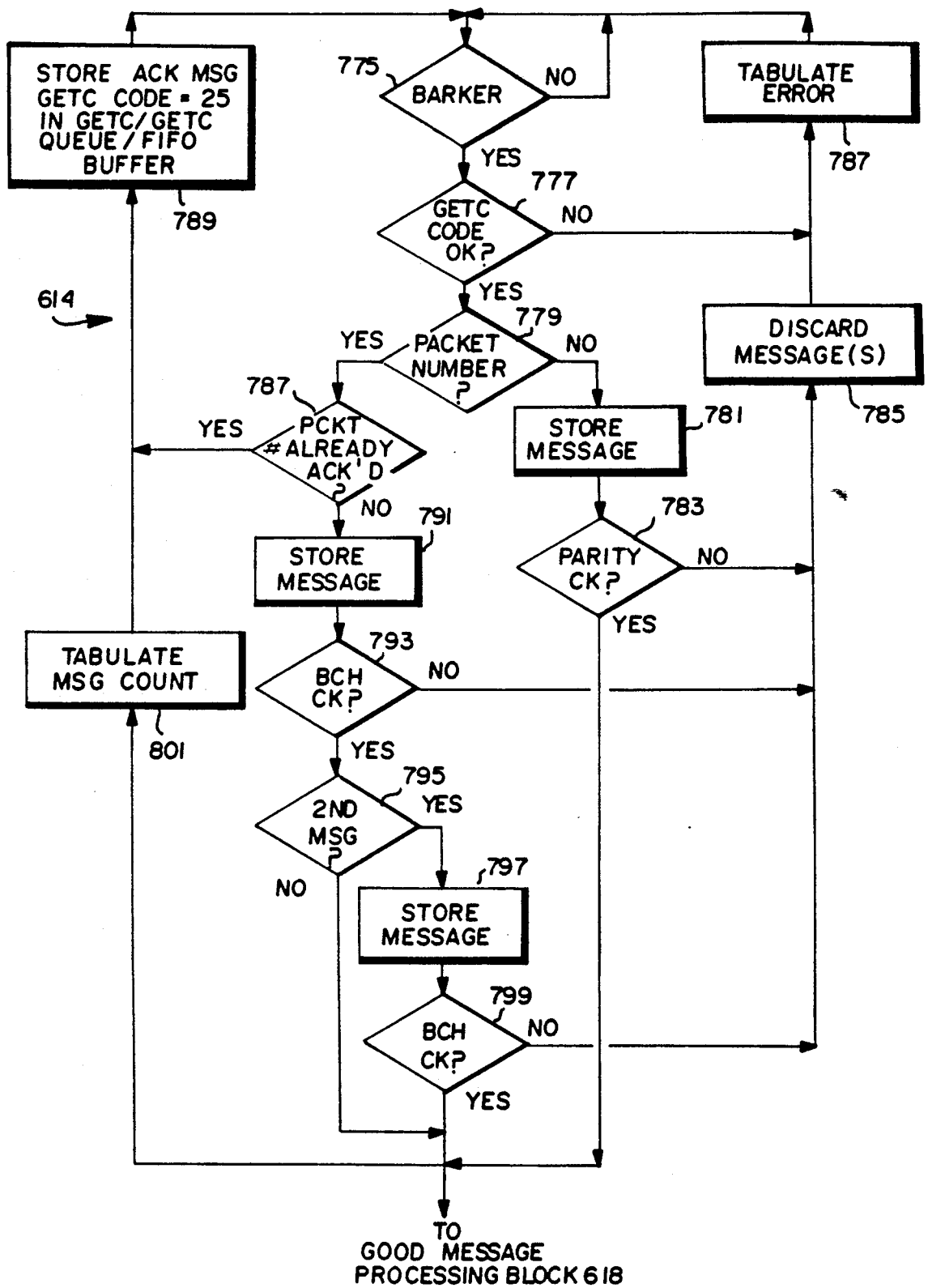
FIG. 13 DLTC-TO-SWITCH TC RECEIVE LOGIC

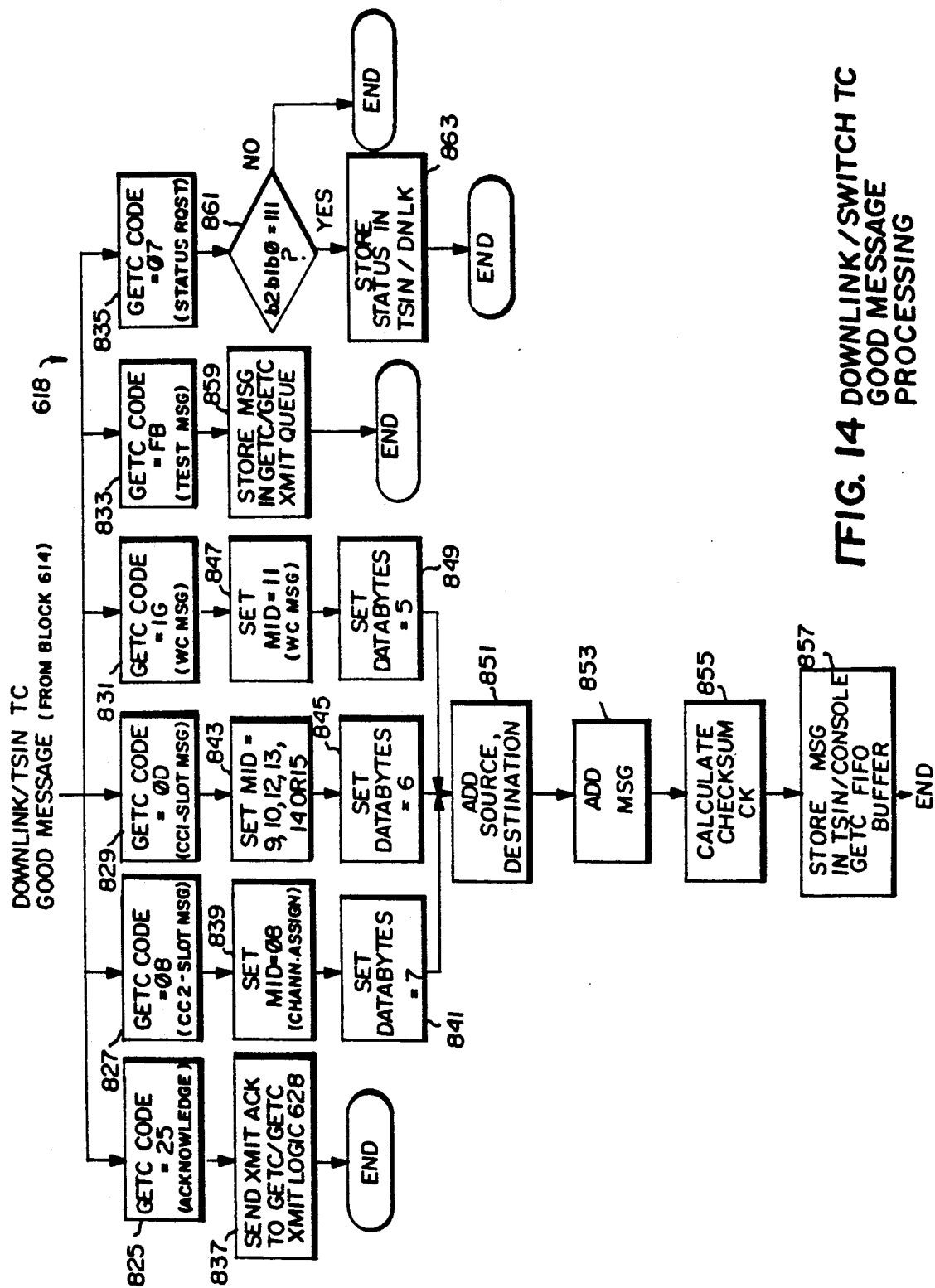
FIG. 14 DOWNLINK/SWITCH TC GOOD MESSAGE PROCESSING

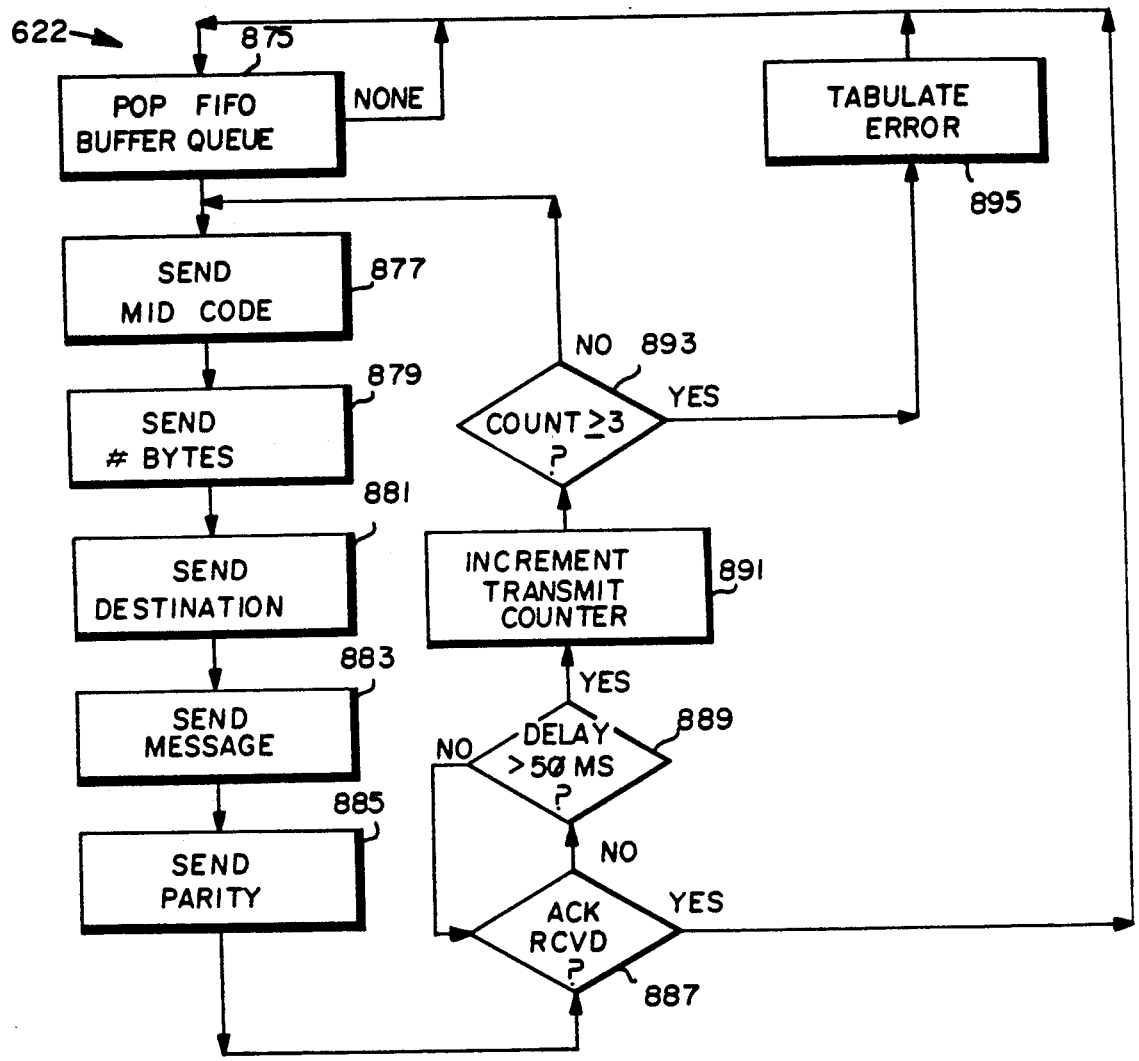
FIG. 15 SWITCH TC-TO-SWITCH TRANSMIT LOGIC

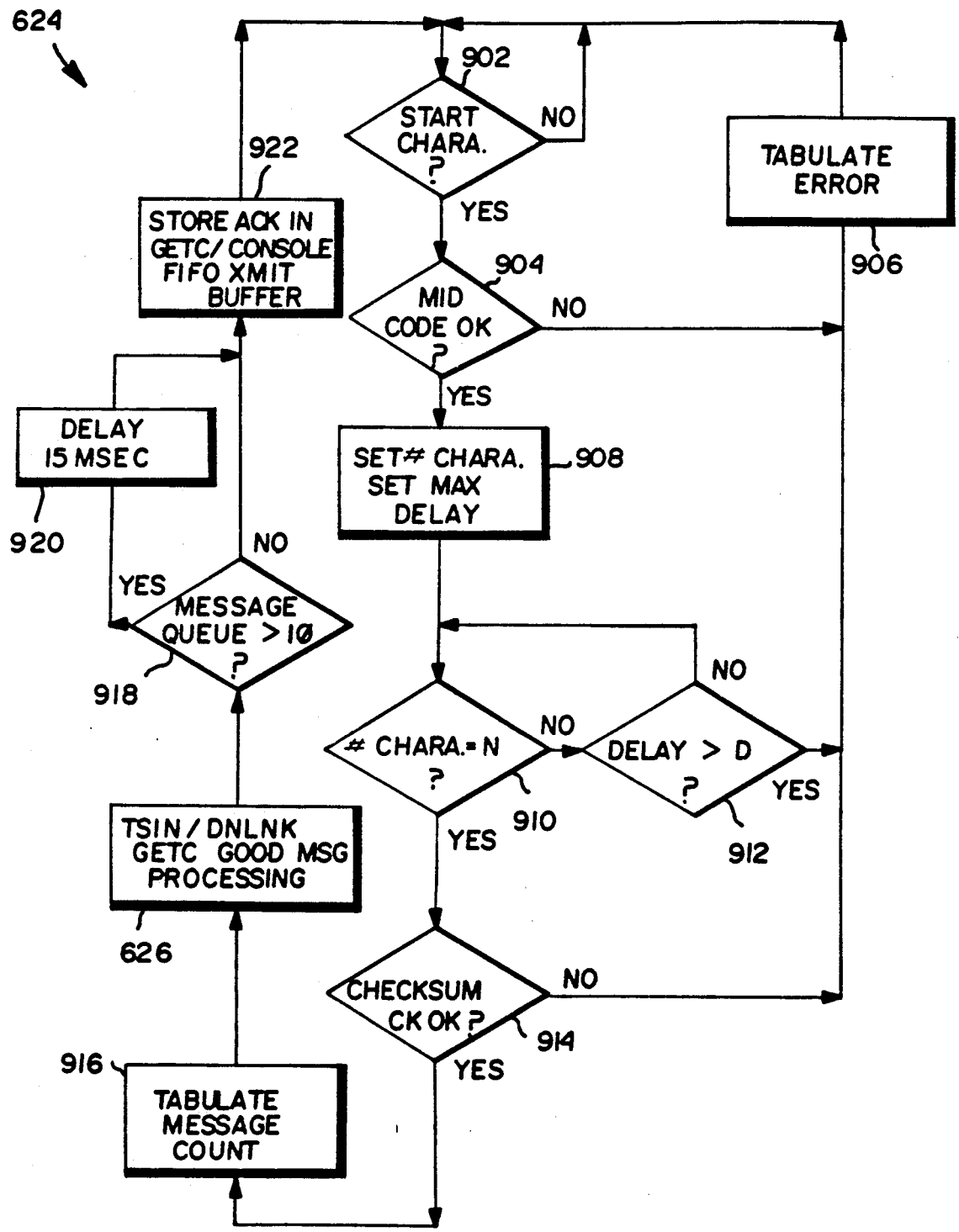
FIG. 16 SWITCH-TO-SWITCH TC RECEIVE LOGIC

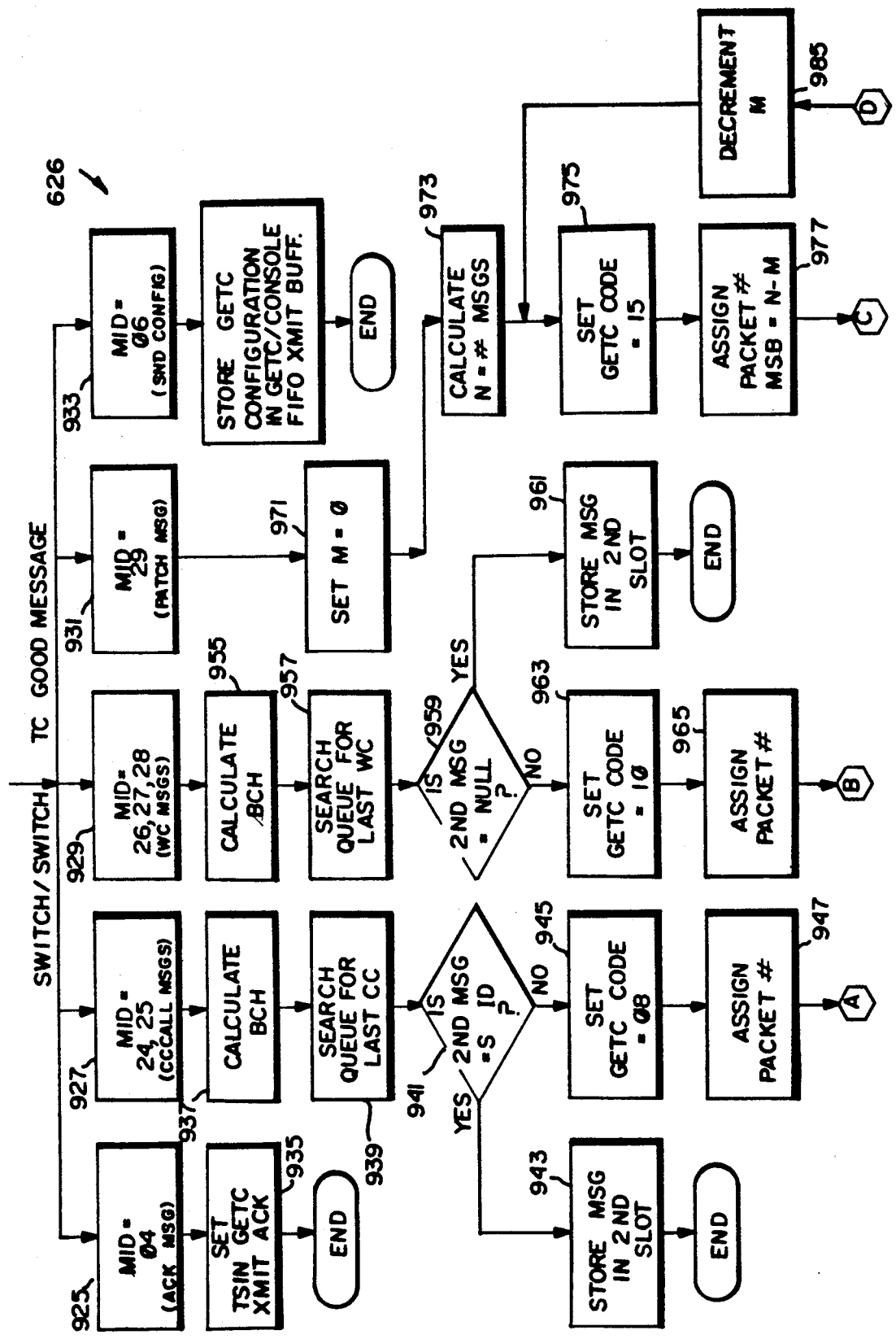
FIG. 17A SWITCH/SWITCH TC RECEIVED MESSAGE PROCESSING

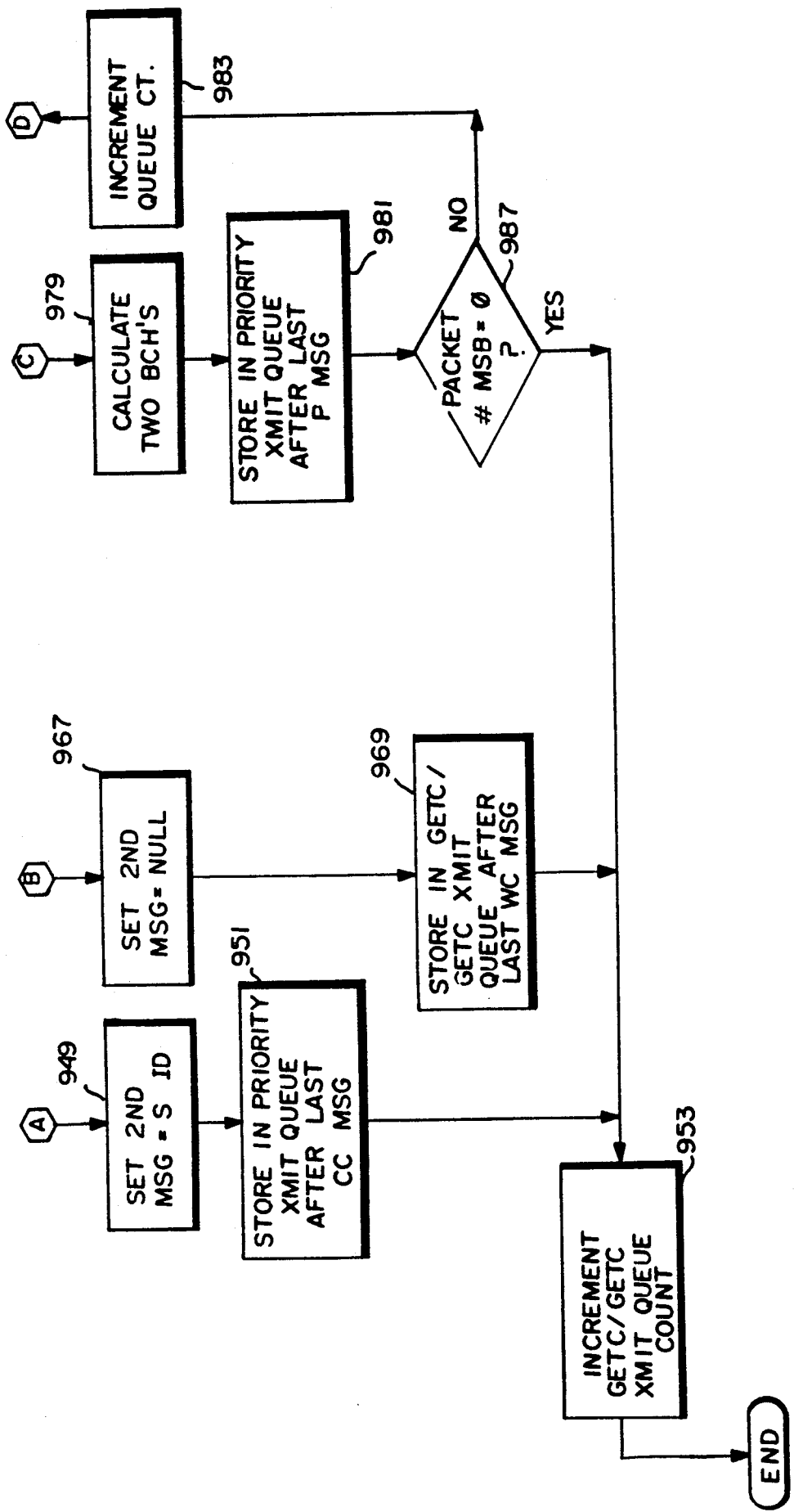
FIG. 17B SWITCH/SWITCH TC RECEIVED MSG PROCESSING

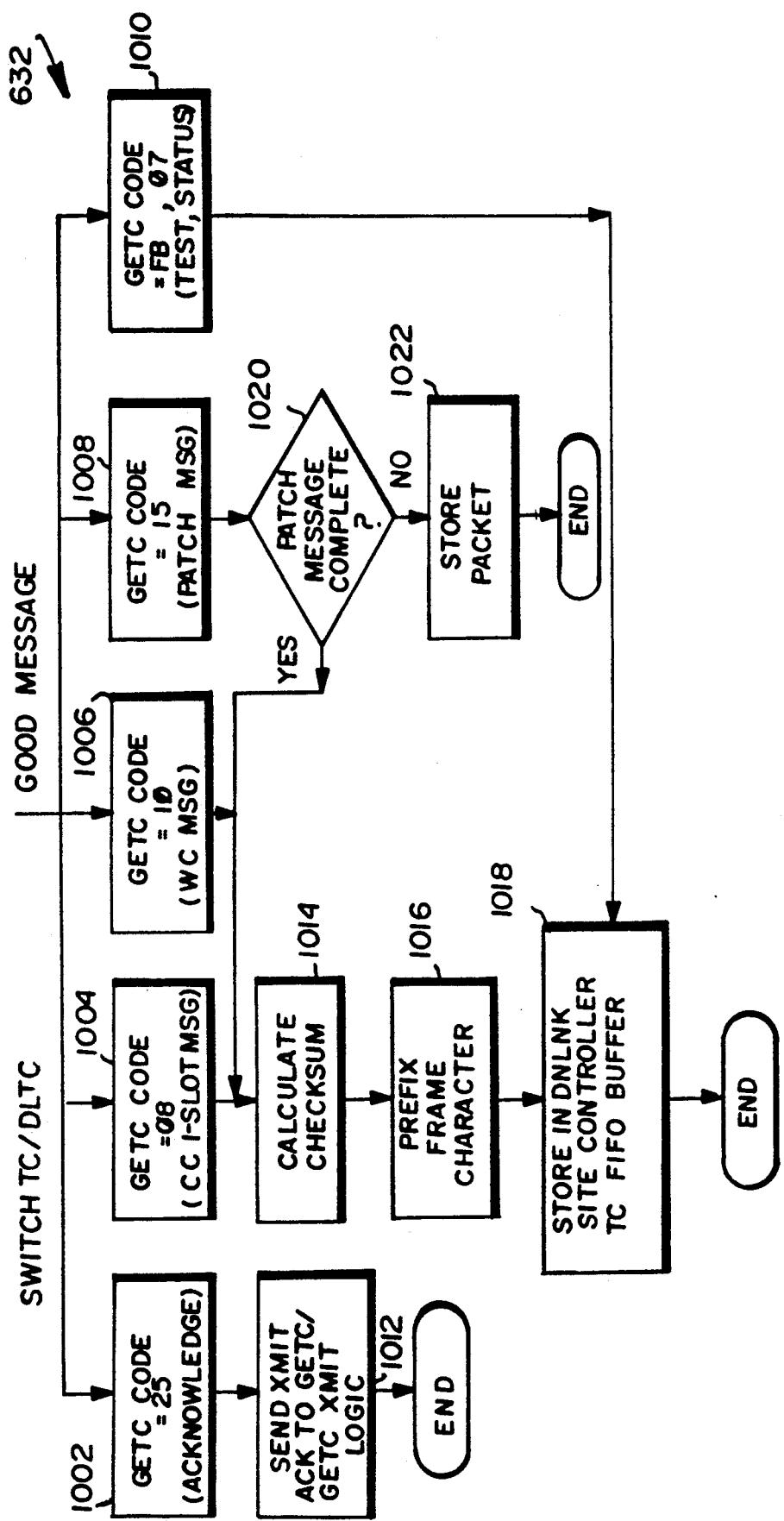
FIG. 18 SWITCH TC/DOWNLINK GETC GOOD MESSAGE PROCESSING

PROCESSOR-TO-PROCESSOR COMMUNICATIONS PROTOCOL FOR A PUBLIC SERVICE TRUNKING SYSTEM

CROSS-REFERENCES TO RELATED APPLICATIONS

This application is a divisional of Ser. No. 07/085,572, filed Aug. 14, 1987 now U.S. Pat. No. 4,835,731, filed Aug. 14, 1987.

This application is related to the following commonly-assigned U.S. patent applications all filed on Jun. 3, 1987: application Ser. No. 056,922, now U.S. Pat. No. 4,905,302, of Childress et al entitled "Trunked Radio Repeater System"; application Ser. No. 057,046, now U.S. Pat. No. 4,817,585, of Childress et al entitled "Failsoft Architecture for Public Trunking System"; application Ser. No. 056,924, now U.S. Pat. No. 4,821,292 of Childress entitled "Adaptive Limiter/Detector Which Changes Time Constant Upon Detection of Dotting Pattern"; application Ser. No. 056,923, now U.S. Pat. No. 4,905,234 of Childress et al entitled "Apparatus and Method for Transmitting Digital Data Over a Radio Communications Channel". This application is also related to the following commonly-assigned copending applications filed on Aug. 14, 1987: application Ser. No. 07/085,490, now U.S. Pat. No. 4,903,262 of Dissosway et al entitled "Mobile Radio Interface"; application Ser. No. 07/085,491 now U.S. Pat. No. 4,926,496 of Hall et al entitled "Radio Trunking Fault Detection System"; and application Ser. No. 07/085,491 now U.S. Pat. No. 4,926,496 of Cole et al entitled "A Method for Infrequent Radio Users to Simply Obtain Emergency Assistance".

The disclosures of each of these related copending patent applications are incorporated by reference herein.

This invention is generally related to the art of trunked radio repeater systems. The invention more particularly relates to such repeater systems using digital control signals transmitted over a dedicated control channel while also using plural working channels which are assigned temporarily for use by individual mobile radio units.

The trunking of radio repeaters is well known. Early trunking systems used analog control signals while some more recent systems have utilized digital control signals. Control signals have been used on a dedicated control channel and/or on different ones of the working (voice) channels for various different reasons and effects. A non-exhaustive but somewhat representative sampling of publications and patents describing typical prior art trunked radio repeater systems is set forth below:

U.S. Pat. No. 3,292,178 Magnuski (1986)
U.S. Pat. No. 3,458,664 R. H. Adlhoch et al (1969)
U.S. Pat. No. 3,571,519 Tsimbidis (1971)
U.S. Pat. No. 3,696,210 Peterson et al (1972)
U.S. Pat. No. 3,906,166 Cooper et al (1975)
U.S. Pat. No. 3,936,616 DiGianfilippo (1976)
U.S. Pat. No. 3,970,801 Ross et al (1976)
U.S. Pat. No. 4,001,693 Stackhouse et al (1977)
U.S. Pat. No. 4,010,327 Kobrinetz et al (1977)
U.S. Pat. No. 4,012,597 Lynk, Jr. et al (1977)
U.S. Pat. No. 4,022,973 Stackhouse et al (1977)
U.S. Pat. No. 4,027,243 Stackhouse et al (1977)
U.S. Pat. No. 4,029,901 Campbell (1977)
U.S. Pat. No. 4,128,740 Graziano (1978)
U.S. Pat. No. 4,131,849 Freeburg et al (1978)
U.S. Pat. No. 4,184,118 Cannalte et al (1980)
U.S. Pat. No. 4,231,114 Dolikian (1980)
U.S. Pat. No. 4,309,772 Kloker et al 1982
U.S. Pat. No. 4,312,070 Coombes et al (1982)
U.S. Pat. No. 4,312,074 Pautler et al (1982)
U.S. Pat. No. 4,326,264 Cohen et al (1982)
U.S. Pat. No. 4,339,823 Predina et al (1982)
U.S. Pat. No. 4,347,625 Williams (1982)
U.S. Pat. No. 4,360,927 Bowen et al 1982
U.S. Pat. No. 4,400,585 Kaman et al 1983
U.S. Pat. No. 4,409,687 Berti et al (1983)
U.S. Pat. No. 4,430,742 Milleker et al (1984)
U.S. Pat. No. 4,430,755 Nadir et al (1984)
U.S. Pat. No. 4,433,256 Dolikian (1984)
U.S. Pat. No. 4,450,573 Noble (1984)
U.S. Pat. No. 4,485,486 Webb et al (1984)
U.S. Pat. No. 4,578,815 Persinotti (1985)

Bowen et al is one example of prior art switched channel repeater systems which avoid using a dedicated control channel—in part by providing a handshake with the repeater site controller from a seized "idle" working channel before communication with a called unit(s) is permitted to proceed.

There are many actual and potential applications for trunk radio repeater systems. However, one of the more important applications is for public service trunked (PST) systems. For example, a single system of trunked radio repeaters may be advantageously used by an entire metropolitan area to provide efficient radio communications between individual radio units within many different agencies. Each agency may, in turn, achieve efficient communication between individual units of different fleets or sub-units (e.g., the police department may have a need to provide efficient communications between different units of its squad car force, different portable units assigned to foot patrolmen, different units of detectives who are narcotics agents, and the like). Sometimes it may be important to communicate simultaneously with predefined groups of units (e.g., all units, all squad cars, all foot patrolmen, etc.). At the same time, other agencies (e.g., the fire department, the transportation department, the water department, the emergency/rescue services, etc.) may be in need of similar communication services. As is well known to those familiar with trunking theory, a relatively small number of radio repeaters can efficiently service all of these needs within a given geographical area if they are trunked (i.e., shared on a "as-needed" basis between all potential units).

The potential advantages of trunked radio repeater systems for public services is so well recognized that an organization known as the Association of Public-Safety Communications Officers, Inc. (formerly the Association of Police Communications Officers) (APCO) has developed a set of highly desirable features for such a system commonly known as the "APCO-16 Requirements." A complete listing and explanation of such requirements may be found in available publications known to those in the art.

An advantageous trunked radio repeater system is described in copending, commonly-assigned application Ser. No. 056,922, now U.S. Pat. No. 4,905,302 of Childress et al entitled "Trunked Radio Repeater System" filed Jun. 3, 1987. That application described a trunked radio repeater system architecture in which the RF "control shelf" which receives and transmits radio frequency signals for a particular working or control channel is controlled by a microprocessor-based "trunking card" (hereafter referred to as a "GETC"—General Electric Trunking Card) which performs the signal processing functions associated with the control shelf and RF channel. A primary site controller (e.g., a minicomputer) is connected to various trunking cards, and receives digital signals from and sends digital signals to the various trunking cards. The primary site controller performs the control functions of the system (during normal system operations)—and thus performs tasks such as call logging, dynamic regrouping, and "patch" coordination as well as other, more route control functions such as assigning channels to new calls. One or more dispatch consoles also connected to the primary site controller generate messages requesting services from the primary site controller and also monitor the status of the entire system via messages sent to it from the site controller.

The dispatcher console(s) is a critical part of the repeater system since it coordinates virtually all communications on the system and is often directly involved in system communications transactions. While mobile units sometimes call other mobile units to establish mobile unit-to-mobile unit communications, a large portion of the communications traffic handled by the system is between a human dispatcher at the console and an individual or group of mobile units. The dispatcher console is the "nerve center" of the repeater system and coordinates and monitors system operation. Although some of the advance features provided by the repeater system are performed automatically, other advanced features require direct manual intervention by a dispatcher. Reliable and rapid communication of control signals between the dispatcher console and the a primary site controller is therefore of utmost importance.

The present invention provides a means for communicating signals between processors in a digitally trunked radio frequency repeater system. More particularly, the present invention provides method and apparatus for communicating signals between a central site controller and an RF channel signal processing module; and also between the site controller and a radio repeater system dispatcher console via a "downlink".

BRIEF DESCRIPTION OF THE DRAWINGS

These and other features and advantages of the invention will be better and more completely understood by referring to the following detailed description of presently preferred exemplary embodiments in conjunction with the appended sheets of drawings, of which:

FIGS. 1 and 1A are schematic block diagrams of an overall trunked radio repeater system 100 of an embodiment of the present invention;

FIG. 9 is an overall schematic flowchart of exemplary program control steps performed by the downlink trunking card and the switch trunking card shown in FIG. 2 to propagate signals over the downlink; and FIGS. 10-18 are more detailed schematic flowcharts of the exemplary program control steps shown in FIG. 9.

DETAILED DESCRIPTION OF THE PRESENTLY PREFERRED EXEMPLARY EMBODIMENTS

Figure 1:
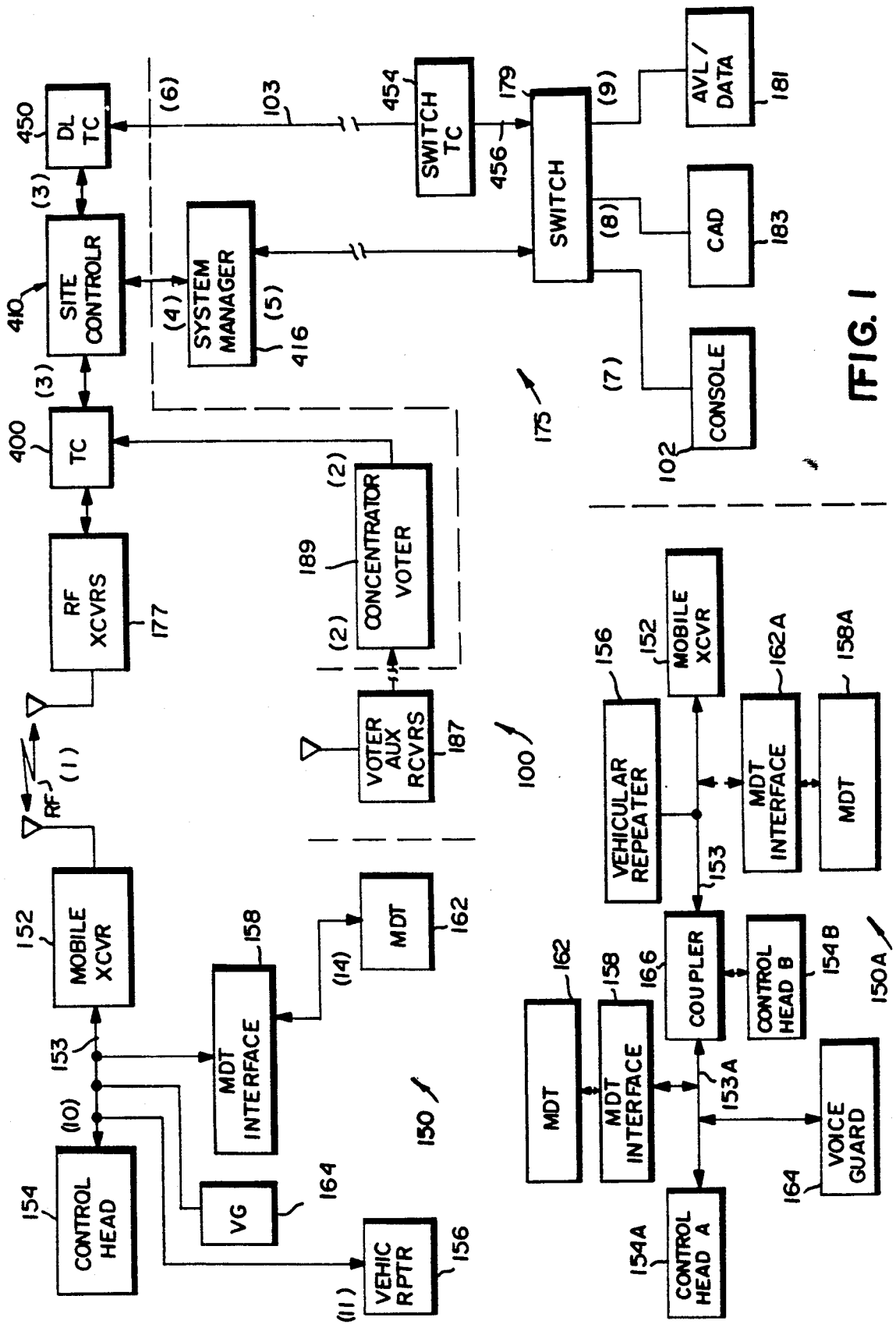

Table of Contents 1.0 OVERALL SYSTEM ARCHITECTURE
2.0 CENTRAL SITE ARCHITECTURE
3.0 INTERFACE BETWEEN TRUNKING CARDS AND SITE CONTROLLER 410
   3.1 OVERALL STRUCTURE AND OPERATION OF THE TRUNKING CARDS
   3.2 STRUCTURE OF SERIAL DATA LINKS BETWEEN SITE CONTROLLER 410 AND TRUNKING CARDS
   3.3 SERIAL DATA LINK PROTOCOL
4.0 DOWNLINK ARCHITECTURE
5.0 TYPES OF DOWNLINK MESSAGES
   5.1 GLOBAL DOWNLINK MESSAGES
      5.1.1 CONTROL CHANNEL GLOBAL DOWNLINK MESSAGES
      5.1.2 WORKING CHANNEL GLOBAL DOWNLINK MESSAGES
      5.1.3 PATCH GLOBAL DOWNLINK MESSAGES
   5.2 ADMINISTRATIVE DOWNLINK MESSAGES
6.0 DATA TRANSLATION ON THE DOWNLINK
   6.1 DATA TRANSLATION OF SITE SOURCED GLOBAL MESSAGES
   6.2 DATA TRANSLATION OF CONSOLE SOURCED GLOBAL MESSAGES
7.0 EXEMPLARY PROGRAM CONTROL STEPS
   7.1 SITE CONTROLLER 410 INTERACTION WITH TRUNKING CARDS
      7.1.1 MESSAGE TRANSMISSION ON LINKS 412
      7.1.2 RECEPTION BY SITE CONTROLLER 410 OF MESSAGES TRANSMITTED BY DLTC 450
   7.2 STEPS PERFORMED BY DLTC 450 AND SWITCH TC 454
      7.2.1 TRANSMISSION OF MESSAGES FROM SITE CONTROLLER 410 TO SWITCH 457
      7.2.2 TRANSMISSION OF MESSAGES FROM SWITCH 457 TO SITE CONTROLLER 410
8.0 GENERAL DISCUSSION OF MESSAGE DEFINITIONS AND FORMATS
9.0 MESSAGES ON LINKS 412 BETWEEN SITE CONTROLLER 410 AND TRUNKING CARDS 400-408, 450
   9.1 TYPES OF MESSAGES COMMUNICATED BETWEEN SITE CONTROLLER 410 AND THE TRUNKING CARDS OVER LINKS 412
   9.2 "ADMINISTRATIVE" MESSAGES ON LINKS 412 ORIGINATED BY SITE CONTROLLER 410
      9.2.1 GETC SETUP COMMAND (01 HEX)
      9.2.2 GETC BROADCAST COUNT (02 HEX)

9.2.3 GETC STATUS REQUEST (07 HEX)
9.2.4 GETC FAILSOFT MODE (F8 HEX)
9.2.5 GETC TEST MESSAGE (FB HEX)
9.2.6 GETC RESET MESSAGE (FD HEX)
9.3 RETRANSMIT LAST MESSAGE (FE HEX)
9.4 ADMINISTRATIVE MESSAGES TRANSMITTED FROM TRUNKING CARDS TO SITE CONTROLLER 410 OVER LINKS 412
 9.4.1 GETC SETUP RESPONSE (01 HEX)
 9.4.2 GETC BROADCAST COUNT (02 HEX)
 9.4.3 GETC STATUS RESPONSE (07 HEX)
 9.4.4 GETC PRESENT STATE (F9 HEX)
 9.4.5 GETC TEST MESSAGE (FB HEX)
 9.4.6 RETRANSMIT LAST MESSAGE (FE HEX)
9.5 GLOBAL MESSAGES ON LINKS 412 ORIGINATED BY SITE CONTROLLER 410
 9.5.1 OUTBOUND CONTROL CHANNEL SINGLE SLOT MESSAGE (OD HEX)
 9.5.2 OUTBOUND CONTROL CHANNEL ASSIGNMENT (08 HEX)
 9.5.3 OUTBOUND WORKING CHANNEL RADIO PROGRAMMING MESSAGE (19 HEX)
 9.5.4 OUTBOUND CONTROL CHANNEL CONCATENATED MESSAGE (OB HEX)
 9.5.5 OUTBOUND WORKING CHANNEL REPEAT AUDIO ENABLE/DISABLE (1A HEX)
 9.5.6 OUTBOUND WORKING CHANNEL DROP MESSAGE (1C HEX)
 9.5.7 TRANSMIT FCC STATION IDENTIFICATION (F7 HEX)
9.6 GLOBAL MESSAGES ON LINKS 412 TRANSMITTED BY TRUNKING CARDS 450 TO SITE CONTROLLER 410
 9.6.1 INBOUND CONTROL CHANNEL MESSAGE (08 HEX)
 9.6.2 INBOUND WORKING CHANNEL MESSAGE (10 HEX)
10.0 MESSAGES ON LANDLINE LINE 452 BETWEEN DOWNLINK TRUNKING CARD 450 AND SWITCH TRUNKING CARD 454
 10.1 ADMINISTRATIVE MESSAGES CARRIED BY LANDLINE LINK 452 BETWEEN DLTC 450 AND SWITCH TC 454
  10.1.1 WORKING CHANNEL CONFIGURATION MESSAGE
  10.1.2 DOWNLINK CHANNEL CONFIGURATION MESSAGE
  10.1.3 CONTROL CHANNEL CONFIGURATION MESSAGE
  10.1.4 ACKNOWLEDGE MESSAGE
  10.1.5 NOT ACKNOWLEDGE MESSAGE
 10.2 GLOBAL MESSAGES ORIGINATED BY SITE CONTROLLER 410 WHICH ARE COMMUNICATED OVER LANDLINE LINK 452 FROM DLTC 450 TO SWITCH TC 454
  10.2.1 SINGLE SLOT CONTROL CHANNEL MESSAGE
  10.2.2 TWO-SLOT CONTROL CHANNEL MESSAGE
  10.2.3 WORKING CHANNEL MESSAGE
  10.2.4 PATCH/SIMU-SELECT COLLECTION ACKNOWLEDGE MESSAGE
  10.2.5 PATCH/SIMUL-SELECT ACTIVATE/DEACTIVATE MESSAGE
 10.3 CONSOLE ORIGINATED GLOBAL MESSAGES CARRIED BY LANDLINE 452 FROM SWITCH TC 454 TO DLTC 450
  10.3.1 SINGLE SLOT CONTROL CHANNEL MESSAGE
  10.3.2 WORKING CHANNEL MESSAGE
  10.3.3 PATCH/SIMUL-SELECT COLLECTION MESSAGE
  10.3.4 PATCH/SIMUL-SELECT ACTIVATE/DEACTIVATE MESSAGE
11.0 MESSAGES ON LINK 456 BETWEEN SWITCH 457 AND SWITCH TC 454
 11.1 ADMINISTRATIVE MESSAGES CARRIED BY LINK 456 BETWEEN SWITCH 457 AND SWITCH TRUNKING CARD 454
  11.1.1 WORKING CHANNEL CONFIGURATION MESSAGE
  11.1.2 DOWNLINK CHANNEL CONFIGURATION MESSAGE
  11.1.3 CONTROL CHANNEL CONFIGURATION MESSAGE
  11.1.4 ACKNOWLEDGE MESSAGE
  11.1.5 NOT ACKNOWLEDGE ("NEGATIVE") MESSAGE
  11.1.6 SEND CONFIGURATION MESSAGE
 11.2 LINK 456 GLOBAL MESSAGES ORIGINATED BY SWITCH 457 (CONSOLE 102) AND TRANSMITTED BY SWITCH TO SWITCH TC 454
  11.2.1 GROUP CALL MESSAGE
  11.2.2 INDIVIDUAL CALL MESSAGE
  11.2.3 UNKEY MESSAGE
  11.2.4 ACTIVATE PATCH ID REQUEST MESSAGE
  11.2.5 DEACTIVATE PATCH ID REQUEST MESSAGE
  11.2.6 MODIFY PATCH ID ASSIGNMENT MESSAGE
  11.2.7 EMERGENCY STATUS ALERT MESSAGE
  11.2.8 EMERGENCY CHANNEL REQUEST MESSAGE
  11.2.9 STATUS PAGE MESSAGE
  11.2.10 AP RESET MESSAGE
  11.2.11 CANCEL EMERGENCY MESSAGE
 11.3 LINK 456 GLOBAL MESSAGES ORIGINATED BY SITE CONTROLLER 410 AND TRANSMITTED FROM SWITCH TC 454 TO SWITCH 457
  11.3.1 CHANNEL ASSIGNMENT MESSAGE
  11.3.2 UNIT KEY MESSAGE
  11.3.3 UNKEY/CHANNEL DEASSIGNMENT MESSAGE
  11.3.4 DEACTIVATE PATCH ID MESSAGE
  11.3.5 ASSIGN GROUP ID TO PATCH ID MESSAGE
  11.3.6 ASSIGN INDIVIDUAL ID TO PATCH ID MESSAGE
  11.3.7 SITE ID MESSAGE
  11.3.8 CHANNEL UPDATE MESSAGE
  11.3.9 ACTIVATE PATCH ID MESSAGE
  11.3.10 PATCH COLLECTION ACKNOWLEDGE MESSAGE
  11.3.11 EMERGENCY CHANNEL UPDATE MESSAGE
  11.3.12 EMERGENCY CHANNEL ASSIGNMENT MESSAGE
  11.3.13 STATUS MESSAGE 11.3.14 SITE CONTROLLER 410 RESET MESSAGE 12.0 APPENDIX I—GLOSSARY OF MESSAGE FIELD DEFINITIONS

1.0 OVERALL SYSTEM ARCHITECTURE

An exemplary trunked radio repeater system 100 in accordance with an embodiment of this invention is generally depicted in FIG. 1. System 100 includes at least one (and typically many) mobile (or portable) radio transceiving stations 150 and an RF repeater station 175. Mobile transceiving station 150 communicates via an RF link and repeater station 175 with other mobile transceiving stations and/or with landbased parties connected to the repeater station by conventional dial-up landlines.

Repeater station 175 includes a site controller 410, individual repeater channel transceivers 177, and a multiplexing telephone interconnection network ("switch", or "MTX") 179. Site controller 410 is preferably a mainframe digital computer which oversees the general operation of repeater station 175. In particular, site controller 410 controls the operation of RF transceivers 177 by transmitting digital signals to and receiving digital signals from "trunking cards" ("TC") 400 connected between the site controller and individual transceivers (although only one transceiver 177 and one trunking card 400 are shown in FIG. 1, there typically are many such trunking card/transceiver combinations in repeater station 175—one for each RF channel the repeater station operates on.

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager console/computer station 416 is connected to site controller 410 and to switch 179 to allow a system manager to oversee and control the overall operation of system 100.

A remote receiver 187 and associated concentrator/voter 189 may be connected to trunking card 400 to allow so-called "RSSI" signal strength measurements to be based on the stronger of the signal level received at the central repeater station site and the signal level received at a remote site—thereby increasing the quality and reliability of the selected received audio.

An RF link ("RF") connects RF transceivers 177 with mobile transceiving stations 150. Mobile station 150 is capable of transmitting digitized voice or digital data signals (encrypted or unencrypted) to and receiving such signals from repeater station 175 over the RF link.

In the configuration shown in the upper left-hand portion of FIG. 1, mobile station 150 includes a mobile RF transceiver 152 connected to a control head 154 via a serial digital bus 153. Mobile transceiver may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm.

In the alternate mobile radio configuration shown in the lower left-hand corner of FIG. 1, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 100. There may be multiple dispatch consoles 102 (one for each separate fleet of mobile/portable units) and a master or supervisory dispatch console for the entire system if desired.

2.0 CENTRAL SITE ARCHITECTURE

Referring now more particularly to FIG. 1A, a transmitting antenna 200 and receiving antenna 202 (which may be a common antenna structure) are utilized at the central site with conventional signal combining/decombining circuits 204, 206 as will be apparent to those skilled in the art. Transmitting and receiving RF antenna circuitry 200-206 individually a plurality of duplex RF channel transmit/receive circuits included in a plurality of RF repeater "stations" 300, 302, 304, 306, etc. (there may typically be twenty such stations). Each station transmitter and receiver circuitry is typically controlled by a dedicated control shelf CS (e.g., a microprocessor-based control circuit) as is also generally depicted in FIG. 1A. Such control shelf logic circuits associated with each station are, in turn, controlled by trunking cards TC (further microprocessor-based logic control circuits) 400, 402, 404 and 406. The trunking cards 400-406 communicate with one another and/or with a primary site controller 410 via control links 412.

The primary site controller 410 (and optional backup controller if desired) may be a commercially available general purpose processor (e.g., PDP 11/73 processor with a 18 MHz-J11 chip set). Although the major "intelligence" and control capabilities for the entire system reside within controller 410, alternate backup or "failsoft" control functions may also be incorporated within the trunking cards 400-406 so as to provide continued trunked repeater service even in the event that controller 410 malfunctions or is otherwise taken out of service. More detail on such failsoft features may be found in commonly-assigned currently filed application Ser. No. 057,046 entitled "Failsoft Architecture for Public Trunking System".

Console 102 requests resources from site controller 410 by sending messages to the site controller over downlink 103. In response to console resource requests, site controller 410 allocates the requested resources and notifies the console 102 via downlink 103 messages that the requested resources have been allocated. Hence, site controller 410 may be considered a resource allocator, and console 102 may be considered a resource requestor.

For example, console 102 may request a resource in response to the following stimuli: a console push-to-talk button depression (indicating a dispatch operator has requested an RF channel); "simu-select" activation/deactivation, and "patch" activation and deactivation ("simu-select" and "patch" allow the console to call any selected collection of mobile radio transceiver individuals and/or groups by issuing a single call request). Since mobile radio transceivers can also request RF channels independently of console action in the preferred embodiment, RF channel assignment messages may be received by console 102 even though the console issued no channel requests (console 102 is able to monitor all mobile radio communications in the preferred embodiment.)

An optional telephone interconnect 414 may also be provided to the public switch telephone network. Typically, a system manager terminal, printer and the like 416 is also provided for overall system management and control (together with one or more dispatcher consoles 102). A special test and alarming facility 418 may also be provided as desired.

Figure 2:
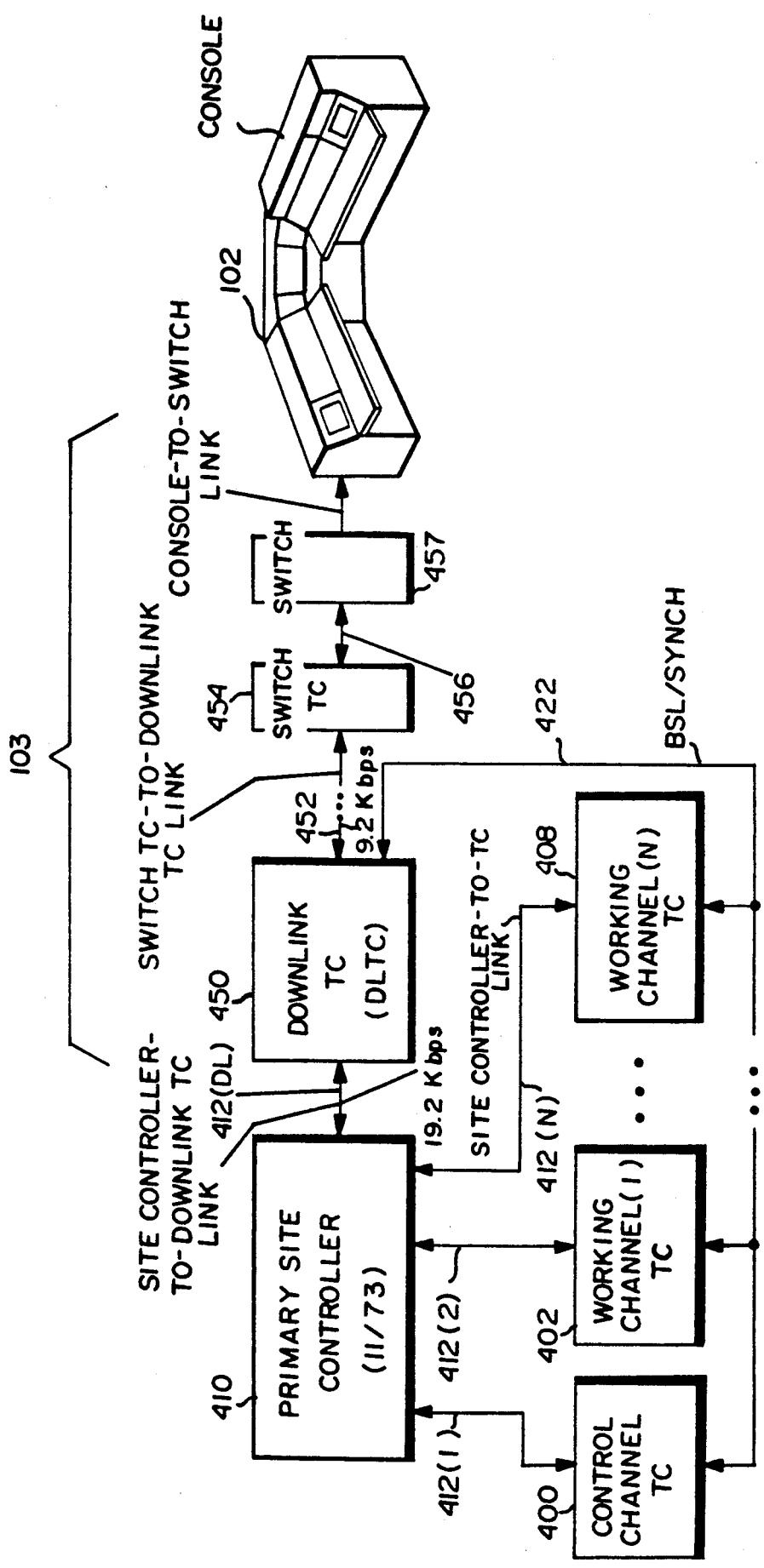
FIG. 2 is a more detailed block diagram of the signal path between the primary site controller and the dispatcher console shown in FIG. 1A.

A slightly more detailed view of the site architecture for control data communication is shown in FIG. 2. Here, the PDP 11/73 controller 410 is seen to communicate over 19.2 kilobit per second (kbps) RS232 serial links 412 (1)–412 (N) with up to 25 trunking control cards TC controlling respective duplex repeater circuits in those individual channels. In the preferred embodiment, each link 412 is independent of the other links. Another high-speed 19.2 kilobit per second bus 420 is used to communicate with the hardware that supports a downlink 103 to/from the switch 457 and dispatch console 102.

At each controlled repeater channel, the 19.2 kilobit data bus 412 is monitored by an 8031 processor in the trunking card TC associated with that channel. The TC (trunking card) exercises control over the control shelf CS and of its associated repeater with audio, signalling and control buses. The trunking cards receive hard-wired inputs providing clock synchronization and a "failsoft" indication over a backup serial link (BSL) synchronization line 422 (which in the preferred embodiment is actually a high-speed serial data link and a single wire synchronization line). Such a "failsoft" indication indicates that normal control by the central controller 410 is not available and that an alternate distributed control algorithm should be implemented within each of the trunking card modules TC.

In the preferred embodiment, dispatch console is typically not located at the location of site controller 410. This is because site controller 410 should be placed very close to the RF control shelves CS—which are preferably located at a high elevation (e.g., on the top of the skyscraper or high hill or mountain) so as to maximize the RF coverage and effective radiated power (erp) of the repeater transceivers. Console 102, on the other hand, is generally located where it can be conveniently accessed by people responsible for communicating with the mobile units (e.g., at police headquarters, the building in which the county or city government offices are housed, etc.). Since the dispatch console 102 is generally located some distance away from site controller 410, a segment of the downlink communications path 103 between the site controller and the console constitutes a land line or microwave link in the preferred embodiment.

Switch 457 in the preferred embodiment includes a conventional telephone switch ("MTX") which routes audio and other signal paths between dispatch console 102, standard TELCO lines (not shown), and RF control shelves CS. Switch 457 may, for example, route audio between an RF control shelf CS and another control shelf; between a control shelf and a console 102 speaker/microphone; or between a control shelf and a telephone line.

Switch 457 performs such audio path routing in a conventional manner in response to digital control messages transmitted on downlink 103. Switch 457 includes a main processor which performs a variety of functions, including handling all downlink 103 communications tasks and passing appropriate signals between the console 102 and the downlink 103. Switch 457 in the preferred embodiments supports several dispatch consoles 102, and routes downlink messages to the appropriate console (or to all of the consoles in the case of some downlink messages).

3.0 INTERFACE BETWEEN TRUNKING CARDS AND SITE CONTROLLER 410

3.1 Overall Structure and Operation of the Trunking Cards

Detailed discussions of the structure and operation of RF trunking cards 400–408 and downlink trunking card 450 are found in the following copending applications both filed Jun. 3, 1987: Application Ser. No. 056,922 of Childress et al entitled "Trunked Radio Repeater System"; and Application Ser. No. 057,046 of Childress et al entitled "Failsoft Architecture for Public Trunking System". Those discussions are hereby incorporated herein by reference.

As mentioned previously, trunking cards 400–408 are located at respective associated repeater control shelves CS to provide control channel and working channel processing, while the downlink trunking card ("DLTC") 450 is used in downlink 103 to provide a communications path between the site controller and switch 457. A further switch trunking card ("SWITCH TC") 454 located at or near switch 457 communicates signals between DLTC 450 and switch 457.

Briefly, all of the RF trunking cards 400–408, DLTC 450 and switch TC 454 are identical in structure in the preferred embodiment—each being a microprocessor-based control module which executes program control software and communicates with site controller 410 via a 19.2 kbps RS-232 serial link (except switch TC 450 which does not communicate directly with the site controller 410 and communicates instead with switch 457). Any trunking card TC may operate as either a RF control channel trunking card, a RF working channel trunking card, a downlink trunking card, or a switch trunking card in the preferred embodiment.

RF control channel trunking cards perform signal processing functions associated with an RF repeater operating on a RF control channel. RF working channel trunking cards perform signal processing functions associated with an RF repeater operating on an RF working channel (or associated with a digital voice guard landline link connecting the site with switch 457). Downlink trunking cards and switch trunking cards perform signal processing functions assocated with downlink 103 (which communicates messages between switch 457 and site controller 410).

Every trunking card in the preferred embodiment stores the program control software it needs to operate as a control channel, working channel, downlink and switch trunking card. Upon power up or reset of system 100, each trunking card at least initially operates as a working channel trunking card in the preferred embodiment. The trunking cards are commanded to become a control channel or downlink by the site controller after power-up.

Site controller 410 is also capable of dynamically reconfiguring each trunking card in system 100 to provide control channel, working channel, or downlink channel processing. For example, upon power-up, site controller 410 transmits a message to each trunking card 400–408, 450 informing the respective trunking cards that they are to execute the software controlling them to operate as RF control channel, RF working channel and downlink trunking cards, respectively. Each trunking card is enabled/disabled from site operations as well as being "steered" to the appropriate site controller (i.e., primary site controller 410, or an optional backup site controller). To dynamically reconfigure a trunking card, site controller 410 sends a configuration message to the trunking card positively requesting the trunking card to configure itself (i.e., beging executing the software associated with) a particular function. For example, if the control channel trunking card and/or associated repeater fails, the site controller 410 can command a working channel trunking card to reconfigure itself to become a control channel trunking card.

Site controller 410 periodically sends status messages to the trunking cards to determine their identities, modes of operation, and which site controller they are steered to. Site test functions are also performed by the trunking cards in response to messages sent to them by site controller 410.

Site controller 410 is also capable of individually testing and resetting any trunking card if a major malfunction occurs in system 100. The test mode allows the trunking card to exercise the site controller serial interface, and the hardware ports of the trunking card—all using a test pattern designated by the site controller. For downlink trunking card 450, additional diagnostics allow exercising of the modem which connects the trunking card to landline link 452.

During normal operation, the trunking cards pass informational messages to site controller 410 over high-speed serial data links 412, and execute commands received from the site controller over the same links. Site controller 410 performs system control functions through downlink trunking card 450 and trunking cards 400–408. However, the trunking cards are also capable of a backup trunked mode of operation without intervention from any site controller (master or backup) via a backup serial link (see U.S. Application Ser. No. 057,046 of Childress et al entitled "Failsoft Architecture For Public Trunking System").

3.2 Structure of Serial Data Links Between Site Controller 410 and Trunking Cards Control channel trunking card 400, working channel trunking cards 402–408, and downlink trunking card 450 each communicate with site controller 410 via independent high-speed serial data links 412. The communications path between site controller 410 and any (each) of the trunking cards includes an asynchronous serial RS-232C bus. The message protocol on these serial buses supports control channel, working channel and downlink channel processing using both a fixed length and a variable length message packet. The message protocol also provides an efficient error recovery scheme in the presence of noise.

Both the trunking cards and the primary site controller 410 support the level conversion necessary for an RS-232C communications device. The serial link 412 between site controller 410 and each trunking card is full-duplex to support concurrent bidirectional device-to-device communications, and has a transmission speed in both the transmit and the receive directions of 19.2 kbps. Link 412 (dl) between site controller 410 and DLTC 450 is identical in structure and operation to any link 412 between the site controller and an RF trunking card 400–408. Data is transmitted over links 412 in bytes consisting of one start bit, eight binary data bits, and one stop bit. The eight bit binary data is transmitted with the least significant bit first and the most significant bit last.

Figure 3:
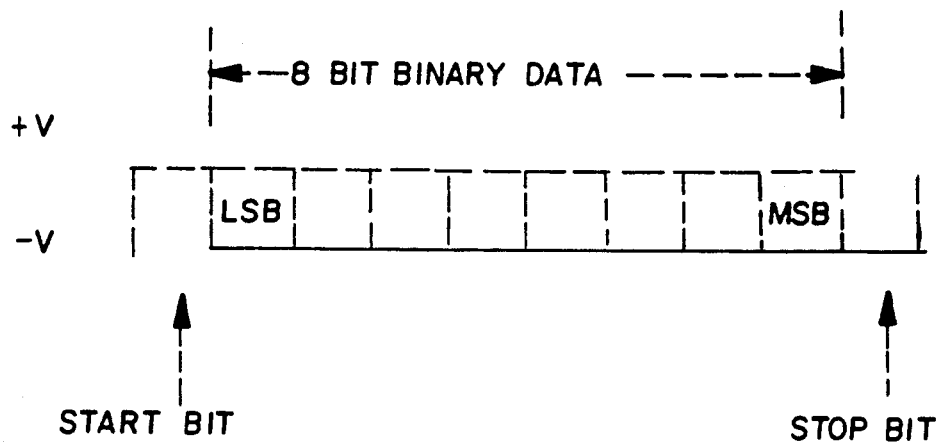
FIGS. 3 and 4 are schematic diagrams of message formats transmitted over the downlink shown in FIG. 2.

FIG. 3 is a schematic diagram of an exemplary signalling message (byte) format used to communicate messages over links 412.

Link 412 itself is a 3-wire circuit including a transmit data line, a receive data line and a signal ground line. The site controller serial interface corresponding to each link 412 is configured as a data terminal with a 25-pin connector using pins 2, 3 and 7 as the bus transmitted data, bus received data and signal ground, respectively. The following is a detailed electrical description of each serial data link 412:

RS-232C electrical interface.

Three wire asynchronous communication: transmit, receive and signal ground.

Transmit and receive signals are bipolar.

Minimum transmit level is $+-5$ to $+-15$ volts.

Maximum output resistance for transmit driver is 300 ohms.

Minimum receiver threshold is $+-3$ volts.

Maximum receiver input voltage is $+-25$ volts.

Receiver input impedance is 3 k to 7 k ohms.

Maximum cable length is 25 feet at 19.2K bit/sec data rate.

Maximum 30 V/microseconds slew rate.

3.3 Serial Data Link Protocol

Data is transferred over links 412 at a data rate of 19.2K bit/sec. The bit time is 52.08 microsecond. On receive, the bit must be sampled with at least a x16 clock with a 15 out of 16 stability hit rate. One start bit is used, and one stop bit is used. Eight bit binary data is transmitted over the link (see FIG. 3).

Figure 4:
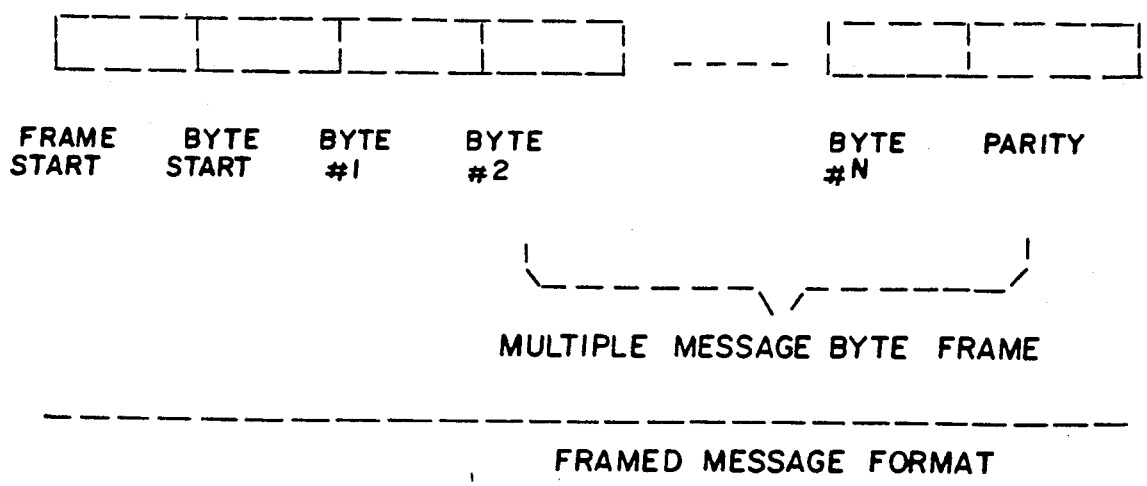

FIG. 4 is a schematic diagram of the frame format used for communicating data over links 412. The frame start character denotes the start of the specified message block is being transferred. The destination device examines this character to allow decoding of the following message start character. The frame start character thus delimits the beginning of a new frame and is also used to acquire frame synchronization in a noisy message environment where bit and message framing errors may result. In the preferred embodiment, the frame start character is AA (hex).

The message start character indicates the type of message that is being transferred from the "source device" to the "destination device" (the ("source device") being the one of site controller 410 and the trunking card transmitting message over link 412, and the "destination device" being the one receiving the message). This character indicates what type of command or response is being generated by the source device. The frame start character is sufficiently different from any of the employed message start characters in order to aid error detection and correction schemes employed in both site controller 410 and in the trunking cards.

The number of message data bytes varies with the type of message start byte. Message data bytes may contain command information, response information, or data information as will be shown in table 1 shortly.

The checksum byte character provides a check sum indication of the entire message block. Checksum is generated and detected by forming the negation of the exclusive-OR of the message start byte and the message data bytes. If the checksum byte received by the destination device is the same as the checksum calculated by the destination device, the destination device generally transmits an acknowledge message alerting the source device that a correct version of the message has been received. On the other hand, if the checksum byte received by the destination device does not check with calculated checksum, a retransmission of the previous message frame is requested by the destination device (e.g., by sending a "no-acknowledge" message or no acknowledge message at all).

Message bit and message framing errors may occur in a noisy communication medium. Normally, a request for a retransmission of the source's previous message would be invoked by the destination device upon occurrence of such an error. A source device will retransmit the same frame a maximum of three times in the preferred embodiment.

4.0 DOWNLINK ARCHITECTURE

Referring now to FIG. 2, in the preferred embodiment, site controller 410 is connected via 19.2 kbps link 412 (dl) to downlink trunking card 450. Downlink trunking card 450 is a microprocessor-based control module which in the preferred embodiment is identical in structure to trunking cards 400–408 (although the software it executes controls it to perform message handling functions not performed by the RF channel trunking cards). Downlink trunking card 450 is connected to a 9.6 kbps landline link 452 the other end of which is connected to a so-called "switch trunking card" 454. The switch trunking card 454 connects to a main processor within switch 457 via a high-speed 19.2 kbps link 456. Each of links 420, 452 and 456 are bidirectional in the preferred embodiment, and each use different digital signalling protocols.

Because the data transfer rate of the (local high speed) site controller 410-to-downlink trunking card link 412 (dl) is greater than the data transfer rate over the SWITCH TC 454-to-downlink trunking card 450 landline link 452, the downlink trunking card 450 must buffer messages it receives over link 412 (dl) and then retransmit them over link 452 as link 452 becomes available. Similarly, because the data transfer rate over (local high speed) link 456 (between switch 457 and the switch trunking card 454) is greater than the data transfer rate over the trunking card-to-trunking card landline link 452, the switch trunking card 454 must buffer data it receives from the switch before transmitting it over link 452. The communications protocol used on link 452 must be as efficient as possible to prevent this link from becoming a "bottleneck" for data being transferred between site controller 410 and switch 457.

Downlink trunking card 450 and switch trunking card 454 do more than merely buffer control signals in the preferred embodiment, for an entirely different communications protocol and message format are used on each of links 412, 452 and 456.

Downlink trunking card 450 and switch trunking card 454 communicate with one another using a format which is virtually identical to the format described in commonly assigned application Ser. No. 056,922 of Childress et al used by control channel trunking card 400 and working channel trunking cards 402–408 to communicate via RF channels with mobile units. The message format used on high speed link 412 (dl) to communicate between site controller 410 and downlink trunking card 450 is identical in the preferred embodiment to the message format described previously used for communication over links 412 between the site controller 410 and trunking cards 400–408. The message format and communications protocol used on link 456 to communicate between switch trunking card 454 and switch 457, on the other hand, is different from the trunking card-to-trunking card communications format and protocols because the main processor within the switch uses entirely different message formats in the preferred embodiment.

Downlink trunking card 450 in the preferred embodiment translates between the message protocol of link 412 (dl) and the message protocol of link 452 and also compensates for the differences in data transfer rates of the two links. The switch trunking card 454 performs message protocol translation and data rate compensation in order to interface links 452 and 456. These translations are accomplished reliably and efficiently without degrading overall data transfer rate between site controller 410 and switch 457.

In addition, the downlink 103 between site controller 410 and console 102 in the preferred embodiment may provide message prioritization so that more important messages are assured of being transferred before less important messages. Message prioritization insures that the lesser data transfer rate of link 452 cannot degrade overall system response time even under very heavy message loading of downlink 103.

Data is exchanged between switch 457 and switch trunking card 454 over a 19.2 kbps console-to-SWITCH TC link 456 using a "transmit and wait" for acknowledgement protocol. If no acknowledgement is received within 50 milliseconds, the transmitting unit times out and retransmits the message (giving up after it has transmitted the message three times). Acknowledgements are not sent to the console 102 by the switch trunking card 454 if the switch trunking card receive buffer queue contains more than four messages even though the message from the console 102 is received correctly (this technique being used to prevent messages from "piling up" in the switch trunking card receive buffer).

The messages transmitted on link 456 are framed for transmission as follows:

TABLE 1

| Byte Number | Character |
|---|---|
| 1 | Message ID number |
| 2 | Number of data bytes |
| 3,4 | Source, destination bytes |
| 5–n | Message bytes (variable length) |
| n+1 | Checksum character |

Administrative messages do not use source and destination bytes. Each byte is transmitted on an asynchronous basis using one start and one stop bit (10-bit characters) at a 19.2-kbps rate.

Both console-to-SWITCH TC link 456 and the site controller-to-downlink trunking card link 412 (dl) have data transmission rates which exceed that of the landline link 452. Moreover, acknowledgement messages must be transmitted over the landline link 452 in addition to the other messages. Buffers are provided within downlink trunking card 450 and switch trunking card 454 to smooth the flow of messages and to maximize data transfer rate over landline link 452. If the buffers containing messages being transmitted from console 102 to site controller 410 become nearly full, the flow of messages from the console 102 to the site controller can be slowed by delaying acknowledgement by switch trunking card 454 of messages received from the console 102.

To reduce the chance that urgent console messages become "stuck" in the switch trunking card buffer and are not rapidly communicated to site controller 410, the switch trunking card 454 may transmit messages it receives from console 102 in the following predetermined priority:

(1) Retransmission packets (first)
(2) Acknowledgement messages (second)
(3) Control channel messages (third)
(4) Working channel messages (fourth)
(5) Patch messages (fifth)
(6) Administrative messages (last).

Overflow of messages produced by site controller 410 is prevented when the downlink trunking card 450 receive buffer becomes full by delaying message acknowledgements returned from the downlink trunking card to the site controller. Packets requiring retransmission and acknowledgement messages are always transmitted over landline link 452 before other messages in the buffer.

Figure 8:
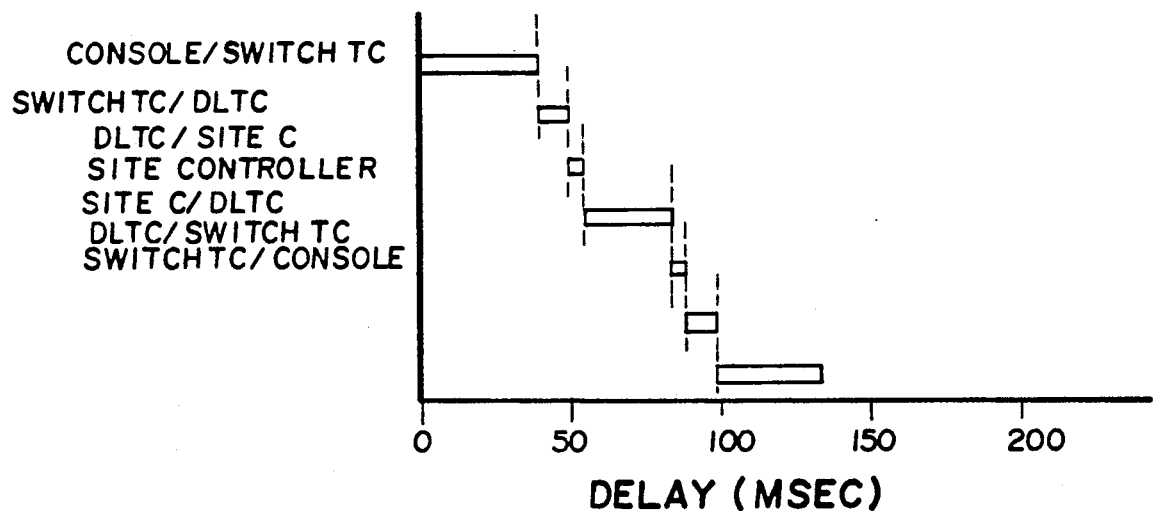
FIG. 8 is a timing diagram showing signal propagation delays over the FIG. 2 downlink.

FIG. 8 is a schematic diagram of estimated transmission delay over the downlink 103 in the case of a simple group call with no activity on the downlink before the message is sent. If all dispatchers should simultaneously request a call, the downlink would deliver the request to the site controller at the rate of one request every 15 milliseconds. Thus, the site controller 410 26 millisecond processing time in the preferred embodiment becomes the limiting delay, and the downlink 103 is capable of delivering messages to site controller 410 more rapidly than the site controller is capable of processing them.

5.0 TYPES OF DOWNLINK MESSAGES

Messages communicated on downlink 103 can be classified into two main types: (1) "global" messages, and (2) "administrative" messages.

5.1 Global Downlink Messages

Global messages are messages which originate at switch 457 and are intended to be received by site controller 410, or are originated at the site controller for intended receipt by the switch. That is, all global messages propagate along the entire downlink 103 and are used to convey information between the site controller 410 and the switch 457. When either DLTC 450 or switch TC 454 receives a global message, it passes the message along (after translating same as will be explained) down the downlink 103 for eventual receipt by either site controller 410 or switch 179.

Examples of "global" messages include messages from the console requesting the site controller to assign a channel and call an individual or group of mobile radio transceivers; and messages from the site controller informing the console that a channel has unkeyed.

There are three types of global messages in the preferred embodiment: working channel messages, control channel messages, and patch messages. As will become apparent, there is a direct relationship between control channel and working channel downlink messages and the messages that are transmitted on the control and working RF channels. "Patch" global messages have no corresponding RF message equivalent, and are used to define and control special "patch" groups (allowing, for example, a console operator to temporarily define a collection of individual and/or groups of mobile transceivers as members of a "patch" group so that the entire patch group can be called using a single console call command).

5.1.1 Control Channel Global Downlink Messages

Downlink control channel messages correspond to signals which are to be (or have been) transmitted over the RF control channel by an RF channel trunking card.

In the preferred embodiment, mobile units which are not actually engaged in active communications on a working channel monitor the control channel and await instructions. To access a working channel, a mobile unit transmits a general request on the system inbound control channel, and site controller 410 responds by transmitting a channel assignment message on the outbound control channel via control channel repeater trunking card 400 (this channel assignment message instructing the mobile unit to retune to the assigned working channel). Similarly, if a dispatcher at the console 102 wishes to contact a specific mobile unit, he or she inputs a channel request message which in the preferred embodiment is handled by site controller 410 in a manner which is very similar to the way the site controller handles mobile-originated channel requests.

Console-originated downlink messages which involve control channel activity are classified as "control channel" downlink messages, and similarly, site controller-originated messages which involve both the control channel and the console are also categorized as "control channel" messages. Such downlink control channel messages include, for example, messages originated by console 102 requesting a group of mobile units or an individual mobile unit to retune to a working channel, and messages originated by site controller 410 informing the console of a successful working channel assignment to a mobile unit or group, or indicating a mobile unit request for communications with a dispatcher, and messages informing the console of a change of status of an ongoing working channel assignment (e.g., channel unkey, or change of working channel frequency). For example, the "site id" message may be categorized as a global control channel message because the RF control channel trunking card 400 controls its associated RF repeater to transmit a similar message over the RF control channel in the preferred embodiment.

5.1.2 WORKING CHANNEL GLOBAL DOWNLINK MESSAGES

Downlink working channel type messages relate directly to the activity of a working channel. A working channel global message is typically communicated from the site controller 410 to switch 179 corresponding to each working channel message the site controller causes to be transmitted on an RF working channel in order to continuously update the switch (and the console) with working channel status. An example of a global working channel message is the unkey message originated by a mobile unit 150 on a working channel.

5.1.3 PATCH GLOBAL DOWNLINK MESSAGES

System 100 in the preferred embodiment includes a "patch" facility which allows a dispatcher to flexibly organize individuals and groups of mobile units into temporary groups called "patches." Mobile units are already preprogrammed in the preferred embodiment to respond to predetermined individual and group identification codes transmitted over the control channel. For example, the mobile transceiver installed onboard a police detective's unmarked car may respond to an individual unit identification code corresponding to all homicide mobile units; to another group identification code corresponding to all police units; and to an individual call identification code corresponding to that specific unit.

Sometimes, however, it may be necessary to call all homicide detectives, all police units within a specific squad, and certain individual crime investigation units all at the same time without calling all police units. The preferred embodiment permits a dispatcher to specify a temporary "patch identification" corresponding to whatever collection of group and/or individual mobile units are desired to be included in the call. Once this "patch identification" has been specified, the dispatcher can call all units within the specified collection by depressing a single patch transmit button on console 102. Primary site controller 410 then automatically controls the control channel trunking card 400 to transmit the appropriate individual and group call messages over the control channel, directing all mobile units within the prespecified "patch" collection to tune to a free working channel. The downlink supports certain patch commands which allow console 102 to create, modify and deactivate such special patches.

5.2 ADMINISTRATIVE DOWNLINK MESSAGES

Administrative downlink messages are messages which do not propagate the entire length of downlink 103 between site controller 410 and switch 457. These administrative messages are "overhead" messages used to keep downlink 103 operating properly, and do not carry useful information between the site controller and the switch 457. Administrative messages are used, for example, to inquire about the status of the downlink and also to acknowledge correct receipt of downlink messages.

For example, some administrative messages originate at one of trunking cards 450 and 454 and are intended to be received by the other trunking card. Other administrative messages are generated by site controller 410 and are intended to be received by DLTC 450 and/or switch TC 454, but not by switch 457. Still other administrative messages are generated by switch 457 and are intended to be received by switch TC 454 and/or DLTC 450, but not by site controller 410.

Examples of administrative messages are acknowledgement messages transmitted by DLTC 450 to site controller 410 acknowledging correct receipt of a data byte previously transmitted by the site controller; and messages transmitted by the site controller to the DLTC and to switch TC 454 causing those trunking cards to "configure" themselves in the operational modes required for them to support downlink communications.

6.0 DATA TRANSLATION ON THE DOWNLINK

The protocols used on links 420, 452 and 456 are all different from one another in the preferred embodiment. For example, data on the site controller-to-downlink trunking channel link 412(dl) is transmitted least-significant-byte and least-significant-bit first. On the landline link 452, the data is transmitted most-significant-byte and most-significant-bit first. On the link 456 between the switch trunking card 452 and switch 457, the most-significant-byte is transmitted first, but each byte is transmitted with its least-significant-bit first.

Downlink trunking card 450 in the preferred embodiment translates between the data format of link 412(dl) and the data format of link 452. Likewise, the switch trunking card 454 translates between the data format of link 452 and the data format of link 456. These translations are relatively transparent. For example, many such translations can be performed by storing received data in a buffer memory in the order it is received, and then reading the stored data in a different order. Other translations (e.g., those performed by switch TC 454 between link 456 and landline link 452) require mapping between "MID" operational codes (used by switch 457 and console 102) to corresponding "GETC" operational codes (used by downlink TC 450, site controller 410, and RF trunking cards 400–408).

The following tables 3–10 show field-by-field translations along the downlink 103 for various types of global messages. Field definitions are defined in the Appendix I, and the corresponding message formats are defined in the following discussion.

6.1 DATA TRANSLATION OF SITE SOURCED GLOBAL MESSAGES

There are three types of site sourced global messages: single slot control channel messages, two slot control channel messages and working channel messages. For each type of message, there is a table below showing how the types, bits and nibbles are moved between links 420, 452 and 456.

TABLE 2

| | CONTROL CHANNEL ONE-SLOT MESSAGE SITE CONTROLLER 410 → CONSOLE 102 | | |
|---|---|---|---|
| Byte | Link 412(dl) Site Messages | Link 452 Modem Message | Link 456 Console Messages |
| 0 | STB | BK1 | MID |
| 1 | GID | BK2 | TLY |
| 2 | OC1,OC2 | GID | SD1 |
| 3 | OC3,OC4 | PKT | SD2 |
| 4 | OC5,OC6 | OC1,OC2, | O,OC1 |
| 5 | OC7,O | OC3,OC4 | OC2,OC3 |
| 6 | CHK | OC5,OC6 | OC4,OC5 |
| 7 | STB | OC7,BC1 | OC6,OC7 |
| 8 | GID | BC2 | CHK |
| 9 | OC1,OC2 | OC1,OC2 | MID |
| 10 | OC3,OC4 | OC3,OC6 | TLY |
| 11 | OC5,OC6 | OC5,OC6 | SD1 |
| 12 | OC7,O | OC7,BK1 | SD2 |
| 13 | CHK | BC2 | O,OC1 |
| 14 | | | OC2,OC3 |
| 15 | | | OC4,OC5 |
| 16 | | | OC6,OC7 |
| 17 | | | CHK |

NOTE:
BXx, BC2, MID, GID, TLY, SDx CHK, PKT, STB FIELDS ARE BYTE WIDE.
OCx FIELDS ARE NIBBLE WIDE.
TWO SITE MESSAGES CAN BE PACKED INTO ONE MODEM MESSAGE.
ONE MODEM MESSAGE CAN BE UNPACKED INTO TWO CONSOLE MESSAGES.

TABLE 3

WORKING CHANNEL MESSAGE
SITE CONTROLLER 410 → CONSOLE 102

| Byte | Link 412(dl) Site Messages | Link 452 Modem Message | Link 456 Console Messages |
|---|---|---|---|
| 0 | STB | BK1 | MID |
| 1 | GID | BK2 | TLY |
| 2 | OW1,OW2 | GID | SD1 |
| 3 | OW3,OW4 | PKT | SD2 |
| 4 | OW5,O | OW1,OW2 | O,OW1 |
| 5 | CHK | OW3,OW4 | OW2,OW3 |
| 6 | STB | OW5,BC1 | OW4,OW5 |
| 7 | GID | BC2 | CHK |
| 8 | OW1,OW2 | OW1,OW2 | MID |
| 9 | OW3,OW4 | OW3,OW4 | TLY |
| 10 | OW5,O | OW5,BC1 | SD1 |
| 11 | CHK | BC2 | SD2 |
| 12 | | | O,OW1 |
| 13 | | | OW2,OW3 |
| 14 | | | OW4,OW5 |
| 15 | | | CHK |

NOTE:
BKx, BC2, MID, GID, TLY, SDx CHK, PKT, STB FIELDS ARE BYTE WIDE.
OWx FIELDS ARE NIBBLE WIDE.
TWO SITE MESSAGES CAN BE PACKED INTO ONE MODEM MESSAGE.
ONE MODEM MESSAGE CAN BE UNPACKED INTO TWO CONSOLE MESSAGES.

TABLE 4

TWO-SLOT CONTROL CHANNEL MESSAGE
SITE CONTROLLER 410 → CONSOLE 102

| Byte | Link 412(dl) Site Messages | Link 452 Modem Message | Link 456 Console Messages |
|---|---|---|---|
| 0 | STB | BK1 | MID |
| 1 | GID | BK2 | TLY |
| 2 | OCA,OCB | GID | SD1 |
| 3 | OCC,OCD | PKT | SD2 |
| 4 | OCE,OCF | OCA,OCB | O,OCA |
| 5 | OCG,OCH | OCC,OCD | OCB,OCC |
| 6 | OCI,O | OCE,OCF | OCD,OCE |
| 7 | CHK | OCG,OCH | OCF,OCG |
| 8 | | OCI,BC1 | OCH,OCI |
| 9 | | BC2 | CHK |

NOTE:
BKx, BC2, MID, GID, TLY, SDx CHK, PKT, STB FIELDS ARE BYTE WIDE.
OCx FIELDS ARE NIBBLE WIDE.
ONE CONSOLE MESSAGE CAN BE PACKED INTO ONE MODEM MESSAGE.
EACH MODEM MESSAGE IS UNPACKED INTO ONE SITE MESSAGE.

TABLE 5

ACTIVATE/DEACTIVATE MESSAGE
SITE CONTROLLER 410 → CONSOLE 102

| Byte | Link 412(dl) Site Message | Link 452 Modem Message | Link 456 Console Message |
|---|---|---|---|
| 0 | STB | BK1 | MID |
| 1 | GID | BK2 | TLY |
| 2 | PSS,RSVE | GID | SD1 |
| 3 | O,GRP | PKT | SD2 |
| 4 | GRP | PSS,RSVD | PSS,RSVD |
| 5 | CHK | O,GRP | O,GRP |
| 6 | | GRP | GRP |
| 7 | | CHK | CHK |

NOTE:
BKx, MID, GID, TLY, SDx CHK, PKT STB FIELDS ARE BYTE WIDE.
PSS FIELD IS ONE BIT WIDE.
RSVD FIELD IS SEVEN BITS WIDE.
GRP FIELD IS ELEVEN BITS WIDE.
ONE CONSOLE MESSAGE IS PACKED INTO ONLY ONE MODEM MESSAGE.
EACH MODEM MESSAGE IS UNPACKED INTO ONLY ONE SITE MESSAGE.

6.2 DATA TRANSLATION OF CONSOLE SOURCED GLOBAL MESSAGES

TABLE 6

CONTROL CHANNEL ONE-SLOT MESSAGE
CONSOLE 102 → SITE CONTROLLER 410

| Byte | Link 456 Console Messages | Link 452 Modem Message | Link 412(dl) Site Messages |
|---|---|---|---|
| 0 | MID | BK1 | STB |
| 1 | TLY | BK2 | GID |
| 2 | SD1 | GID | IC1,IC2 |
| 3 | SD2 | PKT | IC3,IC4 |
| 4 | O,IC1 | IC1,IC2 | IC5,IC6 |
| 5 | IC2,IC3 | IC3,IC4 | IC7,O |
| 6 | IC4,IC5 | IC5,IC6 | CHK |
| 7 | IC6,IC7 | IC7,BC1 | STB |
| 8 | CHK | BC2 | GID |
| 9 | MID | IC1,IC2 | IC1,IC2 |
| 10 | TLY | IC3,IC6 | IC3,IC4 |
| 11 | SD1 | IC5,IC6 | IC5,IC6 |
| 12 | SD2 | IC7,BC1 | IC7,O |
| 13 | O,IC1 | BC2 | CHK |
| 14 | IC2,IC3 | | |
| 15 | IC4,IC5 | | |
| 16 | IC6,IC7 | | |
| 17 | CHK | | |

NOTE:
BKx, BC2, MID, GID, TLY, SDx, STB, CHK, PKT FIELDS ARE BYTE WIDE.
ICx FIELDS ARE NIBBLE WIDE.
TWO CONSOLE MESSAGES CAN BE PACKED INTO ONE MODEM MESSAGE.
ONE MODEM MESSAGE CAN BE UNPACKED INTO TWO SITE MESSAGES.

TABLE 7

WORKING CHANNEL MESSAGE
CONSOLE 102 → SITE CONTROLLER 410

| Byte | Link 456 Console Messages | Link 452 Modem Message | Link 412(dl) Site Messages |
|---|---|---|---|
| 0 | MID | BK1 | STB |
| 1 | TLY | BK2 | GID |
| 2 | SD1 | GID | WC1,WC2 |
| 3 | SD2 | PKT | WC3,WC4 |
| 4 | O,WC1 | WC1,WC2 | WC5,O |
| 5 | WC2,WC3 | WC3,WC4 | CHK |
| 6 | WC4,WC5 | WC5,BC1 | STB |
| 7 | CHK | BC2 | GID |
| 8 | MID | WC1,WC2 | WC1,WC2 |
| 9 | TLY | WC3,WC4 | WC3,WC4 |
| 10 | SD1 | WC5,BC1 | WC5,O |
| 11 | SD2 | BC2 | CHK |
| 12 | O,WC1 | | |
| 13 | WC2,WC3 | | |
| 14 | WC4,WC5 | | |
| 15 | CHK | | |

NOTE:
BKx, BC2, MID, GID, TLY, SDx, CHK, PKT, STB FIELDS ARE BYTE WIDE.
WCx FIELDS ARE NIBBLE WIDE.
TWO CONSOLE MESSAGES CAN BE PACKED INTO ONE MODEM MESSAGE.
ONE MODEM MESSAGE CAN BE UNPACKED INTO TWO SITE MESSAGES.

TABLE 8

PATCH COLLECTION MESSAGE
CONSOLE 102 → SITE CONTROLLER 410

| Byte | Link 456 Console Message | Link 452 Modem Messages | Link 412(dl) Site Messages |
|---|---|---|---|
| 0 | MID | BK1 | STB |
| 1 | TLY | BK2 | GID |
| 2 | SD1 | GID | CNT,HDR,SPK |
| 3 | SD2 | CNT,HDR,SPK | O,GRP |
| 4 | O,GCT | O,GRP | GRP |
| 5 | ICT,LID | GRP | ICT,O |
| 6 | LID | ICT,BC1 | CHK |
| 7 | O,GRP | BC2 | STB |
| 8 | GRP | O,LID | GID |

TABLE 8-continued
PATCH COLLECTION MESSAGE
CONSOLE 102 → SITE CONTROLLER 410

| Byte | Link 456 Console Message | Link 452 Modem Messages | Link 412(dl) Site Messages |
|---|---|---|---|
| 9 | O,GRP | LID | O,LID |
| 10 | GRP | O,BC1 | LID |
| 11 | O,GRP | BC2 | O |
| 12 | GRP | | CHK |
| 13 | CHK | BK1 | STB |
| 14 | | BD2 | GID |
| 15 | | GID | O,GRP |
| 16 | | CNT,HDR,SPK | GRP |
| 17 | | O,GRP | O |
| 18 | | GRP | CHK |
| 19 | | O,BC1 | |
| 20 | | BC2 | |

NOTE:
BKx, BC2, MID, GID, TLY, SDx CHK, PKT, STB FIELDS ARE BYTE WIDE.
GCT, ICT, SPK FIELDS ARE NIBBLE WIDE.
LID FIELD IS TWELVE BITS WIDE.
GRP FIELD IS ELEVEN BITS WIDE.
CNT FIELD IS THREE BITS WIDE.
HDR FIELD IS ONE BIT WIDE.
ONE CONSOLE MESSAGE CAN BE PACKED INTO ONE OR MORE MODEM MESSAGES.
EACH MODEM MESSAGE IS UNPACKED INTO ONE OR MORE SITE MESSAGES.

TABLE 9
ACTIVATE/DEACTIVATE MESSAGE
CONSOLE 102 → SITE CONTROLLER 410

| Byte | Link 456 Console Message | Link 452 Modem Message | Link 412(dl) Site Message |
|---|---|---|---|
| 0 | MID | BK1 | STB |
| 1 | TLY | BK2 | GID |
| 2 | SD1 | GID | PSS,RSVD |
| 3 | SD2 | PKT | O,GRP |
| 4 | PSS,RSVD | PSS,RSVD | GRP |
| 5 | O,GRP | O,GRP | CHK |
| 6 | GRP | GRP | |
| 7 | CHK | CHK | |

NOTE:
BKx, MID, GID, TLY, SDx CHK, PKT, STB FIELDS ARE BYTE WIDE.
PSS FIELD IS ONE BIT WIDE.
RSVD FIELD IS SEVEN BITS WIDE.
GRP FIELD IS ELEVEN BITS WIDE.
ONE CONSOLE MESSAGE IS PACKED INTO ONLY ONE MODEM MESSAGE. ALL MODEM MESSAGES FOR A PATCH ARE PACKED INTO ONE SITE MESSAGE.

7.0 EXEMPLARY PROGRAM CONTROL STEPS

The following describes exemplary program control steps performed by site controller 410, RF trunking cards 400-408, DLTC 450, switch TC 454 and switch 457 to communicate messages over downlink 103 between the site controller and console 102 and between the site controller and the RF channel trunking cards.

7.1 SITE CONTROLLER 410 INTERACTION WITH TRUNKING CARDS

The following describes the manner in which the site controller 410 interacts with each of the various trunking cards.

Upon power up, site controller 410 transmits a message to the trunking cards informing the trunking card that they are to execute the appropriate software (e.g., control channel, working channel, or downlink software). In configuring the downlink trunking card 450, the site controller informs the trunking card how many active channels there are on system 100, and also direct the downlink trunking card to steer its communications to the backup site controller if necessary. The primary site controller 410 periodically sends status requests to downlink trunking card 450 to determine its identity, its mode of operation, and which site controller it is steered to.

Primary site controller 410 occasionally transmits a broadcast message count to downlink trunking card 450 in order to communicate the number of broadcast messages sent from the site controller to the downlink trunking card. Every trunking card in system 100 is responsible for keeping track of current system status information independently, and the broadcast message count helps to determine whether the various trunking cards have been accurately updated with current sytem status. The broadcast message count is incremented after every received broadcast-type message.

Whenever a bit or frame error occurs on link 412(dl), site controller 410 can request downlink trunking card 450 to retransmit the last message by simply not acknowledging receipt of the message. Site controller 410 is also capable of individually testing and resetting the downlink trunking 450 if a major malfunction occurs in system 100. The test mode allows downlink trunking card 450 to exercise its modem (which connects it to link 452) the site controller serial interface, and the hardware ports of the trunking card—all using a test pattern designated by the site controller.

Outbound downlink channel communications are handled by site controller 410 with the downlink trunking card 450 acting as a buffering device. On the receive side, status responses are sent to site controller 410 by downlink trunking card 450 to enable the site controller to determine whether the downlink trunking card is operating correctly. Inbound downlink channel messages from the dispatch console 102 are buffered by the downlink trunking card 450 and sent to the site controller. Messages are transferred over link 412(dl) in a framed format. Each character that is transmitted or received over link 412(dl) includes the 10-bit RS-232C serial data packet stream shown in FIGS. 3 and 4 (and described in detail above).

If downlink trunking card 450 has requested three subsequent retransmissions from site controller 410 after site controller has transmitted the synchronization sequence, the downlink trunking card enters the failsoft mode of operation. Site controller 410 transmits the synchronization sequence whenever it has to request the downlink trunking card to retransmit a frame more than twice.

7.1.1 Message Transmission on Links 412

Figure 5:
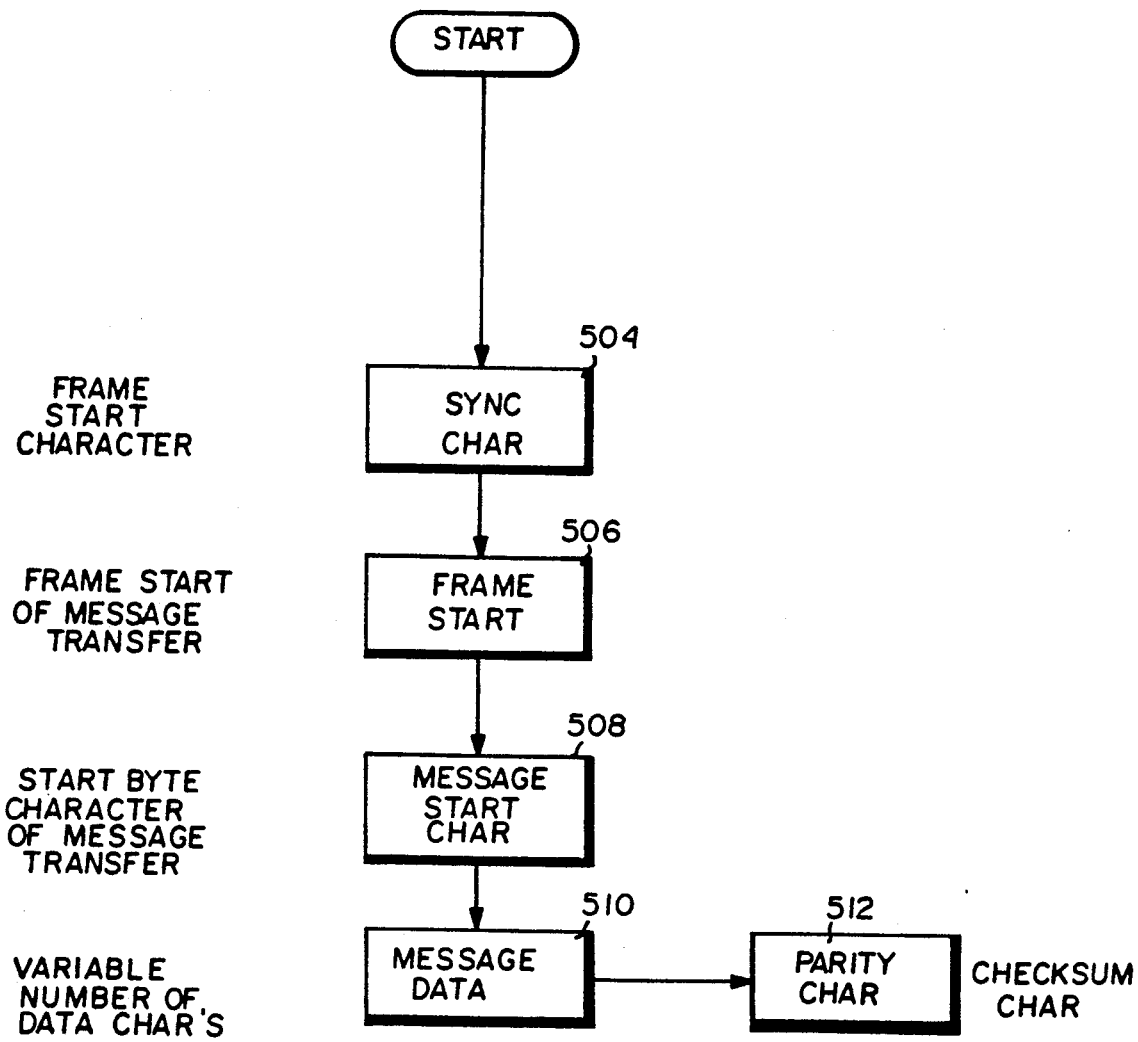
FIGS. 5-6 are schematic flowcharts of exemplary program control steps performed by the site controller shown in FIG. 2 to communicate signals to and receive signals from the trunking cards.

FIG. 5 is a flow chart of exemplary program control steps (states) performed by site controller 410 to transmit a message frame over link 412 to a trunking card. Site controller 410 first transmits synchronization characters (block 504). The site controller 410 then transmits a frame start character (block 506), the message start character (block 508), and a variable number of message data bytes (block 510). Following the message data, site controller 410 transmits the checksum character (block 512) and waits for the next frame which needs to be transmitted. If a checksum error is detected by the trunking card, the message is never acknowledged and the site controller 410 retransmits the message.

Figure 6:
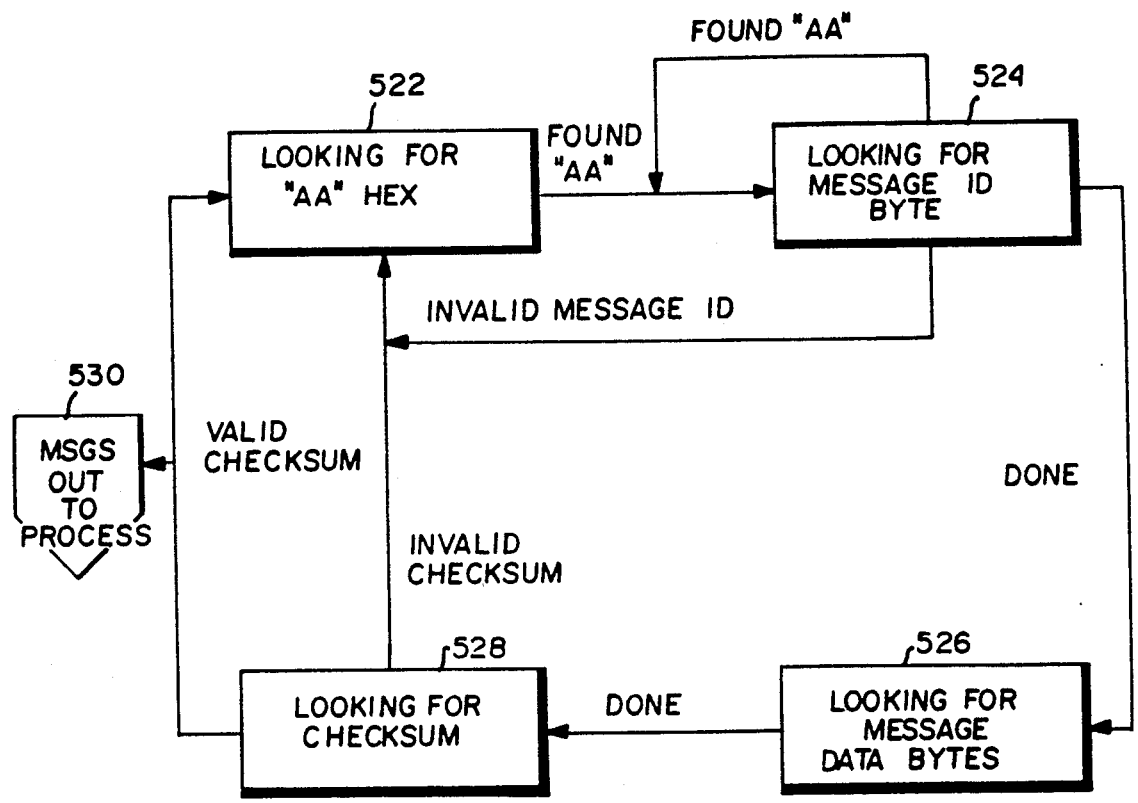

FIG. 6 shows the steps performed by the trunking cards to transmit messages to site controller 410 over links 412. These steps are virtually identical to the steps performed by the site controller to transmit messages (see FIG. 5).

7.1.2 Reception by Site Controller 410 of Messages Transmitted by DLTC 450

Figure 7:
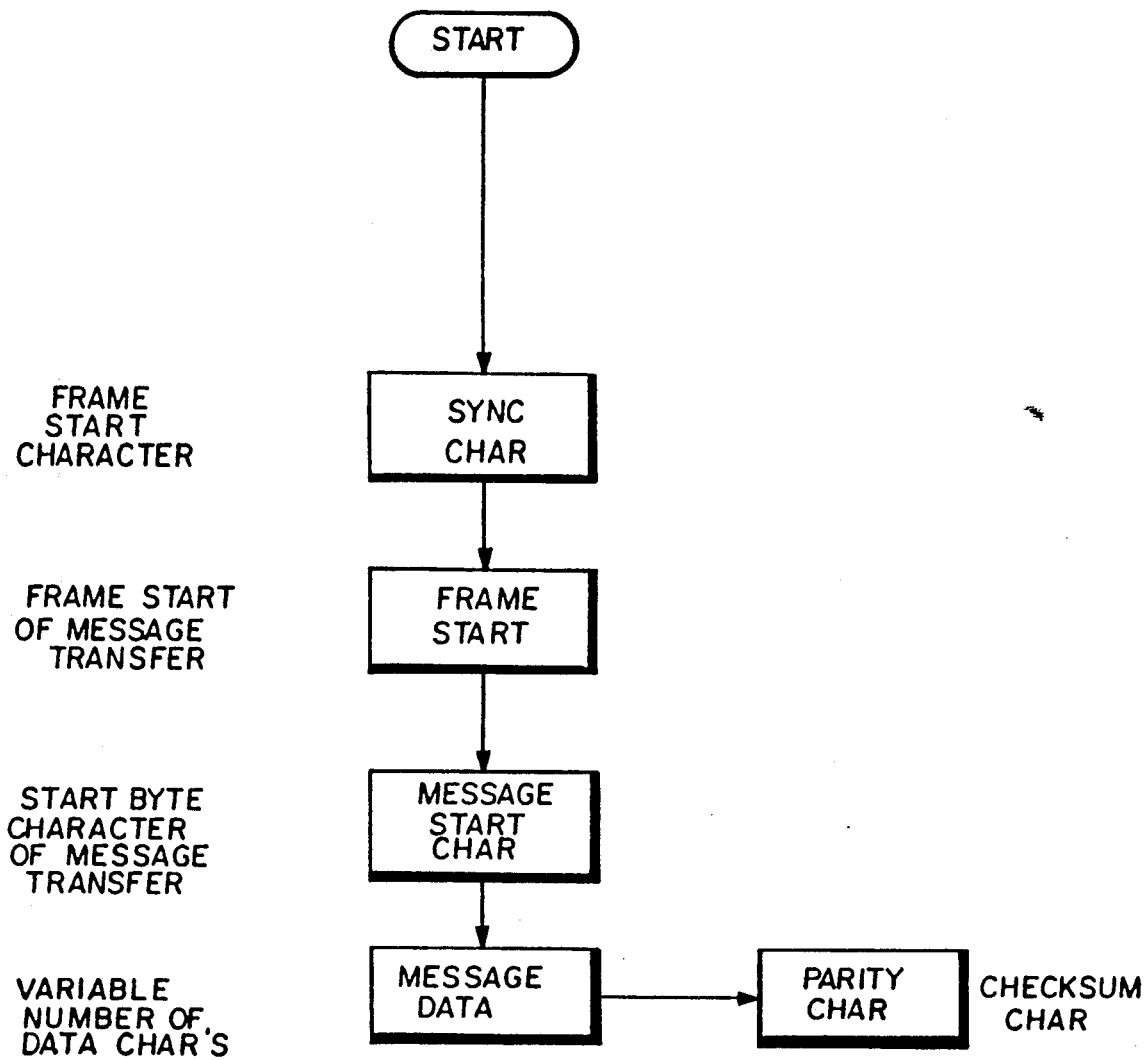
FIG. 7 is a schematic flow chart of exemplary program control steps performed by trunking cards shown in FIGS. 1 and 2 to communicate signals to site controller 410.

FIG. 7 is a flow chart of exemplary program control steps performed by site controller 410 to receive messages transmitted to it over link 412(dl) by a trunking card. Site controller 410 waits for a frame character indicating the start of a new message frame (hex "AA") in the preferred embodiment (decision block 522). When such a frame character is received, site controller 410 looks for a message ID byte (decision block 524), then a variable number of data bytes (the number of bytes is specified in the start character) (decision block 526), and then the checksum byte indicating the end of the message (decision block 528). Once the checksum byte has been received, site controller 410 calculates checksum based on the received message characters and compares the calculated checksum with the received checksum to determine whether they correspond.

If received and calculated checksum correspond, a "good" message has been received and site controller 410 begins to process the message (block 530). On the other hand, if the tests performed by any of decision blocks 524–530 fail, site controller 410 gives up, logs an error, and waits for the next frame start character (block 522).

7.2 Steps Performed by DLTC 450 and Switch TC 454

FIG. 9 is a schematic flow chart of exemplary program control steps performed by system 100 to communicate data over the downlink. The sequence of operations shown on the left-hand side of FIG. 9 communicate a message from site controller 410 to console 102 via link 412(dl), downlink trunking card 450, landline link 452, switch trunking card 454, and link 456. The steps shown on the right-hand side of FIG. 9 are used in the preferred embodiment to communicate a message from console 102 over the downlink 103 to site controller 410. The steps shown in the upper half of the FIG. 9 flow chart are performed by downlink trunking card 450, and the steps shown on the lower half of the figure are performed by the switch trunking card 454.

When site controller 410 generates a message and transmits it to downlink trunking card 450 over link 412(dl), the downlink trunking card first executes a receive logic routine (block 602) to actually receive the message. Next, downlink trunking card 450 executes a message processing routine (block 604) to analyze the received message and determine if the message is in the proper form. In particular, block 604 tests whether the received message is an administrative message which must be responded to by the downlink trunking card, or whether it is a message intended to be passed on down the downlink to console 102. If the message is an administrative message requiring a response, the downlink trunking card generates the response and places it in a transmit buffer (block 606) for communication back to the site controller (block 608).

If the message received from the site controller is a "good" message and is to be communicated to switch trunking card 454, the message is placed in a transmit buffer (block 610) and is transmitted over the landline link 452 by block 612. Switch trunking card 454 executes block 614 to receive the data packet transmitted over link 452, and determine whether the received message is in correct form and was received with no errors. If the received message is a "good" message, block 614 places an acknowledgement message into the switch trunking card transmit buffer priority queue (block 616). Switch trunking card 454 then processes the received message (block 618).

If the received message is an administrative message requiring a response from switch trunking card 454, the trunking card places an administrative message response into its transmit priority queue (block 616). On the other hand, if the received message is intended to be sent to console 102, switch trunking card 454 places the message in an internal receive buffer (block 620) and passes the message on to console 102 via link 456 (block 622).

In response to a message received by switch trunking card 454 via link 456 from console 102, the switch trunking card executes a receive logic routine (block 624) and acknowledges the received message if appropriate (e.g., by placing a received acknowledgement message in its buffer (block 620)). If the message is an administrative message which requires the switch trunking card 454 to perform some diagnostic routine, the diagnostic routine (or other processing) is executed (block 626). For example, console 102 may request switch trunking card 454 to transmit its configuration, which the trunking card does by placing configuration information into its buffer (block 620). If, on the other hand, the received message is to be passed on to site controller 410, switch trunking card 454 places the received message in its priority queue (block 616) in a position determined by the type of the message (as described previously). Switch trunking card 454 executes block 628 to remove messages from the priority queue and transmit them over landline link 452 to downlink trunking card 450.

When downlink trunking card 450 receives a console originated message over landline link 452, it performs a receive logic routine (block 630) to guarantee that a "good" message has been received and causes the receipt to be acknowledged by placing an acknowledge message in its transmit buffer (block 610), Downlink trunking card 450 then processes the received message (block 632), and if the message is an administrative-type message, transmits a response back to switch trunking card 454 (block 612). If the received message is intended for site controller 410, downlink trunking card 450 places the message in its buffer (block 606) and passes it on to the site controller via link 412(dl) (block 608).

7.2.1 Transmission of Messages from Site Controller 410 to Switch 457

FIG. 10 is a more detailed flow chart of FIG. 9 block 602. The routine shown in FIG. 10 is performed by downlink trunking card 450 to receive and acquire a message transmitted to it over link 412(dl) by site controller 410.

Downlink trunking card 450 first determines if it has received a start character (since in the preferred embodiment, start characters are used to indicate the beginnings of message frames transmitted over link 412(dl)) (block 650). If a start character has not yet been received, DLTC 450 waits for a start character. Once a start character is received, DLTC 450 determines whether the "GETC" code is valid (i.e., tests whether the received message is a valid message) (block 652). If the received GETC code is invalid, an error is tabulated, (this tabulated error being used later to inform the site controller or console 102 about the behavior of the downlink). If the GETC code is valid, DLTC 450 determines from the code how many additional bytes of data are expected to be received, and then acquires the data bytes transmitted following the GETC code, and counts the number of characters to determine when the message has ended (block 658). If the maximum time delay expires before the required number of characters have been received, DLTC 450 tabulates an error and waits for the next message. On the other hand, if the entire message is received before the maximum delay expires, the DLTC calculates checksum based on the received characters and compares the calculated checksum with the contents of the received checksum byte (block 662). If calculated checksum and received checksum do not correspond, a transmission error has occurred, the entire received message is discarded, and an error is tabulated. If the checksum check determines, on the other hand, that the message was received correctly, the message is processed by the "good message processor" block 604, and the DLTC 450 awaits receipt of the next message (decision block 650).

If the test of decision block 662 reveals the received message is good, the message is processed by message processing block 604—a detailed flow chart of which is shown in FIG. 11. Blocks 675-685 decode the "GETC code" in the received message to determine what kind of message has been received. Some messages require an immediate response from the DLTC 450, while others are to be transmitted by the DLTC over link 452. If the GETC code is a 01 (as tested for by block 675), the site controller 410 has requested DLTC 450 to configure itself (e.g., upon initial application of power to system 100 or upon system reset). Decision block 687 tests whether bits 7 and 6 of the message are both set. If these bits are set, the command is ignored (since the downlink trunking card has already previously configured itself for downlink operation, and would not be executing the FIG. 9 routine in the first place unless it had already so configured itself). If the values of bits b7, b6 are not both set in the newly-received message, site controller 410 is requesting the downlink trunking 450 to configure itself as some other kind of trunking card, and the configuration process is executed to implement that change (block 689).

Block 677 determines whether the GETC code of the newly-received message is that of a control channel 2-slot message. If this type of message has been received, the downlink trunking card must prepare the message for transmission to the switch trunking card 454 over link 452. Downlink trunking card 450 computes a conventional BCH error checking field (block 691). Although the messages on link 412(dl) are protected by checksum error checking, the more powerful BCH error checking and correction algorithm is used to protect data transmitted over landline link 452 in order to reduce the number of messages that need to be retransmitted over the landline link.

The downlink trunking card 450 then searches its transmit first-in-first-out buffer 610 for the last 1-slot control channel message put into the buffer (block 693). Downlink trunking card 450 transmits data over landline link 452 in packets, each packet containing at least one message and preferably two messages. The packets are long enough to contain to independent control channel 1-slot messages, or two working channel messages. In the preferred embodiment, each packet contains the same type of message. For example, one packet may contain two 1-slot control channel messages, and another packet may contain two working channel messages but no packet may contain a control channel message and a working channel message. In the preferred embodiment, two messages are placed into the same packet. Block 693 searches the downlink trunking card transmit buffer to locate the last packet placed into the buffer which contains a control channel message, and decision block 695 determines whether the second message slot of that message packet is full. If the second message slot is not full, the newly-received control channel message is stored in the second slot (block 697). If the second slot is full, a new message packet is created, the new message is assigned a packet number (block 699) and the second slot of this new packet is set to indicate that the packet can accept another control channel message (block 701). In the preferred embodiment, each packet to be transmitted is assigned a packet number (simply an arbitrary number generated sequentially to uniquely designate packets and make it possible for receipt of individual packets to be acknowledged). Once a packet has been created by blocks 699, 701, the packet is stored in a first-in-first-out buffer (block 610 shown in FIG. 9) at block 702 to await transmission over link 452 by FIG. 9 block 612.

If block 679 determines the received message is a working channel message, blocks 703-713 (which are very similar to blocks 691-701) are executed to prepare the working channel packet for transmission, and the packet is stored on the FIFO transmit buffer (block 702).

If the newly-received message is a control channel message (as determined by block 681), it will fill an entire packet. The BCH error checking field is calculated for it (block 715), and a packet number is assigned to it (block 717) the 2-slot message packet is then placed in the transmit buffer (block 702).

If decision block 683 determines the newly-received message is a test message, decision block 719 tests whether a modem test has been requested. If the site controller 410 has requested a modem test, a modem test routine (not shown) causes the modemto generate dotting. Otherwise, the message is ignored.

If the GETC code of the newly-received message indicates that the message is a status request message (as tested for by block 685), decision block 721 determines what type of status information (present state, setup request, broadcast count or activity request) has been requested. An activity request (indicated by bits b1 and b0 each being set) causes the downlink trunking card 450 to transmit a message. All other combinations of these bits cause the downlink trunking card 450 to transmit specific status information back to site controller 410 (block 723).

First-in-first-out buffer 610 shown in FIG. 9 is implemented in a conventional manner in the preferred embodiment. That is, this buffer is simply an area of the internal memory of downlink trunking card 450 which acts as a message queue in which the first messages stored into the queue are the first messages to be removed from the queue. All retransmitted packets and acknowledge messages are transmitted by block 610 before any packets generated by block 604 are transmitted.

Once messages are placed onto this FIFO buffer, they are transmitted by the transmit logic routine 612 shown in detail in the FIG. 12 flow chart. This transmit logic routine 612 actually transmits messages over landline link 452 and also keeps track of which already-transmitted messages have not been acknowledged by switch trunking card 454 and must be retransmitted.

Block 730 attempts to remove the "oldest" message on the downlink trunking card transmit buffer. If the transmit buffer is empty, downlink trunking card 450 transmits four bytes of dotting pattern (alternating binary valued bits, i.e., 1 0 1 0 1 0) (block 732). If there is a message to be transmitted, on the other hand, DLTC 450 transmits the word synchronization Barker code character (block 734), the GETC code corresponding to the packet (block 736), and then determines whether a packet or a message is being sent (decision block 738). If a packet (rather than an acknowledgement or other type of administrative message) is to be transmitted, the packet number is sent first (block 740), followed by the contents of the first message slot and corresponding BCH error checking code (blocks 742, 744), followed by the contents of the second message slot and its corresponding BCH code (block 746, 748) (decision block 745 determines whether any message is actually contained in the second slot—blocks 702, 744 transmit the contents of the first slot regardless of whether there is a message in the second slot). If the data being transmitted is a message rather than a packet, the message is transmitted (block 750) along with a corresponding checksum code (block 752) (since in the preferred embodiment only data packets and not messages are protected by the BCH code).

The downlink trunking card 450 then stores the message in a message acknowledge queue (block 754) and checks whether any messages in the acknowledge message queue have been acknowledged (by checking the contents of a received acknowledgement message queue and determining if the packet number field of any acknowledge message received from switch TC 454 matches the packet number field of any message in the acknowledge queue). All messages which have been acknowledged are removed from the acknowledge message queue (block 756). DLTC 450 then determines whether any message has been in the acknowledge message queue for more than 30 milliseconds (this test can be performed, for example, by storing a real time along with every message stored in the acknowledge message queue, this real time corresponding to the time the message is stored in the queue—and comparing the real time field of each stored message with the current real time) (decision block 758). If any message goes unacknowledged for more than 30 milliseconds, it is retransmitted by the DLTC unless it has already been retransmitted three times. A retransmit counter associated with each entry in the acknowledge queue which is older than 30 milliseconds is incremented (block 760), and all incremented retransmit counters are compared with the value of 3 (decision block 762). The downlink trunking card 450 "gives up" on any message that has already been retransmitted three times and has gone unacknowledged again, and simply stores an error code (block 764) for later inquiry by site controller 410. On the other hand, a message which has gone unacknowledged for more than 30 milliseconds which has not yet been retransmitted three times is removed from the acknowledged message queue (block 764) and retransmitted by blocks 734–748.

FIG. 13 is a detailed schematic diagram of the received logic routine 614 executed by the switch trunking card 454 to receive data packets and messages transmitted to it over landline link 452. Decision block 775 looks for an incoming Barker code (word sync pattern) to determine when an incoming message is present on link 452. When Barker code arrives, the switch trunking card 454 determines whether the GETC code in the received packet is valid (decision block 777), and then looks for a packet number (decision block 779). If no packet number is included in the received data, a message rather than a packet has been received, the message is stored (decision block 781), and the checksum of the received message is checked (decision block 783). If the checksum calculated by switch trunking card 454 corresponds with the checksum field of the received message, the received message is assumed to have been received with no errors and is further processed by good message processing block 618. If a checksum error is detected, the received message is discarded (block 785) and an error is logged (block 787).

If the received data does have a packet number, switch trunking card 454 determines whether this packet has already been acknowledged (decision block 787). In the preferred embodiment, DLTC 450 retransmits the same packet number with any message it retransmits. Sometimes, the switch trunking card 454 correctly receives a packet and transmits an acknowledgement, but the downlink trunking card 450 fails to receive the acknowledgement and therefore retransmits the same packet again. Decision block 787 tests for this condition so as not to waste time on processing messages already acknowledged and processed, and generates another acknowledgement message for the received packet (block 789) and transmits this acknowledge message over link 452 to downlink trunking card 450.

If the received packet has not already been correctly received, the messages it contains are temporarily stored (block 791, 797), and the BCH error checking codes they contain are analyzed in a conventional fashion (decision blocks 793, 799). If the BCH algorithms indicate the packet has been received correctly, the received messages are further processed by FIG. 9 block 618. If some of the messages have been received incorrectly, however, the entire packet is discarded (block 785) and the message is not acknowledged to force the downlink trunking card 450 to retransmit the message. All packets and all messages which have been correctly received cause the downlink trunking card 450 to tabulate a message count (block 801), and transmit an acknowledge message to the downlink trunking card (block 789).

"Good" messages processed by received logic routine 614 are passed on to the "good message processing" routine (FIG. 9 block 618) a detailed schematic flow chart of which is shown in FIG. 14. Routine 618 determines the type of the newly-received message by testing the GETC code the message contains (blocks 825–835). If the received message is an acknowledge message (determined by block 825), it is further processed by transmit logic block 628 (block 837).

If the received message is a 2-slot control channel message (indicated by GETC code=08, block 827), switch trunking card 454 translates the received GETC code into a MID code understandable by console 102 (which in this case, MID=GETC=08) (block 839), and the switch trunking card begins to set up the message to be passed along to the console 102 by reserving seven bytes in a temporary storage buffer to contain the received message (block 841).

If the received GETC code=OD (indicating a 1-slot control channel message), switch trunking card 454 must analyze the remainder of the message to determine what sort of 1-slot control channel message has been received and set the MID code to the appropriate code corresponding to the message (MID=9 for unit key message, MID=10 for unkey/channel D assignment message, MID=12 for assign group ID to patch ID message, MID=13 for assign individual ID to patch ID message, MID=14 for site ID message, or MID=15 for channel update message). The number of data bytes reserved for any control channel 1-slot message is six (block 845).

If the received GETC code=19 (indicating a working channel message), the switch trunking card 454 sets the MID code to 11 (working channel message) (block 847), and reserves five data bytes for the working channel message (block 849).

For control channel and working channel messages, the switch trunking card 454 then "builds" the message by adding source and destination codes (block 851), inserting the message itself (block 853), calculating a checksum check (block 855), and storing the message so "built" into the switch trunking card transmit FIFO buffer (see FIG. 9 block 620).

If the received GETC code=FB (test message), the response (a request of the message) is simply stored in the priority queue 616 the switch trunking card uses to contain messages to be transmitted back to downlink trunking card 450. If the received GETC code=07 (status request message), switch trunking card 454 tests whether the requested status information is for downlink activity (decision block 861). If downlink activity information has been requested, the information is stored in priority queue 616 for communication back to site controller 410.

FIG. 9 block 618 stores messages into the switch trunking card 454 FIFO buffer 620 which must be communicated to console 102. The FIG. 9 block 622 transmit logic routine (shown in detail in the FIG. 15 flow chart) removes messages from this buffer and transmits them over link 456 to console 102. Such messages are removed from the FIFO buffer (block 875), and transmitted over the console-to-SWITCH TC link 456 (blocks 877-885). Routine 622 then determines whether messages it has passed on to console 102 have been acknowledged (decision block 887). A message that has gone unacknowledged for more than 50 milliseconds (as tested for by decision block 889) is retransmitted unless it has already been transmitted three times, at which time the switch trunking card 454 "gives up" and logs an error (blocks 891-895).

If console 102 receives more messages than it can handle at a given time from switch trunking card 454, it stops acknowledging receipt messages sent to it—forcing the switch trunking card to wait 50 milliseconds and then retransmit the message. In this way, console 102 is capable of slowing down the transfer rate on the downlink to give itself enough time to process received messages.

7.2.2 Transmission Of Messages From Switch 457 to Site Controller 410

Console 102 is also capable, of course, of initiating its own messages and causing those messages to be transferred via switch 457 and downlink 103 to site controller 410. Once console 102 has constructed a message, it transmits that message to switch trunking card 454 via switch 457 and console-to SWITCH TC link 456. FIG. 9 block 624 accumulates console messages and acknowledges them—and if necessary, slows down the transfer of console messages to the downlink to accommodate the lower data transfer rate of landline link 452. A detailed flow chart of the received logic routine 624 is shown in FIG. 16.

The switch trunking card 454 looks for a start character (block 902) indicating the beginning of a new message, and then determines whether the MID code contained in the message is valid (decision block 904). If the MID code is invalid, an error is tabulated (block 906) and the switch trunking card waits for the next message. If the MID code is valid, switch trunking card 454 determines from the code how many characters following the code it should expect, and sets a maximum delay period in accordance with this number of characters (this maximum delay period being a maximum time period by the end of which the switch trunking card should have received the entire message) (block 908). If the required number of characters has not been received by the time the delay expires (decision blocks 910, 912), the received message is ignored and an error is logged (block 906). If all of the characters of the message have been received before the delay is over, a checksum check (decision block 914) is performed to determine whether the newly-received message is error free. If the received message has a checksum error, an error is logged (block 906) and the message is ignored. If the received message is error free, a message counter is incremented to indicate the message has been received (block 916) and the message is sent to FIG. 9 block 626 for "good message processing". Meanwhile, switch trunking card 454 determines how many messages are stored in priority queue 616 (block 618), and if more than four messages are stored there, delays 15 milliseconds (block 920) before acknowledging the received message (block 922). Received messages are acknowledged by storing corresponding acknowledgement messages in the FIFO buffer managed by FIG. 9 block 620 (block 922). FIGS. 17A–17B are together a detailed flow chart of the "good message processing" routine (FIG. 9, block 626) performed by switch trunking card 454 to process messages received from console 102. Block 626 also manages a priority queue (used to order the messages sent over the downlink to site controller 410). As mentioned previously, one of the ways the preferred embodiment compensates for the lower data transfer rate of landline link 452 is to prioritize messages so that more important messages are transferred before less important ones.

Switch trunking card 454 under control of the message processing routine 626 first determines the type of message to be transferred by testing the MID code associated with the message (blocks 925-933). An acknowledge message (MID=04) is processed by simply passing the acknowledge message to transmit logic routine 622 (blocks 925, 935). Control channel individual and group call messages (MID=24 or MID=25) are processed by calculating BCH error checking/correction field (block 937), and placing the message into the second slot of a packet already in the queue containing a control channel message or (if one exists) (blocks 939, 941, 943). If no control packets with free second slots are already on the priority queue, the switch trunking card 454 sets up a new packet with a GETC code=08 (1-slot control channel) (block 945), a packet number (block 947), and a blank second slot (block 949), and then stores the new packet on the priority queue (block 951). Finally, a counter which keeps track of the number of entries on the priority queue waiting to be transmitted is incremented (block 953) and the switch trunking card waits for the next message to be processed.

If the MID code of the newly-received message indicates that the message is a working channel message (as tested for by block 929), blocks 955–967 are performed to calculate BCH error checking information, place the working channel message in the second slot of a working channel data packet (if one exists), and forming a new working channel data packet if necessary. Block 969 stores the new working channel data packet on the priority queue after the last working channel packet (the oldest working channel data packet being stored on the queue so that it is transmitted only after all control channel working packets and acknowledge packets have been transmitted).

If the new message is a patch message (as indicated by decision block 931), the switch trunking card 454 must transmit a packet which is relatively long compared to the other packets it transmits over the downlink. Patch messages may be up to 16 packets long in the preferred embodiment, and these packets are transmitted only when there are no acknowledge message, control channel message and working channel message packets on the priority queue (therefore, a control channel packet which is formed after half of a patch message has been transmitted will be transmitted before the rest of the patch message). In the preferred embodiment, patch messages are relatively long because they specify the identifications of several (up to ten) different individual and/or group mobile units as being included in the patch. To process a patch message, a counter M is set to 0 (block 971) and switch trunking card 454 then calculates the number N of packets needed to store the patch message (block 973). The patch message is then "built" by first setting the message GETC code to 15 (block 975) and then assigning a packet number which is encoded to indicate the packet number of a patch message as well as a unique packet number used to distinguish that packet from others (block 977). Two BCH fields are calculated to protect the patch message from errors (block 979), and the completed packet is stored in the priority queue after the last patch message in the queue (which in turn is after the last working channel message) (block 981). The queue counter is incremented after each patch packet is stored in the priority queue (block 983), and the value of counter M is also changed to keep track of the number of patch packets in the patch message (block 985). Control then loops back to block 975, the loop being exited when all of the packets in the patch message have been formed (as tested for by decision block 987).

The steps performed by the switch trunking card 454 to remove packets from the priority queue and transmit them via landline link 452 to downlink trunking card 450 are virtually identical to the steps performed by downlink trunking card 450 to transmit packets to the switch trunking card (see FIG. 12). Likewise, the steps in FIG. 9 block 630 performed by downlink trunking card 450 to receive packets transmitted to it over link 452 by switch trunking card 454 are virtually identical to the steps performed by the switch trunking card to receive packets transmitted to it by the downlink trunking card (see FIG. 13).

FIG. 18 is a flow chart of exemplary control steps performed by the downlink trunking card 450 to process messages received from the switch trunking card 454 (see block 632 of FIG. 9). The downlink trunking card 450 first determines from the GETC code of the received message what sort of message has been received (blocks 1002–1010). If an acknowledge message has been received (as tested for by block 1002), block 632 instructs block 612 to transmit an acknowledge message (block 1012). If a control message has been received (as tested for by block 1004), checksum information is calculated (block 1014), a frame character is added to the front of the message (block 1016) and the message is placed in the downlink-to-site controller FIFO buffer (see FIG. 9 block 606) (block 1018). Blocks 1014–1018 are also performed for received working channel messages (as tested for by block 1006). If a multi-packet patch message has been received (as tested for by block 1008), the downlink trunking card 450 tests whether the entire patch message has been received before any part of the message is transferred over link 422 to site controller 410. The entire patch message is acquired first (by block 1022), and then blocks 1014–1018 are executed to calculate checksum, prefix a frame character and store the entire patch message into the FIFO buffer. Note that working channel, control channel, acknowledgement and administrative messages may arrive after only a part of a patch message has been received, so that routine 632 keeps track of partially-received patch messages while processing other types of packets.

If an administrative message (e.g., test message or status message) arrives (as tested for by decision block 1010), routine 632 simply stores the message in the buffer for communication to site controller 410.

The logic routine performed by downlink trunking card 450 to transfer messages from the FIG. 9 block 606 buffer and site controller 410 is straight forward, being quite similar to the routine performed by switch trunking card 454 to transmit messages over link 456 to console 102 (see FIG. 15).

A method and an architecture for communicating digital message signals between a communication dispatch console 102 and a RF repeater system site controller has been described. This method and architecture permits messages to be efficiently transferred over a landline communications link which has a lower data transfer rate than other higher-speed communication paths in the downlink without seriously degrading overall transfer rate. Translation between protocols and prioritization of messages are accomplished without significantly degrading overall transfer rate—so that the limiting delay in the downlink is the processing speed of the site controller rather than downlink transfer rate.

8.0 General Discussion of Message Definitions and Formats

A detailed description of the messages and associated formats existing on each of the links 420, 452 and 456 making up downlink 103 will now be presented.

First, the messages and associated formats existing on link 412(dl) between site controller 410 and trunking cards 400–408, 450 will be discussed.

Following will be a discussion of the messages and associated formats existing on the landline link 452 between downlink trunking card 450 and switch trunking card 454.

Finally, a discussion of the messages and associated message formats existing on link 456 between switch TC 454 and switch 457 will be presented.

The discussions of the messages existing on the links will be divided into discussions of administrative messages and global messages. Global messages are discussed in an order according to the unit originating the message. For example, global messages existing on a particular link which were originated by site controller 410 will be discussed before global messages originated by switch 457.

9.0 Messages on Links 412 Between Site Controller 410 and Trunking Cards 400-408, 450

Messages on the high-speed data links 412 between site controller 410 and trunking cards can be classified in two types: those originated by the site controller, and those originated by the trunking cards.

9.1 Types of Messages Communicated Between Site Controller 410 and the Trunking Cards Over Links 412

The term "global message" has no application for messages communicated between site controller 410 and RF channel trunking cards 400-408, since such messages are not "passed on" to switch 457 in the sense that site controller 410 sends "global messages" to DLTC 450 which the DLTC then passes onto switch TC 454 and switch 457. However, in another sense, all messages transmitted between the site controller 410 and RF trunking cards 400-408 which request or confirm allocation of system resources may be termed "global messages."

As mentioned previously, most global messages carried on downlink 103 correspond to messages carried on a link 412 between site controller 410 and an RF trunking card 400-408. For example, when site controller 410 transmits a working channel assignment message to a working channel trunking card 402-408, it also transmits a global working channel assignment message over downlink 103 to inform the console 102 that a working channel has been assigned and to cause switch 457 to route the audio paths needed to connect the assigned working channel control shelf CS to the console (and perhaps also to a dial-up telephone line).

The following is a detailed discussion of messages communicated between the site controller 410 and the trunking cards over links 412.

As the same messages and message formats are used by the preferred embodiment site controller 410 to communicate with DLTC 450 and with the RF channel trunking cards 400-408, the following discussion also fully describes the signalling which occurs between site controller 410 and DLTC 450 over link 412 (DL).

Messages communicated between site controller 410 and trunking cards 400-408, 450 in the preferred embodiment are set forth in the table below:

TABLE 10

| | | GE PST Site Messages | | |
|---|---|---|---|---|
| Source | Site Controller IN/OUT | Message ID | Message Length | Message Description |
| ACU | I | 81 | 6 | ACU Status Message |
| ACU | O | 80 | 1 | ACU Reset Command |
| ACU | O | 81 | 1 | ACU Status Request |
| ACU | O | 82 | 13 | ACU Set Alarm Masks |
| ACU | O | 85 | 2 | ACU Set Relay State |
| GETC | I | 50 | 2 | Downlink Patch Activate |
| GETC | I | 51 | 4 | Downlink Patch Collection |
| GETC | I | 53 | 2 | Downlink Simselect Activate |
| GETC | I | 54 | 4 | Downlink Simselect Collec |
| GETC | I | 5X | 99 | Reserved for Down Link |
| GETC | O | 52 | 4 | Patch Collection Blocks |
| GETC | O | 55 | 4 | Simulslct Collection Blck |
| GETC | O | 5X | 99 | Reserved for Downlink |
| GETC | I | 01 | 3 | Getc Setup Response |
| GETC | I | 02 | 1 | GETC Broadcast Count |
| GETC | I | 07 | 1 | GETC Status Response |
| GETC | I | 08 | 4 | CC Message |
| GETC | I | 10 | 3 | WC Message |
| GETC | I | 13 | 8 | WC Message with AVL info |
| GETC | I | 16 | 12 | WC Special Call Message |
| GETC | I | 19 | 99 | WC Radio Programming Msg |
| GETC | I | FB | 2 | GETC Test Message |
| GETC | I | FE | 1 | Retransmit Last Message |
| GETC | O | 01 | 1 | GETC Setup Command |
| GETC | O | 02 | 1 | GETC Broadcast Count |
| GETC | O | 07 | 1 | GETC Status Request |
| GETC | O | 08 | 6 | Channel Assignment |
| GETC | O | 0A | 1 | GETC conversation limits |
| GETC | O | 0B | 8 | CC Concatenated Message |
| GETC | O | 0C | 4 | GETC Site ID Message |
| GETC | O | 0D | 4 | CC Single Slot Message |
| GETC | O | 19 | 3 | Radio Programming Message |
| GETC | O | 1A | 1 | WC Repeat Audio En/Disabl |
| GETC | O | 1C | 1 | WC Drop Message |
| GETC | O | F7 | 12 | FCC Morse Code Identifier |
| GETC | O | F8 | 1 | GO TO Failsoft Command |
| GETC | O | FB | 2 | GETC Test Message |
| GETC | O | FD | 1 | GETC Reset Message |
| GETC | O | FE | 1 | Retransmit Last Message |
| LIC | I | 61 | 2 | LIC Status Response |
| LIC | I | 6A | 2 | Ring Detected on Landline |
| LIC | I | 6B | 2 | Ring Terminated Landline |
| LIC | O | 00 | 2 | Reset of Host Controller |
| LIC | O | 01 | 2 | Status Poll of LIC |
| LIC | O | 02 | 2 | Setup Tone Dial Line |
| LIC | O | 03 | 2 | Setup Pulse Dial Line |

TABLE 10-continued

GE PST Site Messages

| Source | Site Controller IN/OUT | Message ID | Message Length | Message Description |
|---|---|---|---|---|
| LIC | O | 04 | 2 | Put Line Off Hook |
| LIC | O | 05 | 2 | Put Line On Hook |
| LIC | O | 06 | 2 | Disconnect All Line/Rptr |
| LIC | O | 07 | 2 | Disconnect Line/Rptr |
| LIC | O | 08 | 2 | Connect Line/Rptr |
| LIC | O | 09 | 2 | Pulse Dial Digit |
| LIC | O | 0C | 2 | Enable LIS Modules |
| LIC | O | 0D | 2 | Disable Landline |
| LIC | O | 0E | 2 | Enable Landline |
| LIC | O | 0F | 2 | Enable Group of Landlines |
| LIC | O | 1E | 2 | Reset LIC Module |
| PMU | I | B1 | 3 | PMU Status Message |
| PMU | I | B4 | 3 | PMU Channel Power Reading |
| PMU | O | B0 | 0 | PMU Reset |
| PMU | O | B1 | 0 | PMU Status Poll |
| PMU | O | B2 | 3 | PMU Channel Mask |
| PMU | O | B3 | 3 | PMU Channel Threshold Pgm |
| PMU | O | B4 | 1 | PMU Channel Power Request |
| PMU | O | B6 | 3 | PMU On Channel Message |
| RIC | I | 41 | 2 | RIC Status Response |
| RIC | I | 45 | 2 | DTMF Digit from Mobile |
| RIC | I | 4B | 2 | DTMF Digit from Landline |
| RIC | I | 4C | 2 | Dial Tone from Landline |
| RIC | O | 00 | 2 | Reset of Host Controller |
| RIC | O | 01 | 2 | Status Poll of RIC |
| RIC | O | 02 | 2 | Enable Repeater Audio |
| RIC | O | 03 | 2 | Enable Repeater Interconn |
| RIC | O | 04 | 2 | Detect DTMF from Landline |
| RIC | O | 06 | 2 | Generate Test Tone Patter |
| RIC | O | 07 | 2 | Generate Tone to Mobile |
| RIC | O | 08 | 2 | Generate DTMF to Mobile |
| RIC | O | 09 | 2 | Generate Dial To Mobile |
| RIC | O | 0D | 2 | Generate Tone To Landline |
| RIC | O | 0E | 2 | Generate DTMF To Landline |
| RIC | O | 0F | 2 | Generate Dial To Landline |
| RIC | O | 10 | 2 | Tone to Mobile & Landline |
| RIC | O | 11 | 2 | DTMF to Mobile & Landline |
| RIC | O | 12 | 2 | Dial to Mobile & Landline |
| RIC | O | 13 | 2 | Repeat with DTMF Regen |
| RIC | O | 1E | 2 | Reset RIC Module |
| SMAN | I | 00 | 0 | Message Acknowledge |
| SMAN | I | 20 | 0 | System Manager Logoff |
| SMAN | I | 22 | 13 | System Manager Login |
| SMAN | I | 23 | 8 | Logical ID Record (all) |
| SMAN | I | 24 | 6 | Group ID Record (all) |
| SMAN | I | 25 | 1 | Request for Alarm Status |
| SMAN | I | 27 | 7 | Clock Time/Date |
| SMAN | I | 28 | 1 | Monitor On/Off |
| SMAN | I | 29 | 1 | Activity Download On/Off |
| SMAN | I | 2A | 0 | Site Configuration Reques |
| SMAN | I | 2F | 5 | Site RF Reconfiguration |
| SMAN | I | 30 | 2 | Interconnect Line Database |
| SMAN | I | 31 | 8 | Logical ID Record (inc) |
| SMAN | I | 32 | 8 | Group ID Record (inc) |
| SMAN | I | 33 | 17 | Interconnect Rotary Data |
| SMAN | I | 34 | 7 | Intercon Toll Call Restr |
| SMAN | I | 35 | 1 | ACU Relay Mask |
| SMAN | I | 36 | 12 | ACU Alarm Masks |
| SMAN | I | FF | 0 | Message Negative Acknowledge |
| SMAN | O | 20 | 0 | System Manager Logoff |
| SMAN | O | 00 | 0 | Message Acknowledge |
| SMAN | O | 22 | 13 | Site Login |
| SMAN | O | 23 | 0 | Logical Database Request |
| SMAN | O | 24 | 0 | Group Database Request |
| SMAN | O | 25 | 9 | Alarm/Status Record |
| SMAN | O | 27 | 0 | Request for Time/Date |
| SMAN | O | 28 | 19 | Monitor Record |
| SMAN | O | 29 | 16 | Activity Record |
| SMAN | O | 2A | 14 | Site Configuration |
| SMAN | O | 30 | 0 | Request for Intercon Line |
| SMAN | O | 33 | 0 | Request for Intercon Rotr |
| SMAN | O | 34 | 0 | Request for Intercon Toll |
| TU | I | 91 | 2 | TU Status Response |
| TU | I | 94 | 12 | CC Monitor Results |
| TU | I | 94 | 1 | CC has Failed |
| TU | I | 96 | 1 | Test Call Results |
| TU | I | 9x | 1 | RF Test Results |
| TU | O | 07 | 0 | TU Status Poll |
| TU | O | 08 | 6 | Monitor Control Channel |

TABLE 10-continued

GE PST Site Messages

| Source | Site Controller IN/OUT | Message ID | Message Length | Message Description |
|---|---|---|---|---|
| TU | O | 0B | 0 | Send CC Monitor Results |
| TU | O | 0E | 0 | Stop Monitoring CC |
| TU | O | 10 | 0 | Perform Test Call |
| TU | O | 13 | 0 | Send Test Call Results |
| TU | O | 20 | 2 | Perform RF Test |
| TU | O | 23 | 0 | Send RF Test Results |
| TU | O | 25 | 0 | Stop RF Test |
| TU | O | FD | 0 | TU Reset Command |
| TU | O | FE | 0 | Retransmit Last Command |

9.2 "Administrative" Messages on Links 412 Originated by Site Controller 410

The site controller 410 sends commands and poll requests to the trunking cards in order to perform overall management of system 100. The types of administrative messages transferred from site controller 410 to the trunking cards include resynchronization characters, setup commands, poll commands, downlink communications, and test functions.

The following are descriptions of administrative messages transmitted by site controller 410 over link 412(dl) to the trunking cards.

9.2.1 GETC Setup Command (01 HEX)

To: Trunking card
From: Site Controller 410

The trunking card is configured as a control channel, working channel, or downlink trunking card at power up or reset using this message.

One message data byte is used to configure or reconfigure the trunking card.

The message data byte bit definition is given below:

| | | |
|---|---|---|
| b7 b6 = | 0 0 | disable the GETC from any functional channel processing |
| | 0 1 | enable the GETC for control channel processing |
| | 1 1 | enable the GETC for downlink channel processing |
| b5 = | 0 | steer the GETC to the master site controller |
| | 1 | steer the GETC to the backup site controller |
| b4 b3 b2 b1 b0 | | channel number of the GETC at the pst site |

9.2.2 GETC Broadcast Count (02 HEX)

To: Trunking card
From: Site controller 410

The site controller 410 transmits to the trunking card the current broadcast count number. This is used by the trunking card to determine if a channel assignment or update message has been missed. If one has been missed, the trunking card will transmit its latest broadcast count number back to the site controller 410 indicating a missed assignment.

The message data byte contains the following:
b7 b6 b5 b4 b3 b2 b1 b0—broadcast count, module 256

At power up or reset, the trunking card awaits the broadcast message count from the site controller 410 before reporting any missed assignments.

9.2.3 GETC Status Request (07 HEX)

To: Trunking card
From: Site controller 410

The site controller 410 requests the status of the trunking card to monitor its activity. The items that are monitored include the present state of the trunking card (as determined by the internal state table), setup or configuration, the trunking card broadcast count, and the trunking card's present activity (e.g., present type of communication).

The message data byte contains which status value the GETC will return to the site controller 410.

| | |
|---|---|
| b7 b6 b5 b4 b3 b2 = | 0 0 0 0 0 0 |
| b1 b0 = | 0 0 present state |
| | 0 1 setup request |
| | 1 0 broadcast count |
| | 1 1 activity request |

9.2.4 GETC Failsoft Mode (F8 HEX)

To: Trunking card
From: Site controller 410

The site controller 410 instructs the trunking card to go to the failsoft mode of operation pending further communications.

The message data byte is encoded as follows:
b7 b6 b5 b4 b3 b2 b1 b0=0 1 0 1 0 1 0 1 (55 HEX)

9.2.5 GETC Test Message (FB HEX)

To: Trunking card
From: Site controller 410

The site controller 410 sets the trunking card into a test mode of operation. Before the site controller 410 transmits this command, the trunking card is put into the disabled mode of operation via the setup command. The tests that are performed include modem check, a site controller 410 serial test, and a hardware port value check. In the modem test for DLTC 450, a continuous data byte value is transmitted over the downlink path. In the modem test for an RF trunking card, a continuous data byte is transmitted over the air. In the site controller 410 serial test, a continuous byte is sent over the RS-232C bus to the site controller 410. In the hardware port test, the specified port on the trunking card is loaded with the given message in byte 2.

The two message bytes are encoded as follows:

| | | |
|---|---|---|
| Byte 1 ---- | | |
| b7 b6 b5 b4 - hardware port location | | |
| b3 = | 0 | no hardware port test |
| | 1 | hardware port test enabled |
| b2 = | 0 | no site controller 410 |

-continued

|  |  |  |
|---|---|---|
| | 1 | serial test enabled |
| b1 = | 0 | no modem test |
| | 1 | modem test enabled |
| b0 = | 0 | no RF modem test |
| | 1 | RF modem test enabled |
| Byte 2 -- | | 8 bit binary data used in the specified test. |

9.2.6 GETC Reset Message (FD HEX)

To: Trunking card
From: Site controller 410

The site controller 410 instructs the trunking card to reset.

The message data byte is encoded as follows:

|  |
|---|
| b7 b6 b5 = 0 0 0 |
| b4 b3 b2 b1 b0 = trunking card identification (e.g., channel number) |

9.3 Retransmit Last Message (FE HEX)

The site controller instructs the trunking card to retransmit its last message. This occurs during bit errors and message framing errors.

The message data byte is encoded as follows:

|  |
|---|
| b7 b6 b5 = 0 0 0 |
| b4 b3 b2 b1 b0 -- GETC channel number (identification) |

In the downlink 103, site controller 410 administrative-type messages generally pass from the site controller 410 to downlink trunking card 450, and from the downlink trunking card on to the switch trunking card 454. The acknowledge message is used only between the downlink trunking card 450 and the switch trunking card 454 on the 9.2 kbps link 456.

9.4 Administrative Messages Transmitted From Trunking Cards to Site Controller 410 Over Links 412

A detailed description of each of the "administrative" messages transmitted by the trunking cards to site controller 410 over links 412 in the preferred embodiment appears below.

9.4.1 GETC Setup Response (01 HEX)

To: Site Controller 450
From: Trunking card

The trunking card sends its setup or configuration back to the site controller 450 in response to a status request command originated by the site controller 450.

The message data bytes are encoded as follows:

| Byte 1 ---- | | | |
|---|---|---|---|
| b7 b6 = | 0 0 | | trunking card disabled from any functional channel processing (abnormal) |
| | 0 1 | | trunking card performing control channel functions |
| | 1 0 | | trunking card performing control channel functions |
| | 1 1 | | trunking card performing downlink functions |
| b5 = | | 0 | GETC steered to the master site controller |
| | | 1 | GETC steered to the backup site controller |
| b4 b3 b2 b1 b0 | | | the identification number of the trunking card read from a five bit DIP switch setting | b7 and b6 are identical as provided by the GETC setup command from the site controller.
b5 may not be identical because once steered to the alternate site controller, the GETC may not find active communications present in which case it would steer to the active site controller.

| Byte 2 ---- | low order 8 bits forming the 14 bit FCC frequency code these bits are read from the DIP switch on the GETC |
|---|---|
| Byte 3 ---- | high order 6 bits forming the 14 bit FCC frequency code (embedded in the low order bits of message #3) these bits are read from the DIP switch on the GETC |

9.4.2 GETC Broadcast Count (02 HEX)

To: Site Controller 410
From: Trunking card

The trunking card transmits to the site controller its current broadcast count number.

This message is sent in response to a status request from the site controller 410 asking for the broadcast count—or whenever the next site controller 410 generated broadcast count message does not check with the trunking card broadcast count.

At power up or reset, the trunking card awaits the broadcast count message from the site controller 410 and sets its broadcast count to that value.

The message data byte contains the broadcast count number, modulo 256.

9.4.3 GETC Status Response (07 HEX)

To: Site Controller 410
From: Trunking card

The trunking card sends its present activity response back to the site controller 410 as requested by the site controller 410 in a status request message.

The present activity includes RF carrier indicating, on-air indicator, first power up or reset status and type of ongoing communication.

The message data byte contains the following bit designations:

| | | |
|---|---|---|
| b7 = | 0 | subsequent poll after reset |
| | 1 | first poll after reset |
| b6 = | 0 | RAM area ok |
| | 1 | RAM area error |
| b5 = | 0 | no transmit ongoing |
| | 1 | transmit ongoing |
| b4 = | 0 | no carrier being received |
| | 1 | carrier being received |
| b3 = | 0 | no emergency |
| | 1 | emergency call |
| b2 = | 0 | standard call |
| | 1 | special call |
| b1, b0 = | 0 0 | voice communication |
| | 0 1 | DVG communication |
| | 1 0 | data communication |
| | 1 1 | interconnect communication |

9.4.4 GETC Present State (F9 HEX)

To: Site Controller 410
From: Trunking card

The trunking card returns the present state to the site controller 410 upon request. The present state indicates the present trunking card activity.

The message byte is encoded to give the trunking card present state (0–255).

9.4.5 GETC Test Message (FB HEX)

To: Site Controller 410
From: Trunking card

The trunking card responds to the site controller 410 with the hardware port test configuration. This message is sent periodically in the trunking card test mode of operation. The trunking card reports the status of the onboard input latches or buffers. A total of 8 hardware registers are reported.

The two message bytes are encoded as follows:

| Byte 1 -- | | |
|---|---|---|
| | b7 b6 b5 b4 b3 | = 0 0 0 0 0 |
| | b2 b1 b0 -- | hardware port number |
| Byte 2 -- | | |
| | 8 bit value contained in the hardware port specified in byte #1 | |

9.4.6 Retransmit Last Message (FE HEX)

The trunking card instructs the site controller 410 to retransmit its last message. This occurs during bit errors and message framing errors.

The message data byte is encoded as follows:

| b7 b6 b5 = | 0 0 0 |
|---|---|
| b4 b3 b2 b1 b0 ---- | channel number |

9.5 Global Messages on Links 412 Originated By Site Controller 410

The following presents more detailed descriptions of some of the site controller to trunking card global messages.

9.5.1 Outbound Control Channel Single Slot Message (OD HEX)

To: Trunking card
From: Site Controller 410

The site controller sends a single slot message to the control channel GETC. This message includes channel updates, dynamic regroups, alias I.D.'s, status acknowledges, time mark, unit keyed/unkeyed/enable/disable, site I.D., and system operational mode.

The message data bytes are encoded as follows:

| Byte 1 ---- | |
|---|---|
| | b3 b2 b1 b0 = 0 0 0 0 least significant nibble of the radio message in the upper nibble |
| Byte 2 ---- | next byte of radio message |
| Byte 3 ---- | next byte of radio message |
| Byte 4 ---- | most significant byte of radio message |

9.5.2 Outbound Control Channel Assingment (08 HEX)

To: Trunking card
From: Site Controller 410

The site controller 410 sends a channel assignment to the trunking card. The outbound control channel assignment is composed of the 28 bit radio information field, a 4 bit field indicating originator of assignment, an 8 bit working channel setup and ½ logical ID and the hang time. The site controller 410 is also capable of dynamically reconfiguring the the working channels for a different communications mode (voice, DVG, data, or interconnect).

The message data bytes are encoded as follows:

| Byte 1 ---- | |
|---|---|
| | b3 = 0 radio originated call |
| | 1 console 102 originated call |
| | b2 b1 b0 = 0 0 0 least significant nibble of radio message in the upper nibble |
| Byte 2 ---- | next byte of radio message |
| Byte 3 ---- | next byte of radio message |
| Byte 4 ---- | most significant byte of radio message |
| Byte 5 ---- | hang time byte |
| | b7 b6 b5 b4 b3 b2 b1 b0 = 0 to 255 seconds |
| Byte 6 ---- | working channel setup byte and ½ logical ID |
| b7 = 0 | standard working channel handshake |
| 1 | special call working channel handshake |
| b6 = 0 | no repeat of inbound working channel messages |
| 1 | repeat of inbound working channel messages |
| b5 b4 b3 b2 b1 b0 -- | ½ logical ID for the second message in a 2-slot outbound message |

9.5.3 Outbound Working Channel Radio Programming Message (19 HEX)

To: Trunking card
From: Site Controller 410

The site controller 410 instructs a working channel trunking card to buffer the data to be sent to the mobile radio unit.

The message data byte length is variable and is encoded as follows:

| Byte 1 ---- | packet number (0 through 255, module 256) |
|---|---|
| Byte 2 ---- | packet size in bytes (0 through 255) |
| Byte 3 ---- | first byte in packet |
| Byte 4 ---- | second byte in packet |
| . | |
| . | |
| Byte N = | last byte in packet |

9.5.4 Outbound Control Channel Concatenated Message (OB HEX)

The site controller 410 transmits a concatenated message to the trunking card. The concatenated message is a 2-slotted message to the mobile radio units. The site controller 410 provides mobiles with site status information, dynamic regroup preconfiguration plans, ID assignments, and programming channel assignments.

The site controller passes 8 messages bytes of information to the trunking card. These message data bytes are encoded as follows:

| Byte 1 ---- | |
|---|---|
| | b3 b2 b1 b0 = 0 0 0 0 |

| | |
|---|---|
| | first radio slot, least significant nibble of radio message in the upper nibble |
| Byte 2 ---- | first radio slot, next type of radio message |
| Byte 3 ---- | first radio slot, next byte of radio message |
| Byte 4 ---- | first radio slot, most significant byte of radio message |
| Byte 5 ---- | |
| | b3 b2 b1 b0 = 0 0 0 0 second radio slot, least significant nibble of radio message in the upper nibble |
| Byte 6 ---- | second radio slot, next byte of radio message |
| Byte 7 ---- Byte | second radio slot, next byte of radio message |
| Byte 8 ---- | second radio slot, most significant byte of radio message |

9.5.5 Outbound Working Channel Repeat Audio Enable/Disable (1A HEX)

The site controller 410 instructs the trunking card working channel to enable or disable the repeat audio path of the mobile communication. This is used to quickly disable inactive users.

The message data byte is encoded as follows:

| | |
|---|---|
| b7 = 0 | disable repeat audio path |
| 1 | enable repeat audio path |
| b6 b5 = 0 0 | |
| b4 b3 b2 b1 b0 -- GETC number of specified channel | |

9.5.6 Outbound Working Channel Drop Message (1C HEX)

The site controller 410 instructs the working channel to abruptly terminate all communications activity.

The message data byte are encoded as follows:

| |
|---|
| b7 b6 b5 = 0 0 0 |
| b4 b3 b2 b1 b0 -- GETC (working channel) number |

9.5.7 Transmit FCC Station Identification (F7 HEX)

The site controller instructs the trunking card working channel to transmit the FCC station identification Morse code over the RF airways. The FCC ID is padded with bytes of 00 to a length of 12 bytes.

The format of the message data bytes are as follows:

| | |
|---|---|
| Byte 1 ---- | message data byte count |
| Byte 2 ---- | first data byte of FCC code |
| . | |
| . | |
| Byte 12 ---- | last data byte of FCC code |

9.6 Global Messages on Links 412 Transmitted by Trunking Cards 450 to Site Controller 410

Below are detailed descriptions of exemplary formats for each of the "global" messages sent by the trunking cards to site controller 410 over links 412.

9.6.1 Inbound Control Channel Message (08 HEX)

To: Site Controller 410
From: Trunking card

The trunking card sends a radio control channel message to the site controller 410. The inbound control channel message is composed of the actual 28 bit radio data with a 4 bit header. The 4 bit header is comprised of zeros.

The trunking card passes 4 bytes of information to the site controller. The message data bytes are encoded as follows:

| | |
|---|---|
| Byte 1 | b3 b2 b1 b0 = 0 0 0 0 least significant nibble of message in the upper nibble |
| Byte 2 | next byte of radio message |
| Byte 3 | next byte of radio message |
| Byte 4 | most significant byte of radio message |

9.6.2 Inbound Working Channel Message (10 HEX)

To: Site Controller 410
From: Trunking card

The trunking card transmits the standard inbound working channel message without mobile AVL information to the site controller 410. The messages that are passed to the site controller 410 include the key, unkey, drop channel, null message, and radio dotting message.

The trunking card passes 3 bytes of message information to the site controller 410. These bytes are encoded as follows:

| | | |
|---|---|---|
| Byte 1 | | |
| b3 b2 b1 = 0 0 0 | | normal message or |
| b0 = 0 | | channel drop message |
| 1 | | channel drop occurred without radio arriving on the specified working channel to complete the standard initial handshaking of dotting least significant nibble or radio message in the upper nibble |
| Byte 2 | next byte of radio message | |
| Byte 3 | most significant byte of radio message | |

10.0 Messages on Landline Link 452 Between Downlink Trunking Card 450 and Switch Trunking Card 454

The interface between the DLTC 450 and the switch TC 454 is a standard landline serial link 452 terminating at each end in standard wiring and standard connectors. All site audio wiring enters the dispatch center through a standard telephone block. The telephone lines are run between the DLTC 450 and switch TC 454 (each channel is provided with its own cable). Standard connectors are used at each end of the telephone cable. Link 452 is operated in the full duplex mode, with message transmission occurring in both directions at any given time. Exclusive-OR BCH checksums are used to insure data integrity.

The transmission bit rate on landline link 452 is 9.6 kbps as determined by the downlink trunking card 450. Messages are transmitted over link 452 in packets, each packet containing one or two messages. Data is exchanged by packets over link 452 using an automatic retransmission unless acknowledge protocol—meaning that the transmitting trunking card will retransmit a data packet (up to three times in the preferred embodiment) until the receiving trunking card sends an acknowledgement message indicating it has correctly received the packet.

The receiving trunking card may acknowledge correct receipt of a packet by transmitting an acknowledgement message to the transmitting trunking card, this acknowledgement message specifying message type and packet number. If the received packet contains an administrative message requiring a response by the receiving trunking card, acknowledgement is made by transmitting the requested response. If no acknowledgement is received within three message times after the last byte of the packet has been transmitted, the packet is automatically retransmitted (up to a maximum of three times).

Packet frames may be transmitted without interruption, with acknowledgement messages being interspersed between other packets as they occur. Link 452 is synchronous, so that dotting is transmitted if the transmit buffer is empty.

The frame format for data packets transmitted over link 452 is as follows:

TABLE 11

| Byte Number | Character |
|---|---|
| 1,2 | Barker code |
| 3 | GETC code start byte |
| 4 | packet number (if needed) |
| 5,n | message blocks (1 or 2) |
| n + 1 | checksum (if required) |

10.1 Administrative Messages Carried by Landline Link 452 Between DLTC 450 and Switch TC 454

Administrative messages are used to transfer global messages, keep byte and message synchronization, and pass administrative status information between the DLTC 450 and switch TC 454. The link is used in the full duplex mode, with message transmission occurring in both directions at any given time. Exclusive-OR checksums are used to insure data integrity. An "acknowledge" or any other administrative message forces message and byte synchronization. The DLTC responds to send configuration messages with a downlink, working or control channel administrative message.

The following are exemplary administrative message formats carried by landline link 452 between DLTC 450 and switch TC 454.

10.1.1 Working Channel Configuration Message

| MESSAGE TYPE: | Administrative |
|---|---|
| MESSAGE NUMBER: | 87 |
| OVERALL LENGTH: | 6 bytes |
| WHEN SENT: | Transmitted only by the DLTC 450 in response to receiving a working channel command from the site controller 410. |
| SOURCE: | DLTC 450 |
| ORIGINAL SOURCE: | Site controller 410 |
| DESTINATION: | switch 457 |
| FINAL DESTINATION: | switch 457 |

WORKING CHANNEL MESSAGE FORMAT

| Byte # | 7 | 6 | 5 | 4 | 3 | 2 | 1 | 0 | Description |
|---|---|---|---|---|---|---|---|---|---|
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 0 | 0 | 0 | 0 | 0 | 0 | 1 | GID message id = 87 |
| 3 | 0 | 0 | 1 | 0 | 0 | 1 | 0 | 1 | PKT packet number of this message. |
| 4 | 0 | 0 | 0 | 0 | 0 | 0 | 0 | 0 | Not used |
| 5 | 0 | 1 | 1 | 0 | 0 | 0 | 0 | 1 | CHK exclusive or checksum |

10.1.2 Downlink Channel Configuration Message

| MESSAGE TYPE: | Administrative |
|---|---|
| MESSAGE NUMBER: | 88 |
| OVERALL LENGTH: | 6 bytes |
| WHEN SENT: | Transmitted only by the DLTC 450 in response to receiving a downlink channel command from the site controller. |
| SOURCE: | DLTC 450 |
| ORIGINAL SOURCE: | Site controller 410 |
| DESTINATION: | switch 457 |
| FINAL DESTINATION: | switch 457 |

DOWNLINK CHANNEL MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 1 | 0 | 1 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 1 | 0 | 0 | 0 | GID message id = 88 |
| 3 | 0 | 0 | 1 | 0 | 0 | 1 | 0 | 1 | PKT packet number of this message. |
| 4 | 0 | 0 | 0 | 0 | 0 | 0 | 0 | 0 | Not used |
| 5 | 0 | 0 | 1 | 1 | 1 | 0 | 0 | 1 | CHK exclusive or checksum |

10.1.3 Control Channel Configuration Message

| MESSAGE TYPE: | Administrative |
|---|---|
| MESSAGE NUMBER: | 89 |
| OVERALL LENGTH: | 6 bytes |
| WHEN SENT: | Transmitted only by the DLTC 450 in response to receiving a control channel command from the site controller 410. |
| SOURCE: | DLTC 450 |
| ORIGINAL SOURCE: | site controller 410 |
| DESTINATION: | Switch 457 |
| FINAL DESTINATION: | Switch 457 |

CONTROL CHANNEL MESSAGE FORMAT

| Byte # | 7 | 6 | 5 | 4 | 3 | 2 | 1 | 0 | Description |
|---|---|---|---|---|---|---|---|---|---|
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 1 | 0 | 0 | 0 | GID message id = 89 |
| 3 | 0 | 0 | 1 | 0 | 0 | 1 | 0 | 1 | PKT packet number of this message. |
| 4 | 0 | 0 | 0 | 0 | 0 | 0 | 0 | 0 | Not used |
| 5 | 0 | 0 | 1 | 1 | 1 | 0 | 0 | 0 | CHK exclusive or checksum |

10.1.4 Acknowledge Message

| MESSAGE TYPE: | Administrative |
|---|---|
| MESSAGE NUMBER: | 90 |
| OVERALL LENGTH: | 6 bytes |
| WHEN SENT: | Transmitted by either DLTC 450 or switch 457 in response to correctly receiving a global message. |
| SOURCE: | Switch 457 or DLTC 450 |

-continued

| | ORIGINAL SOURCE: | Switch 457 or DLTC 450 |
| --- | --- | --- |
| | DESTINATION: | DLTC 450 or switch 457 |
| | FINAL DESTINATION: | DLTC 450 or switch 457 |

ACKNOWLEDGE MESSAGE FORMAT

| | Bit # | | | | | | | |
| --- | --- | --- | --- | --- | --- | --- | --- | --- |
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 1 | 0 | 1 | 0 | GID message id = 90 |
| 3 | 0 | 0 | 1 | 0 | 0 | 1 | 0 | 1 | PKT packet number of this message. |
| 4 | 0 | 0 | 0 | 0 | 1 | 0 | 0 | 1 | PKT packet number of acknowledged global message. |
| 5 | 0 | 0 | 1 | 1 | 0 | 0 | 1 | 1 | CHK exclusive or checksum |

10.1.5 Not Acknowledge Message

| MESSAGE TYPE: | Administrative |
| --- | --- |
| MESSAGE NUMBER: | 91 |
| OVERALL LENGTH: | 6 bytes |
| WHEN SENT: | Transmitted by either in DLTC 450 or switch 457 in response to incorrectly receiving a global message. |
| SOURCE: | Switch 457 or DLTC 450 |
| ORIGINAL SOURCE: | Switch 457 or DLTC 450 |
| DESTINATION: | DLTC 450 or switch 457 |

NOT ACKNOWLEDGE MESSAGE FORMAT

| | Bit # | | | | | | | |
| --- | --- | --- | --- | --- | --- | --- | --- | --- |
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 1 | 0 | 1 | 1 | GID message id = 91 |
| 3 | 0 | 0 | 1 | 0 | 0 | 1 | 0 | 1 | PKT packet number of this message. |
| 4 | 0 | 0 | 0 | 0 | 1 | 0 | 0 | 1 | PKT packet number of acknowledged global message. |
| 5 | 0 | 0 | 1 | 1 | 0 | 0 | 1 | 0 | CHK exclusive or checksum |

10.2 Global Messages Originated by Site Controller 410 which are Communicated Over Landline Link 452 from DLTC 450 to Switch TC 454

Landline link 452 carries global messages between DLTC 450 and switch TC 454 on one leg of their journey traversing downlink 103 between site controller 420 and switch 457. These global messages are divided into two categories: console requests issued by switch 457 to the site controller 410; and site controller commands. The site controller commands may be responses to console resource requests, or responses to mobile resource requests. The DLTC 450 and switch TC 454 do not directly recognize the content of the global messages that they are transferring in the preferred embodiment.

The switch main processor may request the site controller to provide a RF channel in response to a console 102 push to talk (PTT) command. The switch 457 may also request the RF channel to be released following a console unkey command. For patch or "simul-select" operation, a patch id is required from the site controller before a RF channel request may be made. Deactivating a patch or "simul-select" requires that the patch id be deactivated also.

Since the site controller manages the RF channels during normal system operations, all channel assignments and deassignments are made through the site controller 410. Mobile, portable and console channel requests are all honored. Any channel assignment or deassignment generates a message to the dispatch center through the downlink. The site controller 410 also assigns a patch id for patch and simul-select operation. These assignments and deassignments of patch id also generate messages to the dispatch center via the downlink.

The following is a description of the repertoire of exemplary global messages transmitted by DLTC 450 over landline link 452 to switch TC 454 in response to global messages received by the DLTC from site controller 410:

10.2.1 Single Slot Control Channel Message

| MESSAGE TYPE: | Global |
| --- | --- |
| MESSAGE NUMBER: | 13 |
| OVERALL LENGTH: | 14 bytes |
| WHEN SENT: | Issued by the site controller to the dispatch center when control information is requested or required by the dispatch center |
| SOURCE: | DLTC 450 |
| ORIGINAL SOURCE: | site controller 410 |
| DESTINATION: | Switch TC 454 |
| FINAL DESTINATION: | Console 102 or other control node on switch 457 |

SINGLE SLOT CONTROL CHANNEL FORMAT

| | Bit # | | | | | | | |
| --- | --- | --- | --- | --- | --- | --- | --- | --- |
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 0 | 0 | 0 | 1 | 1 | 0 | 1 | GID message id = 13 |
| 3 | 0 | 0 | 1 | 0 | 0 | 1 | 0 | 1 | PKT packet number of this message. |
| 4 | 0 | 0 | 0 | 0 | | | | | OC1 28 bit message extracted from the site controller 410 message (most significant nibble) |
| | | | | | 1 | 0 | 0 | 1 | OC2 most significant nibble |
| 5 | 0 | 1 | 1 | 0 | | | | | OC3 next significant nibble |
| | | | | | 1 | 1 | 0 | 0 | OC4 next significant nibble |
| 6 | 0 | 1 | 1 | 0 | | | | | OC5 next significant nibble |
| | | | | | 0 | 0 | 0 | 0 | OC6 next significant nibble |
| 7 | 0 | 1 | 1 | 0 | | | | | OC7 least significant nibble |
| | | | | | 0 | 0 | 0 | 0 | BC1 most significant BCH nibble |
| 8 | 0 | 1 | 1 | 0 | 0 | 0 | 0 | 0 | BC2 least significant BCH byte |
| 9 | 0 | 0 | 0 | 0 | | | | | OC1 28 bit message extracted from the site controller 410 message (most significant nibble) |
| | | | | | 1 | 0 | 0 | 1 | OC2 next significant nibble |
| 10 | 0 | 1 | 1 | 0 | | | | | OC3 next significant nibble |
| | | | | | 1 | 1 | 0 | 0 | OC4 next significant nibble |
| 11 | 0 | 1 | 1 | 0 | | | | | OC5 next significant nibble |
| | | | | | 0 | 0 | 0 | 0 | OC6 next significant nibble |
| 12 | 0 | 1 | 1 | 0 | | | | | OC7 least significant nibble |
| | | | | | 0 | 0 | 0 | 0 | BC1 most significant BCH |

-continued

| | | | | | | | | |
|---|---|---|---|---|---|---|---|---|
| 13 | 0 | 1 | 1 | 0 | 0 | 0 | 0 | 0 | BC2 least significant BCH byte nibble |

NOTE: CONTROL CHANNEL OUTBOUND.

10.2.2 Two-Slot Control Channel Message

| | |
|---|---|
| MESSAGE TYPE: | Global |
| MESSAGE NUMBER: | 8 |
| OVERALL LENGTH: | 10 bytes |
| WHEN SENT: | Issued by the site controller when any channel assignment is issued. This includes standard and emergency channel assignments |
| SOURCE: | DLTC 450 |
| ORIGINAL SOURCE: | site controller 410 |
| DESTINATION: | Switch TC 454 |
| FINAL DESTINATION: | Console 102 or other control node on switch 457 |

TWO-SLOT CONTROL CHANNEL MESSAGE

| Byte # | 7 | 6 | 5 | 4 | 3 | 2 | 1 | 0 | Description |
|---|---|---|---|---|---|---|---|---|---|
| 0 | 0 | 0 | 1 | 0 | 1 | 0 | 1 | 1 | BK1 Barker byte 57 |
| 1 | 0 | 0 | 0 | 0 | 1 | 0 | 0 | 1 | 0 | BK2 Barker byte 12 |
| 2 | 0 | 0 | 0 | 0 | 1 | 0 | 0 | 0 | GID message id = 08 |
| 3 | 0 | 0 | 1 | 0 | 0 | 1 | 0 | 1 | PKT packet number of this message |
| 4 | 0 | 0 | 0 | 0 | | | | | OCA 36 bit message extracted from a concatenated control channel message |
| | | | | | 1 | 0 | 0 | 1 | OCB next significant nibble |
| 5 | 0 | 1 | 1 | 0 | | | | | OCC next significant nibble |
| | | | | | 1 | 1 | 0 | 0 | OCD next significant nibble |
| 6 | 0 | 1 | 1 | 0 | | | | | OCE next significant nibble |
| | | | | | 0 | 0 | 0 | 0 | OCF next significant nibble |
| 7 | 0 | 1 | 1 | 0 | | | | | OCG next significant nibble |
| | | | | | 0 | 0 | 0 | 0 | OCH next significant nibble |
| 8 | 0 | 1 | 1 | 0 | | | | | OCI least significant nibble |
| | | | | | 0 | 0 | 0 | 0 | BC1 most significant BCM nibble |
| 9 | 0 | 1 | 1 | 0 | 0 | 0 | 0 | 0 | BC2 least significant BCH byte |

NOTE: 2-SLOT CONTROL CHANNEL OUTBOUND

10.2.3 Working Channel Message

| | |
|---|---|
| MESSAGE TYPE: | Global |
| MESSAGE NUMBER: | 16 |
| OVERALL LENGTH: | 16 bytes |
| WHEN SENT: | Issued by the site controller when any working channel message is issued. This includes all working channel messages |
| SOURCE: | DLTC 450 |
| ORIGINAL SOURCE: | site controller 410 |
| DESTINATION: | Switch TC 454 |
| FINAL DESTINATION: | Console 102 or other control node on switch 457 |

WORKING CHANNEL FORMAT

| Byte # | 7 | 6 | 5 | 4 | 3 | 2 | 1 | 0 | Description |
|---|---|---|---|---|---|---|---|---|---|
| 0 | 0 | 0 | 1 | 0 | 1 | 0 | 1 | 1 | BK1 Barker byte 57 |
| 1 | 0 | 0 | 0 | 0 | 1 | 0 | 0 | 1 | 0 | BK2 Barker byte 12 |
| 2 | 0 | 0 | 0 | 1 | 0 | 0 | 0 | 0 | GID message id = 16 |
| 3 | 0 | 0 | 1 | 0 | 0 | 1 | 0 | 1 | PKT packet number of this message |
| 4 | 0 | 0 | 0 | 0 | | | | | OW1 20 bit message extracted from the site controller 410 working channel message (most significant nibble) |
| | | | | | 1 | 0 | 0 | 1 | OW2 most significant nibble |
| 5 | 0 | 1 | 1 | 0 | | | | | OW3 next significant nibble |
| | | | | | 1 | 1 | 0 | 0 | OW4 next significant nibble |
| 6 | 0 | 1 | 1 | 0 | | | | | OW5 least significant nibble |
| | | | | | 0 | 0 | 0 | 0 | BC1 most significant BCH nibble |
| 7 | 0 | 1 | 1 | 0 | 0 | 0 | 0 | 0 | BC2 least significant BCH byte |
| 8 | 0 | 0 | 0 | 0 | | | | | OW1 20 bit message extracted from the global message (most significant nibble) |
| | | | | | 1 | 0 | 0 | 1 | OW2 next significant nibble |
| 9 | 0 | 1 | 1 | 0 | | | | | OW3 next significant nibble |
| | | | | | 1 | 1 | 0 | 0 | OW4 next significant nibble |
| 10 | 0 | 1 | 1 | 0 | | | | | OW5 least significant nibble |
| | | | | | 0 | 0 | 0 | 0 | BC1 most significant BCH nibble |
| 11 | 0 | 1 | 1 | 0 | 0 | 0 | 0 | 0 | BC2 least significant BCH byte |

NOTE: ALL WORKING CHANNEL MESSAGES.

10.2.4 Patch/Simu-Select Collection Acknowledge Message

| | |
|---|---|
| MESSAGE TYPE: | Global |
| MESSAGE NUMBER: | 82/85 |
| OVERALL LENGTH: | 8 bytes |
| WHEN SENT: | Transmitted by a DLTC 450 when it receives a modem GID of 82 (patch collection ack) or 85 (simul-slect collection ack). Both modem messages are converted into a single console message. The protocol conversion is identical for both GIDs. |
| SOURCE: | DLTC 450 |
| ORIGINAL SOURCE: | site controller 410 |
| DESTINATION: | Switch TC 454 |
| FINAL DESTINATION: | Console 102 or other control node on switch 457 |

COLLECTION ACKNOWLEDGE MESSAGE FORMAT

| Byte # | 7 | 6 | 5 | 4 | 3 | 2 | 1 | 0 | Description |
|---|---|---|---|---|---|---|---|---|---|
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 0 | 0 | 1 | 0 | GID message id = 82 patch |
| or 2 | 0 | 1 | 0 | 1 | 0 | 1 | 0 | 1 | GID message id = 85 semsel |
| 3 | 0 | 0 | 1 | 0 | 0 | 0 | 0 | 0 | PKT packet number of this |

-continued

| Byte # | 7 | 6 | 5 | 4 | 3 | 2 | 1 | 0 | Description |
|---|---|---|---|---|---|---|---|---|---|
| 4 | | | | 0 | | | | | PSS set if patch message |
| | | | | | 0 | 0 | 0 | | Not used |
| | | | | | 1 | 1 | 1 | 0 | Reserved |
| 5 | 0 | | | | | | | | Reserved |
| | | 1 | 1 | 0 | 0 | 0 | 1 | 1 | GRP patch id |
| 6 | 0 | 0 | 0 | 1 | | | | | GRP patch id |
| | | | | | 1 | | | | MAK modify ack = 1 |
| | | | | | | 0 | 0 | 0 | Not used |
| 7 | 0 | 1 | 1 | 0 | 0 | 0 | 0 | 0 | CHK checksum |

10.2.5 Patch/Simul-Select Activate/Deactivate Message

| | |
|---|---|
| MESSAGE TYPE: | Global |
| MESSAGE NUMBERS: | 80/83 |
| OVERALL LENGTH: | 8 bytes |
| WHEN SENT: | Transmitted by a DLTC 450 upon receiving a similar message from the site controller 410. These messages spawn messages to the dispatch center consoles 102. The dispatch center GETC receives a patch activate/deactivate message GID 80 or simul-select activate/deactivate message GID which spawn console messages: patch/simul-select activate (MID 16) and patch/simul-select deactivate (MID 11). |
| SOURCE: | DLTC 450 |
| ORIGINAL SOURCE: | site controller 410 |
| DESTINATION: | Switch TC 454 |
| FINAL DESTINATION: | Console 102 or other control node on switch 457 |

PATCH/SIMUL-SELECT ACTIVATE/DEACTIVATE MESSAGE FORMAT

| Byte # | 7 | 6 | 5 | 4 | 3 | 2 | 1 | 0 | Description |
|---|---|---|---|---|---|---|---|---|---|
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 0 | 0 | 0 | 0 | GID message id = 80 patch |
| or | | | | | | | | | |
| 2 | 0 | 1 | 0 | 1 | 0 | 0 | 1 | 1 | GID message id = 83 simsel |
| 3 | 0 | 0 | 0 | 1 | 1 | 1 | 1 | 1 | PKT packet number of this message |
| 4 | 0 | | | | | | | | PSS set if patch |
| | | 1 | | | | | | | ACT set if activation |
| | | | 0 | 0 | | | | | Not used |
| | | | | | 1 | 1 | 1 | 1 | Reserved |
| 5 | 0 | | | | | | | | Reserved |
| | | 1 | 1 | 1 | 0 | 0 | 0 | 0 | GRP group id |
| 6 | 0 | 1 | 1 | 0 | | | | | GRP group id |
| | | | | | 0 | 0 | 0 | 0 | Not used |
| 7 | 0 | 1 | 1 | 1 | 1 | 0 | 1 | 1 | CHK checksum |

10.3 Console Originated Global Messages Carried by Landline 452 from Switch TC 454 to DLTC 450

The switch 457 is capable of generating global messages which are communicated by downlink 103 to site controller 410. These switch-generated global messages in the preferred embodiment are derived from commands issued by an operator of console 102. When switch TC 454 receives a global message from switch 457, the switch TC simply passes the message along (after translation and other modification) over landline link 452 to DLTC 450. DLTC 450, in turn, passes the message to site controller 410 for processing.

All console (switch) initiated global messages in the preferred embodiment are either "resource request" or "status" messages. When a console PTT button is depressed and a RF channel is required, a group call or individual call message is sent over the downlink 103 to the site controller. Both of these messages are resource request (RF channel request) messages.

As an example of one common scenario, suppose an RF channel is assigned and a conversation has started between a console operator and a mobile radio transceiver. When the console operator "unkeys" his microphone, a console (switch) originated global unkey message is sent to the site controller in response to the console unkey. The global unkey message is communicated by downlink 103 from switch 457 to site controller 410 and is processed by the site controller.

A console unkey command may or may not generate a channel deassignment from the site controller 410. If the system is configured for transmission trunking, a channel deassignment (from the site controller) will immediately follow any unkey. However, if the system is message trunked, a hold ("hang") time is established so that channels are not dropped immediately after an unkey. When a channel is open and available, the key message will suffice in notifying the site controller of the console's 102 intention to use the channel.

As another example, for multiple group operation, a patch id is assigned to each patch and simul-select button on the console 102. When a patch id is generated or modified in the console 102, a console-originated global "modify patch" message is sent from switch 457 to site controller 410 over downlink 103. The patch id and group and individual collection information contained in this "modify patch" message is stored at the site controller. Multiple group calls are activated and deactivated through messages to the site controller. These messages are requests for use of a patch id. The site controller must check the system configuration before approving the patch id usage.

The following describes in detail the types of console initiated messages carried by landline link 452 from switch TC 454 to DLTC 450. Each of these landline messages obviously corresponds to a console initiated global message carried by link 456 between switch 457 and switch TC 454.

10.3.1 Single Slot Control Channel Message

| | |
|---|---|
| MESSAGE TYPE: | Global |
| MESSAGE NUMBER: | 08 |
| OVERALL LENGTH: | 14 bytes |
| WHEN SENT: | Transmitted by switch 457 when it receives a global message with a message id of 24, 25, 30, 31 or 34 |
| SOURCE: | switch TC 454 |
| ORIGINAL SOURCE: | Console 102 or other control node on switch 457 |
| DESTINATION: | DLTC 450 |
| FINAL DESTINATION: | site controller 410 |
| CONTROL CHANNEL INBOUND MT-A: | 00 |

SINGLE SLOT CONTROL CHANNEL FORMAT

| Byte # | 7 | 6 | 5 | 4 | 3 | 2 | 1 | 0 | Description |
|---|---|---|---|---|---|---|---|---|---|

| 0 | 0 | 1 | 0 | 1 | 0 | 1 | 1 | 1 | BK1 Barker byte 57 |
|---|---|---|---|---|---|---|---|---|---|
| 1 | 0 | 0 | 0 | 1 | 0 | 0 | 1 | 0 | BK2 Barker byte 12 |
| 2 | 0 | 0 | 0 | 0 | 1 | 0 | 0 | 0 | GID message id=08 |
| 3 | 0 | 0 | 1 | 0 | 0 | 1 | 0 | 1 | PKT packet number of this message |
| 4 | 0 | 0 | 0 | 0 | | | | | IC1 28 bit message extracted from the global message (most significant nibble) |
| | | | | | 1 | 0 | 0 | 1 | IC2 next significant nibble |
| 5 | 0 | 1 | 1 | 0 | | | | | IC3 next significant nibble |
| | | | | | 1 | 1 | 0 | 0 | IC4 next significant nibble |
| 6 | 0 | 1 | 1 | 0 | | | | | IC5 next significant nibble |
| | | | | | 0 | 0 | 0 | 0 | IC6 next significant nibble |
| 7 | 0 | 1 | 1 | 0 | | | | | IC7 least significant nibble |
| | | | | | 0 | 0 | 0 | 0 | BC1 most significant BCH nibble |
| 8 | 0 | 1 | 1 | 0 | 0 | 0 | 0 | 0 | BC2 least significant BCH byte |
| 9 | 0 | 0 | 0 | 0 | | | | | IC1 28 bit message extracted from the global message |
| | | | | | 1 | 0 | 0 | 1 | IC2 next significant nibble |
| 10 | 0 | 1 | 1 | 0 | | | | | IC3 next significant nibble |
| | | | | | 1 | 1 | 0 | 0 | IC4 next significant nibble |
| 11 | 0 | 1 | 1 | 0 | | | | | IC5 next significant nibble |
| | | | | | 0 | 0 | 0 | 0 | IC6 next significant nibble |
| 12 | 0 | 1 | 1 | 0 | | | | | IC7 least significant nibble |
| | | | | | 0 | 0 | 0 | 0 | BCH1 most significant BCH nibble |
| 13 | 0 | 1 | 1 | 0 | 0 | 0 | 0 | 0 | BC2 least significant BCH byte |

10.3.2 Working Channel Message

| MESSAGE TYPE: | Global |
|---|---|
| MESSAGE NUMBER: | 16 |
| OVERALL LENGTH: | 12 bytes |
| WHEN SENT: | Transmitted by switch 457 when it receives a global message with a message id of 27, 28 or 33 |
| SOURCE: | switch TC 454 |
| ORIGINAL SOURCE: | Console 102 or other control node on switch 457 |
| DESTINATION: | DLTC 450 |
| FINAL DESTINATION: | site controller 410 |

WORKING CHANNEL FORMAT

| | | | | Bit # | | | | | |
|---|---|---|---|---|---|---|---|---|---|
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 0 | 0 | 1 | 0 | 0 | 0 | 0 | GID message id=16 |
| 3 | 0 | 0 | 1 | 0 | 0 | 1 | 0 | 1 | PKT packet number of this message |
| 4 | 0 | 0 | 0 | 0 | | | | | IW1 20 bit message extracted from the global message (most significant nibble) |
| | | | | | 1 | 0 | 0 | 1 | IW2 most significant nibble |
| 5 | 0 | 1 | 1 | 0 | | | | | IW3 next significant nibble |
| | | | | | 1 | 1 | 0 | 0 | IW4 next significant nibble |
| 6 | 0 | 1 | 1 | 0 | | | | | IW5 least significant nibble |
| | | | | | 0 | 0 | 0 | 0 | BC1 most significant BCH nibble |
| 7 | 0 | 1 | 1 | 0 | 0 | 0 | 0 | 0 | BC2 least significant BCH byte |
| 8 | 0 | 0 | 0 | 0 | | | | | IW1 20 bit message extracted from the global message (most significant nibble) |
| | | | | | 1 | 0 | 0 | 1 | IW2 most significant nibble |
| 9 | 0 | 1 | 1 | 0 | | | | | IW3 next significant nibble |
| | | | | | 1 | 1 | 0 | 0 | IW4 next significant nibble |
| 10 | 0 | 1 | 1 | 0 | | | | | IW5 least significant nibble |
| | | | | | 0 | 0 | 0 | 0 | BC1 most significant BCH nibble |
| 11 | 0 | 1 | 1 | 0 | 0 | 0 | 0 | 0 | BC2 least significant BCH byte |

10.3.3 Patch/Simul-Select Collection Message

| MESSAGE TYPE: | Global |
|---|---|
| MESSAGE NUMBER: | 81/84 |
| OVERALL LENGTH: | 12 bytes |
| WHEN SENT: | Transmitted by switch 457 when it receives a console message id of 29. The received message spawns into one of two sets of messages based on whether the message is a patch or simul-select message. The modem GIDs for the simul-select messages are 84 and 85, while the GIDs for the patch messages are 81 and 82. Two GIDs are required: one GID is used as a header message which transfers the group count and individual count associated with the collection. The other GID is used to transfer the groups and individuals in the collection. |
| SOURCE: | switch TC 454 |
| ORIGINAL SOURCE: | Console 102 |
| DESTINATION: | DLTC 450 |
| FINAL DESTINATION: | site controller 410 |

COLLECTION MESSAGE (HEADER FORMAT)

| | | | | Bit # | | | | | |
|---|---|---|---|---|---|---|---|---|---|
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 0 | 0 | 0 | 1 | GID mesage id=81 patch |
| or | | | | | | | | | |
| 2 | 0 | 1 | 0 | 1 | 0 | 1 | 0 | 0 | GID message id=84 simsel |
| 3 | 0 | 0 | 1 | | | | | | CNT count of the number of data messages which follow the header message |
| | | | | | | | 1 | | HDR header field=1 signifies that this message is the header message |
| | | | | | 1 | 0 | 1 | 0 | SPK least significant nibble |

-continued

| | | | Bit # | | | | | | |
|---|---|---|---|---|---|---|---|---|---|
| Byte # | 7 | 6 | 5 | 4 | 3 | 2 | 1 | 0 | Description |
| 4 | 0 | 1 | 1 | 0 | | | | | of the packet count GCT group count |
| | | | | | 0 | | | | PSS set if patch message |
| | | | | | | 1 | 1 | 1 | GRP patch id |
| 5 | 0 | 1 | 1 | 0 | 0 | 0 | 1 | 1 | GRP patch id |
| 6 | 0 | 0 | 0 | 1 | | | | | ICT individual count |
| | | | | | 1 | 1 | 0 | 0 | BC1 most significant BCH nibble |
| 7 | 0 | 1 | 1 | 0 | 0 | 0 | 0 | 0 | BC2 least significant BCH byte |
| 8 | 0 | 0 | 0 | 0 | | | | | Not used |
| | | | | | 1 | 0 | 0 | 1 | LID first logical id in collection or first group id if there is no logical id |
| 9 | 0 | 1 | 1 | 0 | 1 | 1 | 0 | 0 | LID logical id or group id |
| 10 | 0 | 0 | 0 | 0 | | | | | Not used |
| | | | | | 0 | 0 | 0 | 0 | BC1 most significant BCH nibble |
| 11 | 0 | 1 | 1 | 0 | 0 | 0 | 0 | 0 | BC2 least significant BCH byte |

COLLECTION MESSAGE (DATA FORMAT)

| | | | Bit # | | | | | | |
|---|---|---|---|---|---|---|---|---|---|
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 0 | 0 | 1 | 0 | GID message id=82 patch |
| or | | | | | | | | | |
| 2 | 0 | 1 | 0 | 1 | 0 | 1 | 0 | 1 | GID message id=85 simsel |
| 3 | 0 | 0 | 0 | | | | | | CNT count of the number of data messages which follow |
| | | | | | 0 | | | | HDR header field=0 signifies that this message is not a header message but a data message |
| | | | | | | 1 | 0 | 1 | 0 SPK least significant nibble of the packet count |
| 4 | 0 | 0 | 0 | 0 | | | | | Not used |
| | | | | | 1 | 0 | 0 | 1 | GRP first group id in collection |
| 5 | 0 | 1 | 1 | 0 | 1 | 1 | 0 | 0 | GRP group id |
| 6 | 0 | 0 | 0 | 0 | | | | | Not used |
| | | | | | 1 | 1 | 0 | 0 | BC1 most significant BCH nibble |
| 7 | 0 | 1 | 1 | 0 | 0 | 0 | 0 | 0 | BC2 least significant BCH byte |
| 8 | 0 | 0 | 0 | 0 | | | | | not used |
| | | | | | 1 | 0 | 0 | 1 | GRP second group id or null code 1010 if there are no more groups in the collection |
| 9 | 0 | 1 | 1 | 0 | 1 | 1 | 0 | 0 | GRP group id or null code 10101010 |
| 10 | 0 | 0 | 0 | 0 | | | | | not used |
| | | | | | 0 | 0 | 0 | 0 | BC1 most significant BCH nibble |
| 11 | 0 | 1 | 1 | 0 | 0 | 0 | 0 | 0 | BC2 least significant BCH byte |

NOTE: PATCH/SIMUL-SELECT COLLECTION MESSAGES.

10.3.4 Patch/Simul-Select Activate/Deactivate Message

| MESSAGE TYPE: | Global |
|---|---|
| MESSAGE NUMBERS: | 80/83 |
| OVERALL LENGTH: | 8 bytes |
| WHEN SENT: | Transmitted by a switch 457 when it receives a global message with a message id of 27 (activate patch/simsel) or 28 (deactivate patch/simsel). Due to the site controller 410 requirements, these messages are transformed into two modem messages with a GID of 80 (patch activate/deactivate) or 83 (simsel activate/deactivate). The format of both messages is the same. |
| SOURCE: | switch TC 454 |
| ORIGINAL SOURCE: | Console 102 or other control node on switch 457 |
| DESTINATION: | DLTC 450 |
| FINAL DESTINATION: | site controller 410 |

PATCH/SIMUL-SELECT ACTIVATE/DEACTIVATE MESSAGE FORMAT

| | | | Bit # | | | | | | |
|---|---|---|---|---|---|---|---|---|---|
| Byte # | 7 | 6 | 5 | 4 | 3 | 2 | 1 | 0 | Description |
| 0 | 0 | 1 | 0 | 1 | 0 | 1 | 1 | 1 | BK1 Barker byte 57 |
| 1 | 0 | 0 | 0 | 1 | 0 | 0 | 1 | 0 | BK2 Barker byte 12 |
| 2 | 0 | 1 | 0 | 1 | 0 | 0 | 0 | 0 | GID message id=80 patch |
| or | | | | | | | | | |
| 2 | 0 | 1 | 0 | 1 | 0 | 0 | 1 | 1 | GID message id=83 simsel |
| 3 | 0 | 0 | 0 | 1 | 1 | 1 | 1 | 1 | PKT packet number of this message |
| 4 | 0 | | | | | | | | |
| | | 1 | | | | | | | PSS set if patch ACT set if activation |
| | | | 0 | 0 | | | | | Not used |
| | | | | | 1 | 1 | | | Reserved |
| 5 | 0 | 0 | 0 | 0 | 0 | 1 | 1 | 0 | Reserved |
| | | | | | | | 1 | 0 | 0 GRP group id |
| 6 | 0 | 1 | 1 | 0 | 1 | 1 | 0 | 0 | GRP group id |
| 7 | 0 | 1 | 1 | 1 | 0 | 1 | 1 | 1 | CHK checksum |

11.0 Messages on Link 456 Between Switch 457 and Switch TC 454

Both global and local messages are transmitted over the high-speed link 456 between switch trunking card 454 and switch 457. The following describes messages transmitted over that link 456.

11.1 Administrative Messages Carried by Link 456 Between Switch 457 and Switch Trunking Card 454

The following are detailed descriptions of individual administrative messages communicated between switch TC 454 and switch 457 in the preferred embodiment:

11.1.1 Working Channel Configuration Message

| MESSAGE TYPE: | Administrative |
|---|---|
| MESSAGE NUMBER: | 01 |
| OVERALL LENGTH: | 3 bytes |
| WHEN SENT: | Transmitted only by the Switch TC 454 in response to receiving a send configuration message from the switch 457. |
| SOURCE: | Switch TC 454 |
| ORIGINAL SOURCE: | Switch TC 454 |
| DESTINATION: | Switch 457 |
| FINAL DESTINATION: | Switch 457 |

WORKING CHANNEL MESSAGE FORMAT

-continued

| Byte # | 7 | 6 | 5 | 4 | 3 | 2 | 1 | 0 | Description |
|---|---|---|---|---|---|---|---|---|---|
| 0 | 0 | 0 | 0 | 0 | 0 | 0 | 0 | 1 | MID Message id=01 |
|   |   |   |   |   |   |   |   |   | Not used |
| 1 | 0 | 0 | 0 | 0 | 0 | 0 | 0 | 0 | TLY data bytes to follow |
| 2 | 0 | 0 | 0 | 0 | 0 | 0 | 0 | 1 | CHK checksum |

11.1.2 Downlink Channel Configuration Message

| | |
|---|---|
| MESSAGE TYPE: | Administrative |
| MESSAGE NUMBER: | 02 |
| OVERALL LENGTH: | 3 bytes |
| WHEN SENT: | Transmitted only by the Switch TC 454 in response to receiving a send configuration message from the switch 457. |
| SOURCE: | Switch TC 454 |
| GENERAL SOURCE: | Switch TC 454 |
| DESTINATION: | Switch 457 |
| FINAL DESTINATION: | Switch 457 |

DOWNLINK CHANNEL MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 0 | 0 | 1 | 0 | MID Message id=02 |
|   |   |   |   |   |   |   |   |   | Not used |
| 1 | 0 | 0 | 0 | 0 | 0 | 0 | 0 | 0 | TLY data bytes to follow |
| 2 | 0 | 0 | 0 | 0 | 0 | 0 | 1 | 0 | CHK checksum |

11.1.3 Control Channel Configuration Message

| | |
|---|---|
| MESSAGE TYPE: | Administrative |
| MESSAGE NUMBER | 03 |
| OVERALL LENGTH: | 3 bytes |
| WHEN SENT: | Transmitted only by the Switch TC 454 in response to receiving a send configuration message from the switch. |
| SOURCE: | Switch TC 454 |
| ORIGINAL SOURCE: | Switch TC 454 |
| DESTINATION: | Switch 457 |
| FINAL DESTINATION: | Switch 457 |

CONTROL CHANNEL MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 0 | 0 | 1 | 1 | MID Message id=03 |
|   |   |   |   |   |   |   |   |   | Not used |
| 1 | 0 | 0 | 0 | 0 | 0 | 0 | 0 | 0 | TLY data bytes to follow |
| 2 | 0 | 0 | 0 | 0 | 0 | 0 | 1 | 1 | CHK checksum |

11.1.4 Acknowledge Message

| | |
|---|---|
| MESSAGE TYPE: | Administrative |
| MESSAGE NUMBER: | 04 |
| OVERALL LENGTH: | 3 bytes |
| WHEN SENT: | Transmitted by the Switch TC 454 or Switch 457 after receiving a global message with a correct checksum. |
| SOURCE: | Switch 457 or Switch TC 454 |
| ORIGINAL SOURCE: | Switch 457 or Switch TC 454 |
| DESTINATION: | Switch TC 454 or Switch 457 |
| FINAL DESTINATION: | Switch TC 454 or Switch 457 |

ACKNOWLEDGE MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 1 | 0 | 0 | | MID Message id=04 |
|   |   |   |   |   |   |   |   |   | Not used |
| 1 | 0 | 0 | 0 | 0 | 0 | 0 | 0 | 0 | TLY data bytes to follow |
| 2 | 0 | 0 | 0 | 0 | 0 | 1 | 0 | 0 | CHK checksum |

11.1.5 Not Acknowledge ("Negative") Message

| | |
|---|---|
| MESSAGE TYPE: | Administrative |
| MESSAGE NUMBER: | 05 |
| OVERALL LENGTH: | 3 bytes |
| WHEN SENT: | Transmitted by the Switch TC 454 or Switch 457 after receiving a global message with an incorrect checksum. Receipt of this message requires that the last message be retransmitted. |
| SOURCE: | Switch 457 or Switch TC 454 |
| ORIGINAL SOURCE: | Switch 457 or Switch TC 454 |
| DESTINATION: | Switch TC 454 or Switch 457 |
| FINAL DESTINATION: | Switch TC 454 or Switch 457 |

NOT ACKNOWLEDGE ("NEGATIVE") MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 0 | 0 | 0 | 1 | MID Message id=05 |
|   |   |   |   |   |   |   |   |   | Not used |
| 1 | 0 | 0 | 0 | 0 | 0 | 0 | 0 | 0 | TLY data bytes to follow |
| 2 | 0 | 0 | 0 | 0 | 0 | 1 | 0 | 1 | CHK checksum |

11.1.6 Send Configuration Message

| | |
|---|---|
| MESSAGE TYPE: | Administrative |
| MESSAGE NUMBER: | 06 |
| OVERALL LENGTH: | 3 bytes |
| WHEN SENT: | Transmitted by Switch 457 at a five second rate to establish the configuration of the Switch TC 454 and to maintain byte and message synchronization. |
| SOURCE: | Switch 457 |
| ORIGINAL SOURCE: | Switch 457 |
| DESTINATION: | Switch TC |
| FINAL DESTINATION: | Switch TC |

SEND CONFIGURATION MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 1 | 1 | 0 | | MID Message id=06 |
|   |   |   |   |   |   |   |   |   | R Retransmit (0 or 1) |
| 1 | 0 | 0 | 0 | 0 | 0 | 0 | 0 | 0 | TLY data bytes to follow |
| 2 | 0 | 0 | 0 | 0 | 0 | 1 | 1 | 0 | CHK checksum |

11.2 Link 456 Global Messages Originated by Switch 457 (Console 102) and Transmitted by Switch to Switch TC 454

The following are exemplary format and definitions of global messages originated by switch 457 and transmitted by switch 457 over link 456 to switch trunking card 454.

11.2.1 Group Call Message

| MESSAGE TYPE: | Global, control channel |
|---|---|
| MESSAGE NUMBER: | 24 |
| OVERALL LENGTH: | 9 bytes |
| GETC CODE: | 08 |
| WHEN SENT: | Transmitted by the console 102 to request a RF channel path to a group of field units (mobile or portable). This message is generated by any console PTT key for a group, whether or not a RF channel assignment already exists for that group. |
| SOURCE: | Switch 457 |
| ORIGINAL SOURCE: | Console 102 or other control node on Switch 457 |
| DESTINATION: | Switch TC 454 |
| FINAL DESTINATION: | Site Controller 410 |
| CONTROL CHANNEL | 00 |
| INBOUND MT-A: | |

GROUP CALL MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 1 | 1 | 0 | 0 | 0 | MID Message id=24 |
|   | 0 | | | | | | | | R retransmit =0 for first transmission |
| 1 | 0 | 0 | 0 | 0 | 0 | 1 | 1 | 0 | TLY 6 data bytes to follow, exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
|   | | | | | | 0 | 0 | | Reserved |
|   | | | | | | | 0 | 0 | TAG clear voice=00 |
| 5 | 0 | | | | | | | | Reserved |
|   | | 0 | 0 | 1 | 0 | 0 | 1 | 0 | GRP group id=123 upper seven bytes |
| 6 | 0 | 0 | 1 | 1 | | | | | GRP group id-123 lower nibble |
|   | | | | | 0 | 0 | 0 | 0 | LID source id=003 upper nibble |
| 7 | 0 | 0 | 0 | 0 | 0 | 0 | 1 | 1 | LID source id=003 lower byte |
| 8 | 0 | 0 | 1 | 1 | 1 | 1 | 1 | 1 | CHK checksum |

11.2.2 Individual Call Message

| MESSAGE TYPE: | Global, control channel |
|---|---|
| MESSAGE NUMBER: | 25 |
| GETC CODE: | 08 |
| OVERALL LENGTH: | 9 bytes |
| WHEN SENT: | Transmitted by the console 102 to request a RF channel path to an individual field unit (mobile or portable). This message is generated by a console PTT key for an individual destination whether or not a RF channel already exists. |
| SOURCE: | Switch 457 |
| ORIGINAL SOURCE: | Console 102 |
| DESTINATION: | DLTC 450 |
| CONTROL CHANNEL | 10 |
| INBOUND MT-A: | |
| FINAL DESTINATION: | Site Controller 410 |

INDIVIDUAL CALL MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 1 | 1 | 0 | 0 | 1 | MID Message id=25 |
|   | 0 | | | | | | | | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
|   | | | | | | 1 | 0 | | Reserved |
|   | | | | | | | 0 | 0 | TAG clear voice=00 |
| 5 | 0 | 0 | 0 | 0 | 0 | 0 | 1 | 0 | LID destination id=023 upper seven bits |
| 6 | 0 | 0 | 1 | 1 | | | | | LID destination id least significant nibble |
|   | | | | | 0 | 0 | 0 | 0 | LID source id=003 upper nibble |
| 7 | 0 | 0 | 0 | 0 | 0 | 0 | 1 | 1 | LID source id=003 lower byte |
| 8 | 0 | 0 | 1 | 0 | 0 | 1 | 1 | 0 | CHK checksum |

11.2.3 Unkey Message

| MESSAGE TYPE: | Global, working channel |
|---|---|
| MESSAGE NUMBER: | 26 |
| GETC CODE: | 10 |
| OVERALL LENGTH: | 8 bytes |
| WHEN SENT: | Transmitted by the console 102 to inform the site controller 410 of a console unkey (this message may or may not drop the channel assigned). |
| SOURCE: | Switch 457 |
| ORIGINAL SOURCE: | Console 102 |
| DESTINATION: | DLTC 450 |
| FINAL DESTINATION: | Site Controller 410 |
| INBOUND WORKING CHANNEL MT-A: | 0011 |

UNKEY MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 1 | 1 | 0 | 1 | 0 | MID Message id=26 |
|   | 0 | | | | | | | | R retransmit=0 for first transmission |
| 1 | 0 | 0 | 0 | 0 | 0 | 1 | 0 | 1 | TLY 5 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
|   | | | | | | 0 | 1 | 1 | Reserved |
| 5 | 0 | 0 | 0 | 0 | | | | | Reserved |
|   | | | | | 0 | 0 | 0 | 0 | LID audio source id upper nibble |
| 6 | 0 | 0 | 0 | 0 | 0 | 0 | 1 | 1 | LID audio source id lower byte |
| 7 | 0 | 0 | 0 | 1 | 1 | 1 | 1 | 1 | CHK checksum |

11.2.4 Activate Patch ID Request Message

| MESSAGE TYPE: | Global, working channel |
|---|---|
| MESSAGE NUMBER: | 27 |
| GETC CODE: | 10 |
| OVERALL LENGTH: | 8 bytes |
| WHEN SENT: | Transmitted by the console 102 when a patch or simul-select is set up. This message requests that the patch id be activated, |

| | the mobiles and individuals be notified of the activation of the patch id, and requests that the console 102 be allowed to activate the patch id. The patch id has already been defined to the site controller 410 by another message. |
|---|---|
| SOURCE: | Switch 457 |
| ORIGINAL SOURCE: | Console 102 |
| DESTINATION: | DLTC 450 |
| FINAL DESTINATION: | Site Controller 410 |
| WORKING CHANNEL INBOUND MT-A: | 1110 |

ACTIVATE PATCH ID REQUEST MESSAGE FORMAT

| Byte # | Bit # 7 | 6 | 5 | 4 | 3 | 2 | 1 | 0 | Description |
|---|---|---|---|---|---|---|---|---|---|
| 0 | 0 | 0 | 0 | 1 | 1 | 0 | 1 | 1 | MID Message id=27 R retransmit=0 for first transmission |
| 1 | 0 | 0 | 0 | 0 | 0 | 1 | 0 | 1 | TLY 5 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
| | | | | | 1 | 1 | 1 | 0 | Reserved |
| 5 | 0 | 0 | 0 | 0 | 0 | | | | Reserved |
| | | | | | | 1 | 0 | 0 | GRP patch id=480 most significant nibble |
| 6 | 1 | 0 | 0 | 0 | 0 | 0 | 0 | 0 | GRP patch id least significant byte |
| 7 | 1 | 0 | 0 | 1 | 0 | 1 | 0 | 0 | CHK checksum |

11.2.5 Deactivate Patch ID Request Message

| MESSAGE TYPE: | Global, working channel |
|---|---|
| MESSAGE NUMBER: | 28 |
| GETC CODE: | 10 |
| OVERALL LENGTH: | 8 bytes |
| WHEN SENT: | Transmitted by the console 102 when a patch or simul-select is removed from the front panel (deactivated) or if the patch or simul-select memory contents are cleared. |
| SOURCE: | Switch 457 |
| ORIGINAL SOURCE: | Console 102 |
| DESTINATION: | DLTC 450 |
| FINAL DESTINATION: | Site Controller 410 |
| WORKING CHANNEL INBOUND MT-A: | 1111 |

DEACTIVATE PATCH ID REQUEST MESSAGE FORMAT

| Byte # | Bit # 7 | 6 | 5 | 4 | 3 | 2 | 1 | 0 | Description |
|---|---|---|---|---|---|---|---|---|---|
| 0 | 0 | 0 | 0 | 1 | 1 | 1 | 0 | 0 | MID Message id=28 R Retransmit = 0 for first transmission |
| 1 | 0 | 0 | 0 | 0 | 0 | 1 | 0 | 1 | TLY 5 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
| | | | | | 1 | 1 | 1 | 1 | Reserved |
| 5 | 0 | 0 | 0 | 0 | 0 | | | | Reserved |
| | | | | | | 1 | 0 | 0 | GRP patch id=480 most significant nibble |
| 6 | 1 | 0 | 0 | 0 | 0 | 0 | 0 | 0 | GRP patch id least significant byte |
| 7 | 1 | 0 | 0 | 1 | 0 | 0 | 1 | 0 | CHK checksum |

11.2.6 Modify Patch ID Assignment Message

| MESSAGE TYPE: | Global, patch |
|---|---|
| MESSAGE NUMBER: | 29 |
| GETC CODE: | 15 |
| OVERALL LENGTH: | 8 bytes minimum, 40 bytes maximum |
| WHEN SENT: | Transmitted by a console 102 when a patch or simul-select memory is modified or cleared. This message is used to tell the site controller 410 which groups and individuals are associated with a patch id. Between 0 and 16 entities (groups or individuals) may be grouped together in any combination (groups or individuals). The last entity is the patch id for the grouping. |
| SOURCE: | Switch 457 |
| ORIGINAL SOURCE: | Console 102 or other control node on Switch 457 |
| DESTINATION: | DLTC 450 |
| FINAL DESTINATION: | Site Controller 410 |

MODIFY PATCH ID REQUEST MESSAGE FORMAT

| Byte # | Bit # 7 | 6 | 5 | 4 | 3 | 2 | 1 | 0 | Description |
|---|---|---|---|---|---|---|---|---|---|
| 0 | 0 | 0 | 0 | 1 | 1 | 1 | 0 | 1 | MID Message id=29 R retransmit=0 for first transmission |
| 1 | 0 | 0 | 0 | 0 | 1 | 0 | 1 | 1 | TLY 11 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | | | | | | | | PSS following patch id is a simsel |
| | | 0 | 0 | 0 | | | | | Not used |
| | | | | | 0 | 0 | 1 | 0 | GCT group count |
| 5 | 0 | 0 | 0 | 1 | | | | | ICT individual count |
| | | | | | 0 | 0 | 0 | 0 | LID first individual id=234 |
| 6 | 0 | 0 | 1 | 1 | 0 | 1 | 0 | 0 | LID least significant byte |
| 7 | 0 | 0 | 0 | 0 | 0 | | | | Not used |
| | | | | | | 0 | 1 | 1 | GRP first group id=345 |
| 8 | 0 | 1 | 0 | 0 | 0 | 1 | 0 | 1 | GRP first group least significant byte |
| 9 | 0 | 0 | 0 | 0 | 0 | | | | Not used |
| | | | | | | 1 | 0 | 0 | GRP second group id=456 |
| 10 | 0 | 1 | 0 | 0 | 1 | 1 | 1 | 0 | GRP second group least significant byte |
| 11 | 0 | 0 | 0 | 0 | 0 | | | | Not used |
| | | | | | | 1 | 0 | 0 | GRP patch id=480 most byte |
| 12 | 1 | 0 | 0 | 0 | 0 | 0 | 0 | 0 | GRP patch id least significant byte |
| 13 | 1 | 0 | 1 | 0 | 0 | 0 | 0 | 0 | CHK checksum |

NOTE:
SPECIAL CALL WORKING CHANNEL SIGNALLING MESSAGE.

11.2.7 Emergency Status Alert Message

| MESSAGE TYPE: | Global, control channel |
|---|---|
| MESSAGE NUMBER: | 30 |
| OVERALL LENGTH: | 9 bytes |
| WHEN SENT: | Used by the console 102 to declare an emergency to a group. This message is used to tell the site controller 410 which group is to be placed into emergency status. The specified group's communications take on the highest priority available on the system. |
| SOURCE: | Switch 457 |
| ORIGINAL SOURCE: | Console 102 |
| DESTINATION: | DLTC 450 |
| FINAL DESTINATION: | Site Controller 410 |
| CONTROL CHANNEL INBOUND MT-A: | 01 |

EMERGENCY STATUS ALERT MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 1 | 1 | 1 | 1 | 0 |   | MID Message id=30 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   |   |   | 0 | 1 | Reserved |
|   |   |   |   |   |   |   | 0 | 0 | TAG clear voice S/C status/call bit=1 |
| 5 | 1 |   |   |   |   |   |   |   |   |
|   |   | 0 | 0 | 1 | 0 | 0 | 1 | 0 | GRP group id=123 (in the emergency) |
| 6 | 0 | 0 | 1 | 1 |   |   |   |   | GRP least significant byte |
|   |   |   |   |   | 0 | 0 | 0 | 0 | LID individual id=234 (declaring emergency) |
| 7 | 0 | 0 | 1 | 1 | 0 | 1 | 0 | 0 | LID least significant byte |
| 8 | 1 | 0 | 0 | 0 | 1 | 0 | 1 | 0 | CHK checksum |

11.2.8 Emergency Channel Request Message

| MESSAGE TYPE: | Global, control channel |
|---|---|
| MESSAGE NUMBER: | 31 |
| OVERALL LENGTH: | 9 bytes |
| WHEN SENT: | Used by the console 102 to request a channel from the site controller 410 for a voice transmission. This message is used when a dispatcher hits a PTT and the group he is trying to communicate with is in an ongoing emergency. |
| SOURCE: | Switch 457 |
| ORIGINAL SOURCE: | Console 102 |
| DESTINATION: | DLTC 450 |
| FINAL DESTINATION: | Site Controller 410 |
| CONTROL CHANNEL INBOUND MT-A | 01 |

EMERGENCY CHANNEL REQUEST MESSAGE FORMAT

| Byte # | 7 | 6 | 5 | 4 | 3 | 2 | 1 | 0 | Description |
|---|---|---|---|---|---|---|---|---|---|
| 0 |   | 0 | 0 | 1 | 1 | 1 | 1 | 1 | MID Message id=31 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   |   |   | 0 | 1 | Reserved |
|   |   |   |   |   |   |   | 0 | 0 | TAG clear voice S/C status/call bit=0 |
| 5 | 0 |   |   |   |   |   |   |   |   |
|   |   | 0 | 0 | 1 | 0 | 0 | 1 | 0 | GRP group id=123 (in the emergency) |
| 6 | 0 | 0 | 1 | 1 |   |   |   |   | GRP least significant byte |
|   |   |   |   |   | 0 | 0 | 0 | 0 | LID individual id=234 (requesting a channel) |
| 7 | 0 | 0 | 1 | 1 | 0 | 1 | 0 | 0 | LID least significant byte |
| 8 | 0 | 0 | 0 | 0 | 1 | 0 | 1 | 1 | CHK checksum |

11.2.9 Status Page Message

| MESSAGE TYPE: | Global, control channel |
|---|---|
| MESSAGE NUMBER | 32 |
| OVERALL LENGTH: | 9 bytes |
| WHEN SENT: | Used by the console 102 to inquire as to a unit's present status. The radio in the field will be interrogated by the site controller 410 and the unit's status shall be contained in a status message to the console 102. |
| SOURCE: | Switch 457 |
| ORIGINAL SOURCE: | Console 102 |
| DESTINATION: | DLTC 450 |
| FINAL DESTINATION: | Site Controller 410 |
| CONTROL CHANNEL INBOUND MT-A: | 11 |
| MT-B: | 111 |
| MT-C: | 001 |

STATUS PAGE MESSAGE FORMAT

| Byte # | 7 | 6 | 5 | 4 | 3 | 2 | 1 | 0 | Description |
|---|---|---|---|---|---|---|---|---|---|
| 0 |   | 0 | 1 | 0 | 0 | 0 | 0 | 0 | MID message id=32 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 1 | Reserved |
| 5 | 1 | 0 | 0 | 1 |   |   |   |   | Reserved |
|   |   |   |   |   | 0 | 0 | 0 |   | Not used |
|   |   |   |   |   |   |   |   | 1 | ATM automatic bit=1 |
| 6 | 0 | 0 | 0 | 0 |   |   |   |   | Not used |
|   |   |   |   |   | 0 | 0 | 0 | 0 | LID individual id=234 (unit to be interrogated) |
| 7 | 0 | 0 | 1 | 1 | 0 | 1 | 0 | 0 | LID least significant byte |
| 8 | 1 | 0 | 0 | 0 | 1 | 1 | 0 | 0 | CHK checksum |

11.2.10 AP Reset Message

| MESSAGE TYPE: | Global |
|---|---|

-continued

| | | | | | | | | | |
|---|---|---|---|---|---|---|---|---|---|
| MESSAGE NUMBER: | | | | 33 | | | | | |
| OVERALL LENGTH: | | | | 9 bytes | | | | | |
| WHEN SENT: | | | | Used by the switch 457 to inform the site controller 410 that the main processor has just come out of a reset state. The site controller 410 must also clear all temporary buffers and bring its databases to a power up state. | | | | | |
| SOURCE: | | | | Switch 457 | | | | | |
| ORIGINAL SOURCE: | | | | Console 102 | | | | | |
| DESTINATION: | | | | DLTC 450 | | | | | |
| FINAL DESTINATION: | | | | Site Controller 410 | | | | | |

AP RESET MESSAGE FORMAT

| | Bit # | | | | | | | |
|---|---|---|---|---|---|---|---|---|
| Byte # | 7 | 6 | 5 | 4 | 3 | 2 | 1 | 0 | Description |
| 0 | 0 | 0 | 1 | 0 | 0 | 0 | 0 | 1 | MID Message id = 33 R retransmit = 0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 2 |
| 3 | 0 | 0 | 0 | 0 | 0 | 0 | 0 | 0 | SD2 source destination byte 2 |
| 4 | 0 | 0 | 0 | 0 | 0 | 0 | 0 | 0 | Not used |
| 5 | 0 | 0 | 0 | 0 | 0 | 0 | 0 | 0 | Not used |
| 6 | 0 | 0 | 0 | 0 | 0 | 0 | 0 | 0 | Not used |
| 7 | 0 | 0 | 0 | 0 | 0 | 0 | 0 | 0 | Not used |
| 8 | 0 | 0 | 1 | 0 | 0 | 1 | 1 | 1 | CHK checksum |

11.2.11 Cancel Emergency Message

| | | |
|---|---|---|
| MESSAGE TYPE: | | Global, control channel |
| MESSAGE NUMBER: | | 34 |
| OVERALL LENGTH: | | 9 bytes |
| WHEN SENT: | | Transmitted by a console 102 (or other control node connected to the switch 457) to the site, directing the site to cancel an emergency which is in progress. This message is identical to the group call message, except for a change in one bit. |
| SOURCE: | | Switch 457 |
| ORIGINAL SOURCE: | | Console 102 or other control node on Switch 457 |
| DESTINATION: | | DLTC 450 |
| FINAL DESTINATION: | | Site Controller 410 |
| CONTROL CHANNEL INBOUND MT-A: | | 00 |

CANCEL EMERGENCY MESSAGE FORMAT

| | Bit # | | | | | | | |
|---|---|---|---|---|---|---|---|---|
| Byte # | 7 | 6 | 5 | 4 | 3 | 2 | 1 | 0 | Description |
| 0 | 0 | 0 | 1 | 0 | 0 | 0 | 1 | 0 | MID Message id = 34 R retransmit = 0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | 0 | 0 | | | Not used Reserved |
| 5 | 1 | | | | | | 0 | 0 | TAG clear voice = 00 ECL emergency cancel = 1 |
| | | | 0 | 0 | 1 | 0 | 1 | 0 | GRP group id = 123 upper seven bits |
| 6 | 0 | 0 | 1 | 1 | | | | | GRP group id = 123 lower nibble |
| | | | | | 0 | 0 | 0 | 0 | LID console id = 003 upper nibble |
| 7 | 0 | 0 | 0 | 0 | 0 | 0 | 1 | 1 | LID console id = 003 lower byte |
| 8 | 1 | 0 | 0 | 0 | 0 | 1 | 0 | 1 | CHK checksum |

11.3 Link 456 Global Messages Originated by Site Controller 410 and Transmitted from Switch TC 454 to Switch 457

Messages from the site controller are responses to resource requests generated by either a console 102 or a field unit (mobile, portable). The site controller assigns and deassigns RF channels, manages patch ids and relays all keys and unkeys regardless of source. Also, for multiple group calls, a patch id is used to represent a collection of groups. Patch id control and assignment is done at the site controller. For mobile or console multiple group calls, the patch id is set up ahead of a PTT and permission to use the patch id is issued by the site controller.

The following describes global messages transmitted by switch TC 454 to switch 457 over link 456 in response to global messages originated by site controller 410 and received by switch TC 454 over link 452.

11.3.1 Channel Assignment Message

| | | |
|---|---|---|
| MESSAGE TYPE: | | Global, Control Channel |
| MESSAGE NUMBER: | | 8 |
| GETC CODE: | | 08 |
| OVERALL LENGTH: | | 10 bytes |
| WHEN SENT: | | Issued by the site controller in response to either a field unit PTT or console PTT. This message is the response to the GROUP CALL or INDIVIDUAL CALL messages. |
| SOURCE: | | DLTC 450 |
| ORIGINAL SOURCE: | | Site Controller 410 |
| DESTINATION: | | Switch 457 |
| FINAL DESTINATION: | | Either requesting console 102 or broadcast to all consoles 102 (in the case of a mobile group call) |
| CONTROL CHANNEL OUTBOUND MT-A: | | 00 |

CHANNEL ASSIGNMENT MESSAGE FORMAT

| | Bit # | | | | | | | |
|---|---|---|---|---|---|---|---|---|
| Byte # | 7 | 6 | 5 | 4 | 3 | 2 | 1 | 0 | Description |
| 0 | 0 | 0 | 0 | 1 | 0 | 0 | 0 | 0 | MID Message id = 8 R retransmit = 0 for first transmission |
| 1 | 0 | 0 | 0 | 0 | 0 | 1 | 1 | 1 | TLY 7 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used Reserved |
| | | | | | 0 | 0 | | | |
| | | | | | | | 0 | 0 | TAG clear voice = 00 |
| 5 | 0 | 0 | 0 | 1 | 0 | 0 | 1 | 0 | LID source id = 123 LID least significant nibble |
| 6 | 0 | 0 | 1 | 1 | | | | | |
| | | | | | 0 | 0 | | | Not used |
| | | | | | | | 0 | | L/G group id |
| | | | | | | | | 0 | CHN channel = 3, most significant bit |

-continued

| | 7 | 6 | 5 | 4 | 3 | 2 | 1 | 0 | Description |
|---|---|---|---|---|---|---|---|---|---|
| 7 | 0 | 0 | 1 | 1 | | | | | CHN channel=3, least significant nibble |
| | | | | | 0 | | | | Not used |
| | | | | | | 0 | 1 | 0 | GRP destination group id=234 |
| 8 | 0 | 0 | 1 | 1 | 0 | 1 | 0 | 0 | GRP destination group least significant byte |
| 9 | 0 | 0 | 1 | 0 | 1 | 0 | 1 | 1 | CHK checksum |

NOTE:
2-SLOT MESSAGE COMPRESSED.

11.3.2 Unit Key Message

| | |
|---|---|
| MESSAGE TYPE: | Global, control channel |
| MESSAGE NUMBER: | 9 |
| GETC CODE: | 0D |
| OVERALL LENGTH: | 9 bytes |
| WHEN SENT: | Issued by the site controller in response to either a field unit PTT or console PTT. This message is used when a channel is assigned but inactive (i.e., no ongoing conversation). |
| SOURCE: | DLTC 450 |
| ORIGINAL SOURCE: | Site Controller 410 |
| DESTINATION: | Switch 457 |
| FINAL DESTINATION: | Broadcast to all consoles 102 |

UNIT KEY MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 1 | 0 | 0 | 1 | MID Message id=9 |
| | 0 | | | | | | | | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
| | | | | | 1 | 1 | 1 | 1 | Reserved |
| 5 | 1 | 0 | 0 | 1 | 0 | 0 | 0 | | Reserved |
| | | | | | | | | 0 | CHN channel=6 |
| 6 | 0 | 1 | 1 | 0 | | | | | CHN channel=6 |
| | | | | | 0 | 0 | 0 | 1 | LID source id=123 |
| 7 | 0 | 0 | 1 | 0 | 0 | 0 | 1 | 1 | LID least significant byte |
| 8 | 1 | 1 | 0 | 1 | 0 | 0 | 1 | 0 | CHK checksum |

NOTE:
CONTROL CHANNEL OUTBOUND MT-A: 11, MT-B: 111, MT-C: 0010.

11.3.3 Unkey/Channel Deassignment Message

| | |
|---|---|
| MESSAGE TYPE: | Global |
| MESSAGE NUMBER: | 10 |
| GETC CODE: | 0D |
| OVERALL LENGTH: | 9 bytes |
| WHEN SENT: | Issued by the site controller in response to releasing of PTT by either a field unit or a console 102. This message may be issued twice: Once to inform the switch 457 of an unkey only (message trunking), and another line to inform the system of a dropped channel (transmission trunking). |
| SOURCE: | DLTC 450 |
| ORIGINAL SOURCE: | Site Controller 410 |
| DESTINATION: | Switch 457 |
| FINAL DESTINATION: | Broadcast to all consoles 102 |

UNKEY/CHANNEL DEASSIGNMENT MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 1 | 0 | 1 | 0 | | MID message id=0 |
| | 0 | | | | | | | | R retransmit-0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | | | | | Not used |
| | | | | | 1 | 1 | 1 | 1 | Reserved |
| 5 | 1 | 0 | 0 | 1 | 1 | | 0 | | Reserved |
| | | | | | | 1 | | | HDP drop channel=1 |
| | | | | | | | | 0 | CHN channel-6 |
| 6 | 0 | 1 | 1 | 0 | | | | | CHN channel=6 |
| | | | | | 0 | 0 | 0 | 0 | LID source id=012 most significant byte |
| 7 | 0 | 0 | 0 | 1 | 0 | 0 | 1 | 0 | LID least significant byte |
| 8 | 1 | 1 | 1 | 0 | 1 | 1 | 0 | 1 | CHK checksum |

NOTE:
CONTROL CHANNEL OUTBOUND MT-A: 11, MT-B: 111, MT-C: 0011.

11.3.4 Deactivate Patch ID Message

| | |
|---|---|
| MESSAGE TYPE: | Global, working channel |
| MESSAGE NUMBER: | 11 |
| GETC CODE: | 19 |
| OVERALL LENGTH: | 8 bytes |
| WHEN SENT | Issued by the site controller in response to a termination of a multiple group configuration. Issued when a console 102 dissolves either a patch or a simul-select multiple group designation, or when a mobile dissolves a patch. |
| SOURCE: | DLTC 450 |
| ORIGINAL SOURCE: | Site Controller 410 |
| DESTINATION: | Switch 457 |
| FINAL DESTINATION: | Console 102 |

DEACTIVATE PATCH ID MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 1 | 0 | 1 | 1 | | MID message id=1 |
| | 0 | | | | | | | | R retransmit=0 for first transmission |
| 1 | 0 | 0 | 0 | 0 | 0 | 1 | 0 | 1 | TLY 5 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | | | | | | | | PSS following patch id is a simsel id |
| | | 0 | 0 | 0 | | | | | Not used |
| | | | | | 1 | 1 | 1 | | Reserved |
| 5 | 0 | 0 | 0 | 0 | 0 | | | | Reserved |
| | | | | | | 0 | 0 | 1 | GRP patch id-123 |
| 6 | 0 | 0 | 1 | 0 | 0 | 0 | 1 | 1 | GRP patch id=123 least significant byte |

| 7 | 0 | 0 | 1 | 0 | 0 | 1 | 1 | CHK checksum |
|---|---|---|---|---|---|---|---|---|

NOTE: WORKING CHANNEL SLOTTED OUTBOUND MESSAGE MT: 1111.

11.3.5 Assign Group ID to Patch ID Message

| MESSAGE TYPE: | Global |
|---|---|
| MESSAGE NUMBER: | 12 |
| GETC CODE: | 00 |
| OVERALL LENGTH: | 9 bytes |
| WHEN SENT: | Transmitted by a site controller when a patch or simul-select modification has been approved. This message is used to inform console 102 which groups are assigned to a patch id. The assignments will be issued one message at a time. If this message is received, the patch id specified in the message is automatically activated. |
| SOURCE: | DLTC 450 |
| ORIGINAL SOURCE: | Site Controller 410 |
| DESTINATION: | Switch 457 |
| FINAL DESTINATION: | Console 102 |

ASSIGN GROUP ID TO PATCH ID MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 0 | 1 | 1 | 0 | 0 | MID message id=12 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 0 | Reserved |
| 5 | 0 |   |   |   |   |   |   |   | Reserved |
|   |   | 0 | 1 | 1 | 0 | 1 | 0 | 0 | GRP patch id=345 most significant byte |
| 6 | 0 | 1 | 0 | 1 |   |   |   |   | GRP patch id least significant nibble |
|   |   |   |   |   | 0 |   |   |   | Reserved |
|   |   |   |   |   |   | 1 | 0 | 0 | GRP group id=456 most significant nibble |
| 7 | 0 | 1 | 0 | 1 | 0 | 1 | 1 | 0 | GRP group id least significant byte |
| 8 | 0 | 0 | 1 | 1 | 0 | 0 | 1 | 0 | CHK checksum |

NOTE: CONTROL CHANNEL OUTBOUND MT-A: 11, MT-B: 100.

11.3.6 Assign Individual ID to Patch ID Message

| MESSAGE TYPE: | Global, control channel |
|---|---|
| MESSAGE NUMBER: | 13 |
| GETC CODE: | OD |
| OVERALL LENGTH: | 9 bytes |
| WHEN SENT: | Transmitted by a site controller when a patch or simul-select modification has been approved. This message is used to inform the console 102 which individuals are assigned to a patch id. The assignments will be issued one message at a time. If this message is received, the patch id specified in the message is automatically activated. |
| SOURCE: | DLTC 450 |
| ORIGINAL SOURCE: | Site Controller 410 |
| DESTINATION: | Switch 457 |
| FINAL DESTINATION: | Console 102 |

ASSIGN INDIVIDUAL ID TO PATCH ID MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 1 | 1 | 0 | 1 | | MID message id=13 |
|   | 0 |   |   |   |   |   |   | | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 0 | Reserved |
| 5 | 1 |   |   |   |   |   |   |   | Reserved |
|   |   | 0 | 1 | 1 | 0 | 1 | 0 | 0 | GRP patch id=345 most significant byte |
| 6 | 0 | 1 | 0 | 1 |   |   |   |   | GRP patch id least significant nibble |
|   |   |   |   |   | 0 | 1 | 0 | 1 | LID group id=557 most significant nibble |
| 7 | 0 | 1 | 0 | 1 | 0 | 1 | 1 | 1 | LID group id least significant byte |
| 8 | 1 | 0 | 1 | 1 | 0 | 0 | 1 | 1 | CHK checksum |

NOTE: CONTROL CHANNEL OUTBOUND MT-A: 11, MT-B: 101.

11.3.7 Site ID Message

| MESSAGE TYPE: | Global, control channel |
|---|---|
| MESSAGE NUMBER: | 14 |
| GETC CODE: | OD |
| OVERALL LENGTH: | 9 bytes |
| WHEN SENT: | Notifies the console 102 of the site status and failsoft information. Location of the control channel is also transmitted. |
| SOURCE: | DLTC 450 |
| ORIGINAL SOURCE: | Site Controller 410 |
| DESTINATION: | Switch 457 |
| FINAL DESTINATION: | Requesting console 102 |

SITE ID MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 1 | 1 | 1 | 0 | | MID message id=14 |
|   | 0 |   |   |   |   |   |   | | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 1 | Reserved |
| 5 | 1 | 1 | 1 | 1 | 0 |   |   |   | Reserved |
|   |   |   |   |   |   | 0 | 0 |   | DLY delay=0 |
|   |   |   |   |   |   |   |   | 0 | CHN control channel=6 |
| 6 | 0 | 1 | 1 | 0 |   |   |   |   | CHN control channel=6 |
|   |   |   |   |   | 0 | 0 | 0 |   | Reserved |
|   |   |   |   |   |   |   |   | 1 | HMS information about this site=1 |
| 7 | 0 | 0 |   |   |   |   |   |   | FST failsoft-0 normal operation |
|   |   |   | 0 | 0 | 0 | 0 | 0 | 1 | SID site id=1 |

-continued

| | 8 | 1 | 0 | 0 | 1 | 0 | 1 | 1 | CHK checksum |

NOTE: CONTROL CHANNEL OUTBOUND MT-A: 11, MT-B: 111, MT-C: 1110.

11.3.8 Channel Update Message

| | |
|---|---|
| MESSAGE TYPE: | Global, control channel |
| MESSAGE NUMBER: | 15 |
| GETC CODE: | OD |
| OVERALL LENGTH: | 9 bytes |
| WHEN SENT: | Transmitted by a site controller while a channel is in use. Specifies the group or individual using the channel and whether the channel is supporting a digital or analog transmission. |
| SOURCE: | DLTC 450 |
| ORIGINAL SOURCE: | Site Controller 410 |
| DESTINATION: | Switch 457 |
| FINAL DESTINATION: | Console 102 |

CHANNEL UPDATE MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 0 | 1 | 1 | 1 | 1 | MID message id=15 |
| | 0 | | | | | | | | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 1 |
| 4 | 0 | 0 | 0 | 0 | | | | | Not used |
| | | | | | 1 | 1 | 1 | 1 | Reserved |
| 5 | 1 | 0 | 0 | 0 | 0 | | | | Reserved |
| | | | | | | 1 | | | STG clear voice=0 |
| | | | | | | | 0 | | L/G group id |
| | | | | | | | | 0 | CHN channel=6 |
| 6 | 0 | 1 | 1 | 0 | | | | | CHN channel=6 |
| | | | | | 0 | | | | Not used |
| | | | | | | 0 | 1 | 0 | GRP group id=234 most significant nibble |
| 7 | 0 | 0 | 1 | 1 | 0 | 1 | 0 | 0 | GRP group id least significant byte |
| 8 | 1 | 1 | 0 | 1 | 0 | 1 | 0 | 0 | CHK checksum |

NOTE: CONTROL CHANNEL OUTBOUND MT-A: 11, MT-B: 111, MT-C: 0000.

11.3.9 Activate Patch ID Message

| | |
|---|---|
| MESSAGE TYPE: | Global |
| MESSAGE NUMBER: | 16 |
| OVERALL LENGTH: | 8 bytes |
| WHEN SENT: | Transmitted by a site controller after a patch id has been activated. This message is used for both patch and simul-select applications. |
| SOURCE: | DLTC 450 |
| ORIGINAL SOURCE: | Site Controller 410 |
| DESTINATION: | Switch 457 |
| FINAL DESTINATION: | Console 102 |

ACTIVATE PATCH ID MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 1 | 0 | 0 | 0 | 0 | MID message id=16 |
| | 0 | | | | | | | | R retransmit=0 for first transmission |
| 1 | 0 | 0 | 0 | 0 | 0 | 1 | 0 | 1 | TLY 5 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | | | | | | | | PSS following patch id is a simsel id |
| | | 0 | 0 | 0 | | | | | Not used |
| | | | | | 1 | 1 | 1 | 1 | Reserved |
| 5 | 0 | | | | | | | | Reserved |
| | | 0 | 1 | 1 | 0 | 1 | 0 | 0 | GRP patch id=345 |
| 6 | 0 | 1 | 0 | 1 | | | | | GRP patch id least significant nibble |
| | | | | | 1 | | | | Reserved |
| | | | | | | 0 | 0 | 0 | Not used |
| 7 | 0 | 1 | 1 | 1 | 0 | 1 | 1 | 0 | CHK checksum |

NOTE: MODELED AFTER WORKING CHANNEL MESSAGE 1111.

11.3.10 Patch Collection Acknowledge Message

| | |
|---|---|
| MESSAGE TYPE: | Global |
| MESSAGE NUMBER: | 17 |
| OVERALL LENGTH: | 9 bytes |
| WHEN SENT: | Transmitted by a site controller after a modify patch collection message has been received. This message is used for both patch and simul-select applications and is the global acknowledge for the modify message. |
| SOURCE: | DLTC 450 |
| ORIGINAL SOURCE: | Site Controller 410 |
| DESTINATION: | Switch 457 |
| FINAL DESTINATION: | Console 102 |

PATCH COLLECTION ACKNOWLEDGE MESSAGE FORMAT

| Byte # | 7 | 6 | 5 | 4 | 3 | 2 | 1 | 0 | Description |
|---|---|---|---|---|---|---|---|---|---|
| 0 | | 0 | 0 | 1 | 0 | 0 | 0 | 1 | MID message id=17 |
| | 0 | | | | | | | | R retransmit=0 for first transmission |
| 1 | 0 | 0 | 0 | 0 | 0 | 1 | 0 | 1 | TSY 5 data types to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | | | | | | | | PSS following patch id is a simsel id |
| | | 0 | 0 | 0 | | | | | Not used |
| | | | | | 1 | 1 | 1 | 0 | Reserved |
| 5 | 0 | | | | | | | | Reserved |
| | | 0 | 1 | 1 | 0 | 1 | 0 | 0 | GRP patch id=345 |
| 6 | 0 | 1 | 0 | 1 | | | | | GRP patch id |
| | | | | | 1 | | | | MAK modify ack=1 |
| | | | | | | 0 | 0 | 0 | Nor used |
| 7 | 1 | 1 | 0 | 1 | 0 | 1 | 1 | 1 | CHK checksum |

NOTE: MODELED AFTER WORKING CHANNEL MESSAGE 1111.

11.3.11 Emergency Channel Update Message

| | |
|---|---|
| MESSAGE TYPE: | Global |
| MESSAGE NUMBER: | 18 |
| OVERALL LENGTH: | 9 bytes |
| WHEN SENT: | Once a radio unit has declared an emergency, the site controller 410 shall send this message to the dispatch center. The |

-continued

|  |  | | | | | | | | |
|---|---|---|---|---|---|---|---|---|---|
|  |  |  |  |  |  |  |  |  | dispatch center uses this information to display the emergency information on the consoles 102. |
| SOURCE: | | | | | | | | DLTC 450 | |
| ORIGINAL SOURCE: | | | | | | | | Site Controller 410 | |
| DESTINATION: | | | | | | | | Switch 457 | |
| FINAL DESTINATION: | | | | | | | | Console 102 | |

EMERGENCY CHANNEL UPDATE MESSAGE FORMAT

| Byte # | \multicolumn{8}{c}{Bit #} | Description |
|---|---|---|---|---|---|---|---|---|---|

| Byte # | 7 | 6 | 5 | 4 | 3 | 2 | 1 | 0 | Description |
|---|---|---|---|---|---|---|---|---|---|
| 0 |   | 0 | 0 | 1 | 0 | 0 | 1 | 0 | MID Message id=18 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 1 | Reserved |
| 5 | 1 | 0 | 1 | 1 | 0 |   |   |   | Reserved |
|   |   |   |   |   |   | 0 |   |   | STG clear voice |
|   |   |   |   |   |   |   | 0 |   | L/G group/unit flag |
|   |   |   |   |   |   |   |   | 0 | CHN channel field ms bit |
| 6 | 0 | 0 | 1 | 0 |   |   |   |   | CHN channel=3 |
|   |   |   |   |   | 0 | 0 | 0 | 0 | GRP group id or LID logical id |
| 7 | 0 | 0 | 0 | 0 | 0 | 0 | 0 | 0 | GRP group id or LID group id |
| 8 | 1 | 0 | 0 | 1 | 0 | 1 | 1 | 1 | CHK checksum |

NOTE: CONTROL CHANNEL OUTBOUND: MT-A: 11, MT-B: 111, MT-C: 0110.

11.3.12 Emergency Channel Assignment Message

| MESSAGE TYPE: | Global |
|---|---|
| MESSAGE NUMBER: | 19 |
| OVERALL LENGTH: | 10 bytes |
| WHEN SENT: | This message is the response to an emergency channel request message. Upon receipt of this message, the dispatch center shall route the audio path to the appropriate consoles 102 and display the logical id which will be transmitting the audio. |
| SOURCE: | DLTC 450 |
| ORIGINAL SOURCE: | Site Controller 410 |
| DESTINATION: | Switch 457 |
| FINAL DESTINATION: | Console 102 |

EMERGENCY CHANNEL ASSIGNMENT MESSAGE FORMAT

| Byte # | 7 | 6 | 5 | 4 | 3 | 2 | 1 | 0 | Description |
|---|---|---|---|---|---|---|---|---|---|
| 0 |   | 0 | 0 | 1 | 0 | 0 | 1 | 1 | MID Message id=19 |
|   | 0 |   |   |   |   |   |   |   | R retransmit=0 for first transmission |
| 1 | 0 | 0 | 0 | 0 | 0 | 1 | 1 | 1 | TLY 7 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   |   | 0 | 1 |   | Reserved |
|   |   |   |   |   |   |   |   | 0 0 | TAG clear voice=00 |
| 5 | 0 | 0 | 1 | 1 | 0 | 0 | 1 | 0 | LID source id=123 |
| 6 | 0 | 0 | 1 | 1 |   |   |   |   | LID least significant nibble |
|   |   |   |   |   | 0 | 0 |   |   | Not used |
|   |   |   |   |   |   |   | 0 |   | L/G group id |
|   |   |   |   |   |   |   |   | 0 | CHN channel=3 most significant bit |
| 7 | 0 | 0 | 1 | 1 |   |   |   |   | CHN channel=3 least significant nibble |
|   |   |   |   |   | 0 |   |   |   | Not used |
|   |   |   |   |   |   | 0 | 1 | 0 | GRP destination group id=234 |
| 8 | 0 | 0 | 1 | 1 | 0 | 1 | 0 | 0 | GRP destination group least significant byte |
| 9 | 0 | 0 | 1 | 1 | 0 | 1 | 0 | 0 | CHK checksum |

NOTE: CONTROL CHANNEL OUTBOUND MT-A: 01). TWO-SLOT MESSAGE COMPRESSED.

11.3.13 Status Message

| MESSAGE TYPE: | Global |
|---|---|
| MESSAGE NUMBER: | 20 |
| OVERALL LENGTH: | 9 bytes |
| WHEN SENT: | This message is relayed from a radio unit to the dispatch center through the site controller 410. It may be transmitted by a radio either in response to an inquiry, or at the request of the radio operator. |
| SOURCE: | DLTC 450 |
| ORIGINAL SOURCE: | Radio via site controller 410 |
| DESTINATION: | Switch 457 |
| FINAL DESTINATION: | Console/Computer Aided Dispatch System |

STATUS MESSAGE FORMAT

| Byte # | 7 | 6 | 5 | 4 | 3 | 2 | 1 | 0 | Description |
|---|---|---|---|---|---|---|---|---|---|
| 0 |   | 0 | 0 | 1 | 0 | 1 | 0 | 0 | MID Message id=20 |
|   | 0 |   |   |   |   |   |   |   | R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 |   |   |   |   | Not used |
|   |   |   |   |   | 1 | 1 | 1 | 1 | Reserved |
| 5 | 1 | 0 | 1 | 0 |   |   |   |   | Reserved |
|   |   |   |   |   | 0 | 0 | 0 |   | Not used |
|   |   |   |   |   |   |   |   | 1 | ATM automatic response=1 |
| 6 | 0 | 0 | 0 | 1 |   |   |   |   | STS status code=1 |
|   |   |   |   |   | 0 | 0 | 0 | 1 | LID logical id |
| 7 | 0 | 0 | 1 | 0 | 0 | 0 | 1 | 1 | LID logical id |
| 8 | 1 | 0 | 0 | 0 | 1 | 1 | 1 | 0 | CHK checksum |

NOTE: CONTROL CHANNEL INBOUND: MT-A: 11, MT-B: 111, MT-C: 010.

11.3.14 Site Controller 410 Reset Message

| MESSAGE TYPE: | Global status message |
|---|---|
| MESSAGE NUMBER: | 21 |
| OVERALL LENGTH: | 9 bytes |
| WHEN SENT: | When a site controller 410 comes out of reset (for any reason), it will issue this message to the dispatch center so that both sets of operational databases can be cleared. |

SOURCE: DLTC 450
ORIGINAL SOURCE: Site Controller 410
DESTINATION: Switch 457
FINAL DESTINATION: Main processor (console)

SITE CONTROLLER 410 RESET MESSAGE FORMAT

| Byte # | 7 | 6 | 5 | 4 | 3 | 2 | 1 | 0 | Description |
|---|---|---|---|---|---|---|---|---|---|
| 0 | 0 | 0 | 0 | 1 | 0 | 1 | 0 | 1 | MID Message id=21 R retransmit=0 for first transmission |
| 1 | 0 | 0 | 0 | 0 | 0 | 1 | 1 | 0 | TLY 6 data bytes to follow exclusive of checksum |
| 2 | 0 | 0 | 0 | 0 | 0 | 0 | 0 | 0 | SD1 source destination byte 1 |
| 3 | 0 | 0 | 0 | 0 | 0 | 0 | 0 | 0 | SD2 source destination byte 2 |
| 4 | 0 | 0 | 0 | 0 | 0 | 0 | 0 | 0 | Not used |
| 5 | 0 | 0 | 0 | 0 | 0 | 0 | 0 | 0 | Not used |
| 6 | 0 | 0 | 0 | 0 | 0 | 0 | 0 | 0 | Not used |
| 7 | 0 | 0 | 0 | 0 | 0 | 0 | 0 | 0 | Not used |
| 8 | 0 | 0 | 0 | 1 | 0 | 0 | 1 | 1 | CHK checksum |

NOTE: MODELED AFTER WORKING CHANNEL MESSAGE 1111.

While the present invention has been described with what is presently considered to be the most practical and preferred embodiments, it is to be understood that the appended claims are not to be limited to the disclosed embodiments but on the contrary, are intended to cover all modifications, variations and/or equivalent arrangements which retain any novel features and advantages of this invention.

12.0 Appendix I—Glossary of Message Field Definitions

The following glossary of field definitions correspond to the field names set forth above in the detailed message formats.

MESSAGE FIELD DEFINITIONS

| Field | Range (hex) | Description |
|---|---|---|
| ACT | 0–1 | One bit field used to indicate whether a patch/simsel id is being activated (=1) or deactivated (0=) |
| ATM | 0–1 | Automatic bit field used to indicate that the responding unit automatically relays its status to the console 102. |
| BK1 | 57 | First Barker byte, always a 57 hex |
| BK2 | 12 | Second Barker byte, always a 12 hex |
| BMP | 00–FF | Bit map used for multiple group calls. Each bit represents an entity which was specified in the set up of the call. |
| CHK | 00–FF | "Exclusive Or" checksum of all bytes in a message. |
| CHN | 00–1F | Five bit field which specifies the hardware channel on which a call will be routed. Each channel is connected to a repeater. |
| | 00 | Reserved |
| | 01–18 | Repeater/channel numbers 1 to 24 |
| | 19–1B | Reserved |
| | 1C | Call pending |
| | 1D | Call queued |
| | 1E | System busy, call not queued |
| | 1F | Call denied |
| CNT | 0–7 | Count of the number of patch messages to follow header message |
| DLY | 0–3 | Delay associated with time between channel request to channel allocation |
| | 00 | 2 slots - 60 msec |
| | 01 | 3 slots - 90 msec |
| | 10 | 5 slots - 150 msec |
| | 11 | 8 slots - 240 msec |
| ECL | 0–1 | One bit field used to command the site to cancel the declared emergency =1 |
| FST | 0–3 | Two bit failsoft code |
| | 00 | Normal operation |
| | 01 | Limited trunking |
| | 10 | Conventional operation |
| | 11 | Reserved |
| GCT | 0–F | Indicates number of groups following in this message. |
| GID | 00–FF | Unique GETC message id |
| GRP | 000–7FF | Eleven bit group id used to specify a collection of mobiles |
| HDP | 0–1 | Hold channel = 0, drop channel=1 |
| HDR | 0–1 | Flag which identifies a patch message as a header message |
| HMS | 0–1 | Home site information =1, adjacent site information =0. |
| IC1 | 0–F | Most significant nibble of an inbound single slot control channel message |
| IC2 | 0–F | Second significant nibble (inbound single slot control channel message) |
| IC3 | 0–F | Third significant nibble (inbound single slot control channel message) |
| IC4 | 0–F | Fourth significant nibble (inbound single slot control channel message) |
| IC5 | 0–F | Fifth significant nibble (inbound single slot control channel message) |
| IC6 | 0–F | Sixth significant nibble (inbound single slot control channel message) |
| IC7 | 0–F | Least significant nibble (inbound single slot control channel message) |
| ICT | 0–F | Indicates number of individuals following in this message. |
| IW1 | 0–F | Most significant nibble of an inbound working channel message |
| IW2 | 0–F | Second significant nibble (inbound working channel message) |
| IW3 | 0–F | Third significant nibble (inbound working channel message) |
| IW4 | 0–F | Least significant nibble (inbound working channel message) |
| IW5 | 0–F | Least significant nibble (inbound working channel message) |
| L/G | 0–1 | Following id is either a group L/G=0, or a unit L/G=1 |
| LID | 000–FFF | Twelve bit logical id used to uniquely specify a source or destination of audio |
| MAK | 0–1 | Acknowledge to a modify patch assignment message=1 |
| MID | 00–FF | Unique console message id |
| OC1 | 0–F | Most significant nibble of an outbound single slot control channel message |
| OC2 | 0–F | Second significant nibble (outbound single slot control channel message) |
| OC3 | 0–F | Third significant nibble (outbound single slot control channel message) |
| OC4 | 0–F | Fourth significant nibble |

-continued

MESSAGE FIELD DEFINITIONS

| Field | Range (hex) | Description |
|---|---|---|
| | | (outbound single slot control channel message) |
| OC5 | 0-F | Fifth significant nibble (outbound single slot control channel message) |
| OC6 | 0-F | Sixth significant nibble (outbound single slot control channel message) |
| OC7 | 0-F | Least significant nibble (outbound single slot control channel message) |
| OCA | 0-F | Most significant nibble of an outbound 2-slot control channel message |
| OCB | 0-F | Second significant nibble (outbound 2-slot control channel message) |
| OCC | 0-F | Second significant nibble (outbound 2-slot control channel message) |
| OCD | 0-F | Fourth significant nibble (outbound 2-slot control channel message) |
| OCE | 0-F | Fifth significant nibble (outbound 2-slot control channel message) |
| OCF | 0-F | Sixth significant nibble (outbound 2-slot control channel message) |
| OCG | 0-F | Seventh significant nibble (outbound 2-slot control channel message) |
| OCH | 0-F | Eighth significant nibble (outbound 2-slot control channel message) |
| OCI | 0-F | Least significant nibble (outbound single slot control channel message) |
| OW1 | 0-F | Most significant nibble of an outbound working channel message |
| OW2 | 0-F | Second significant nibble (outbound working channel message) |
| OW3 | 0-F | Third significant nibble (outbound working channel message) |
| OW4 | 0-F | Fourth significant nibble (outbound working channel message) |
| OW5 | 0-F | Least significant nibble (outbound working channel message) |
| PID | 00-1F | Five bit physical id used in conjunction with source/destination field |
| PKD | 00-FF | Eight bit packet number which is unique, and incremented after every message is passed. If the receiver skips a packet number, a NACK is sent to the transmitting GETC. |
| PSS | 0-1 | One bit field used to indicate whether the following group id is a patch (=1) or simsel (=0) it |
| R | 0-1 | Retransmit=1 if message is repeated |
| S/C | 0-1 | Status/Call=1 if message is a status message. |
| SD1,SD2 | TBD | Source/destination code used with multiple switch 457/multiple site messages. |
| SID | 00-3F | Site identification number |
| SPK | 0-F | Four bit least significant nibble of packet number used in a patch message |
| STB | 00-FF | Eight bit start byte used exclusively in site/GETC communications |

-continued

MESSAGE FIELD DEFINITIONS

| Field | Range (hex) | Description |
|---|---|---|
| STG | 0-1 | One bit short tag field used in status messages |
| | 0 | Clear Voice Transmission |
| | 1 | Digital transmission (Voice Guard or digital data) |
| TAG | 0-4 | Two bit field identifies type of transmission |
| | 00 | Clear voice |
| | 01 | Voice guard |
| | 10 | Data |
| | 11 | Reserved |
| TLY | 00-FF | Eight bit field used to specify the number of bytes following the message id exclusive of the checksum byte |

What is claimed is:

1. In a trunked radio repeater system having an architecture of a site controller communicating with RF repeater means and a downlink trunking card module, said RF repeater means and downlink trunking card module each having control functions and being capable of communicating with each other independently of the site controller, a method of communicating digital signals over a downlink between said site controller located at an RF repeater site and a processor located remotely from said site, said RF repeater site including a plurality of said RF repeater means for communicating digital control signals with mobile radio units over RF channels using a predefined digital signalling protocol, said method comprising the steps of:

(1) communicating digital signals in a first predefined protocol between said site controller and said downlink trunking card module over a first serial data link;

(2) translating said first protocol digital signals between said first protocol and a second predefined protocol with said downlink trunking card module;

(3) communicating said digital signals in said second protocol between said downlink trunking card module and a switch trunking card module located remotely from said site over a second serial data link;

(4) translating said second protocol digital signals between said second protocol and a third predefined protocol with said switch trunking card module; and (5) communicating said third protocol digital signals between said switch trunking card module and said processor over a third serial data link, wherein said first and second protocols are different from one another, and said second protocol is substantially identical to the signalling protocol used to communicate digital control signals between said repeater means and said mobile radio units over said RF channels.

2. A method as in claim 1 wherein:

said communicating step (1) includes transmitting digital data signals over said first data link at a rate of about 19.2 kbps using said first protocol;

said communicating step (5) includes transmitting digital data signals over said third data link at a rate of about 19.2 kbps using said third protocol; and said communicating step (3) includes transmitting digital data signals over said second data link at a rate of about 9.6 kbps using said second protocol.

3. A method as in claim 1 wherein:
said communicating step (3) includes transmitting data over said second data link at a first data transfer rate; and
said communicating steps (1) and (5) include transmitting data over said first and third data links, respectively, at data transfer rates which are substantially greater than said first data transfer rate.

4. A method as in claim 1 further including the steps of:
performing said steps (1)–(5) in sequence to communicate global messages between said controller and said processor; and
performing only said steps (1) and (2) to communicate administrative messages between said controller and said downlink trunking card module.

5. In a digitally trunked radio frequency communications system, an arrangement for prioritizing digital messages for communication between a dispatch console and a site controller, said arrangement including:
means for receiving control channel messages, working channel messages, patch messages, and administrative messages from said dispatch console;
buffer means connected to said receiving means for temporarily storing said received messages;
communication link means connected to said buffer means for transmitting messages contained in said buffer means to said site controller; and
processing means, operatively connected to said buffer means and said communication link means, for prioritizing the transmission of messages temporarily stored by said buffer means so that: (a) all stored control channel messages are transmitted before any stored working channel, patch or administrative message, (b) all stored working channel messages are transmitted before any stored patch and administrative message, and (c) all stored patch messages are transmitted before any stored administrative message.

6. A method as in claim 1 further including the steps of:
performing said steps (1)–(5) in sequence to communicate global messages between said controller and said processor; and
performing only said steps (4) and (5) to communicate administrative messages between said processor and said switch trunking card module.

7. In a trunked radio repeater system having an architecture of a site controller communicating with RF repeater means and a downlink trunking card module, said RF repeater means and downlink trunking card module each having control functions and being capable of communicating with each other independently of the site controller, a method of communicating digital signals over a downlink between said site controller located at an RF repeater site and a processor located remotely from said site, said RF repeater site including a plurality of RF repeater means for communicating digital control signals with mobile radio units over RF channels using a predefined digital signalling protocol, said method comprising the steps of:
(1) communicating digital signals in a first predefined protocol between said site controller and said downlink trunking card module over a first serial data link;
(2) translating said first protocol digital signals between said first protocol and a second predefined protocol with said downlink trunking card module;
(3) communicating said digital signals in said second protocol between said downlink trunking card module and a switch located remotely from said site over a second serial data link;
(4) translating said second protocol digital signals between said second protocol and a third predefined protocol with said switch; and
(5) communicating said third protocol digital signals between said switch and said processor over a third serial data link,
wherein said first and second protocols are different from one another, and said second protocol is substantially identical to the signalling protocol used to communicate digital control signals between said repeater means and said mobile radio units over said RF channels.

* * * * *